United States Patent [19]
Taniguchi et al.

[11] Patent Number: 5,130,733
[45] Date of Patent: Jul. 14, 1992

[54] CAMERA HAVING A PSEUDO FORMAT

[75] Inventors: Nobuyuki Taniguchi, Nishinomiya; Yoshinobu Kudo, Osaka; Manabu Inoue, Kobe; Michihiro Iwata, Sakai; Shigeru Wada, Kishiwada; Hiroshi Ootsuka, Sakai; Shinichi Yokoyama, Kyoto, all of Japan

[73] Assignee: Minolta Camera Kabushiki Kaisha, Osaka, Japan

[21] Appl. No.: 617,025

[22] Filed: Nov. 21, 1990

[30] Foreign Application Priority Data

| Nov. 24, 1989 | [JP] | Japan | 1-305158 |
| Dec. 8, 1989 | [JP] | Japan | 1-320227 |
| Dec. 8, 1989 | [JP] | Japan | 1-320228 |
| Dec. 8, 1989 | [JP] | Japan | 1-320229 |

[51] Int. Cl.$^5$ ............................................. G03B 13/00
[52] U.S. Cl. ............................... 354/400; 354/195.12
[58] Field of Search ............................. 365/400–409, 365/195.1, 195.12

[56] References Cited

U.S. PATENT DOCUMENTS

| 4,924,248 | 5/1990 | Taniguchi et al. | 354/195.1 |
| 4,942,414 | 7/1990 | Takahashi et al. | 354/195.12 |
| 4,958,177 | 9/1990 | Akitake | 354/195.1 |

Primary Examiner—L. T. Hix
Assistant Examiner—David M. Gray
Attorney, Agent, or Firm—Burns, Doane, Swecker & Mathis

[57] ABSTRACT

A camera with its taking optical system having two alternative, large and small, focal lengths and its finder optical system so contrived that the image formed as its focal length is varied continuously is visible through the finder, the latter included in a zoom optical system. The camera calculates the magnification of the image in the finder the photographer intends after seeing it and the focal length selected by him with the condition of the finder's optical system taken into account, and the result is recorded in the film are trimming information at the time of photographing. At the time of printing the photographed image is trimmed according to the angle of vision determined on the basis of the trimming information.

11 Claims, 46 Drawing Sheets

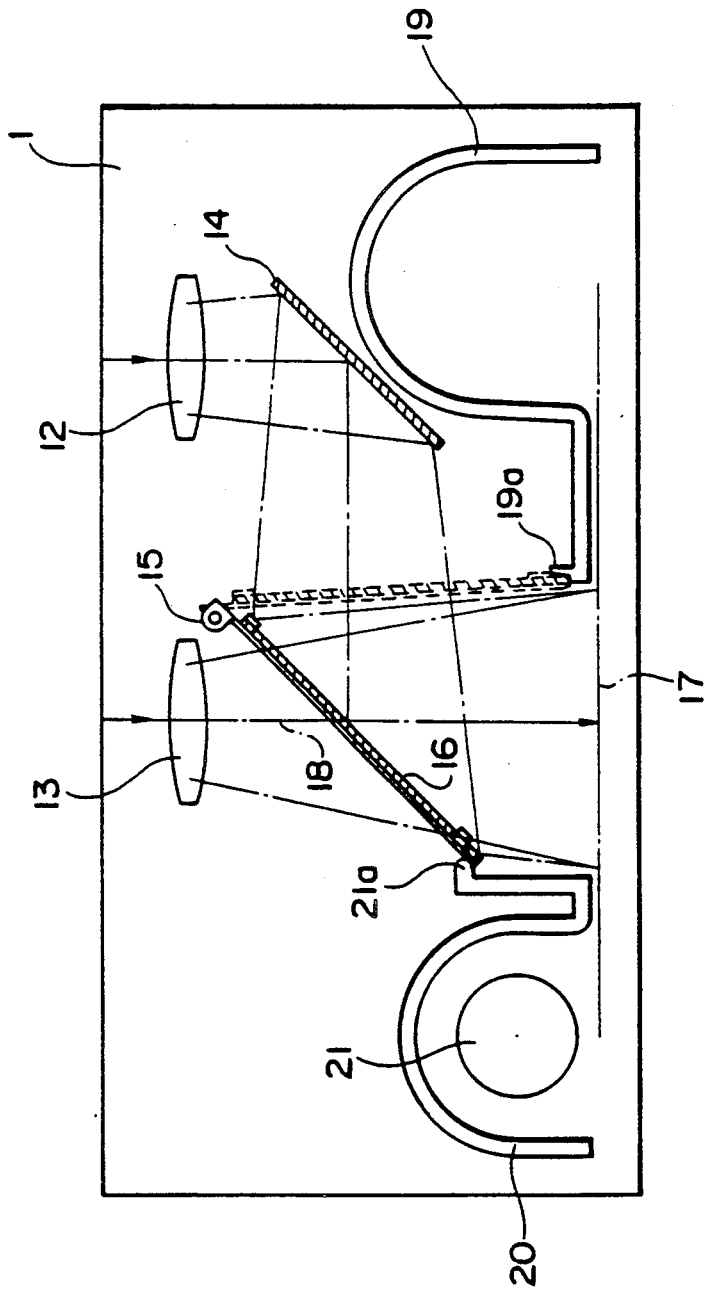

Fig. 29A
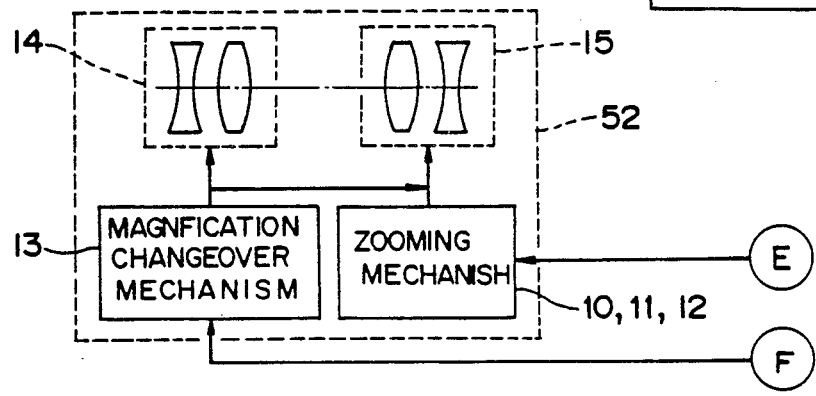
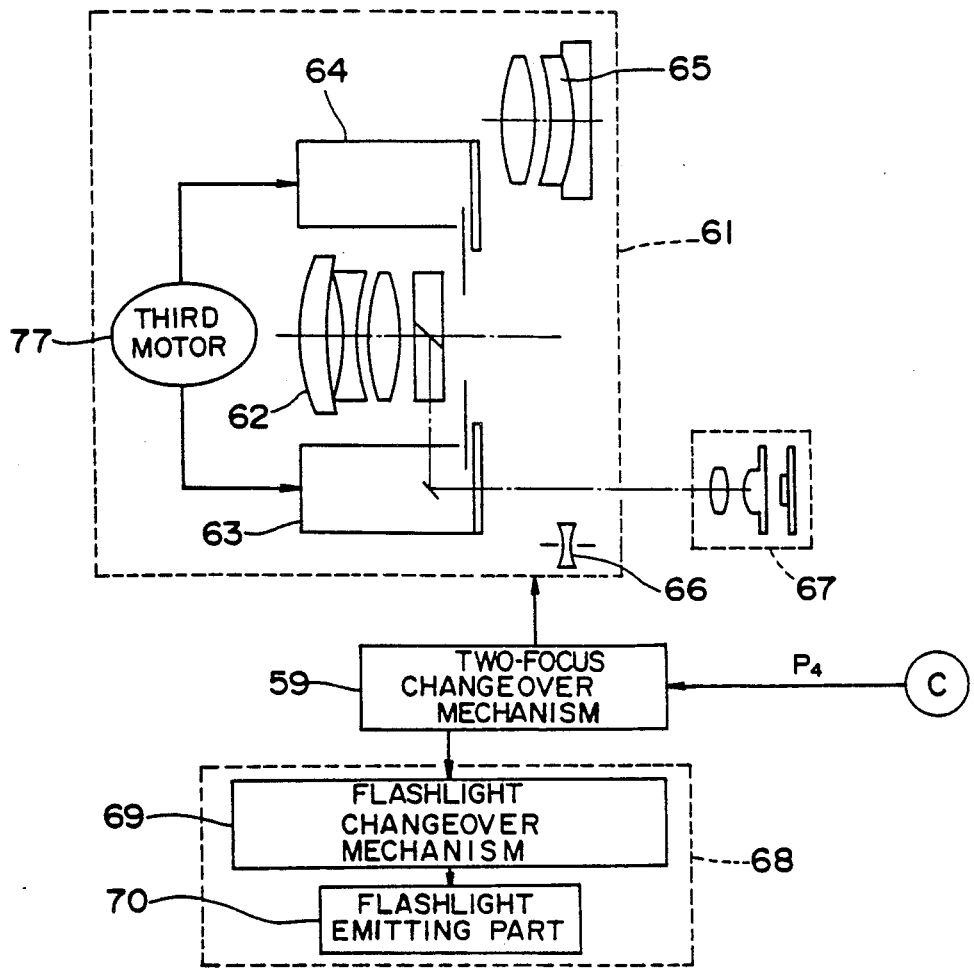

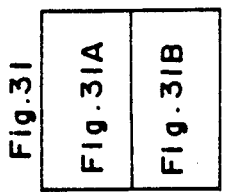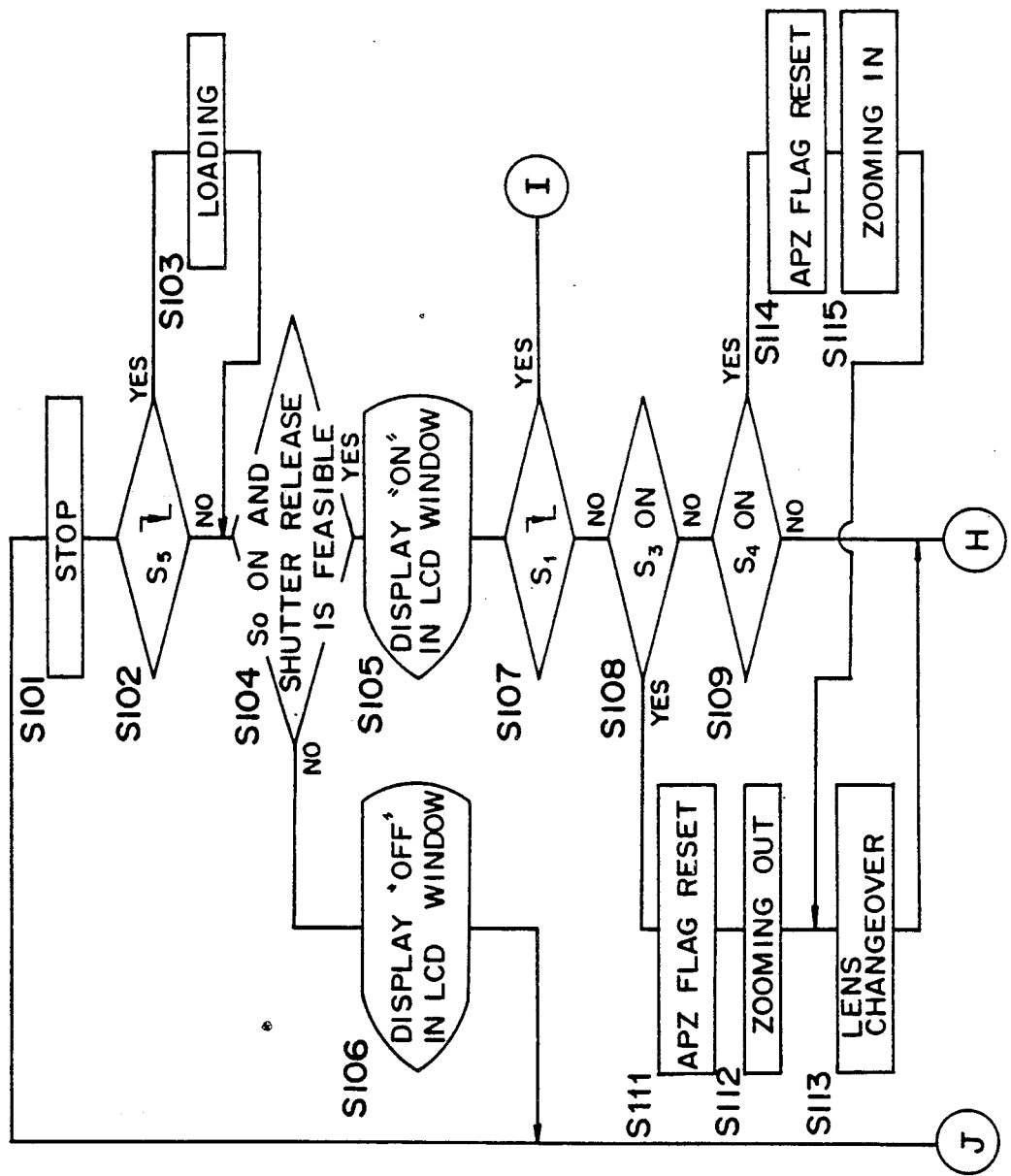

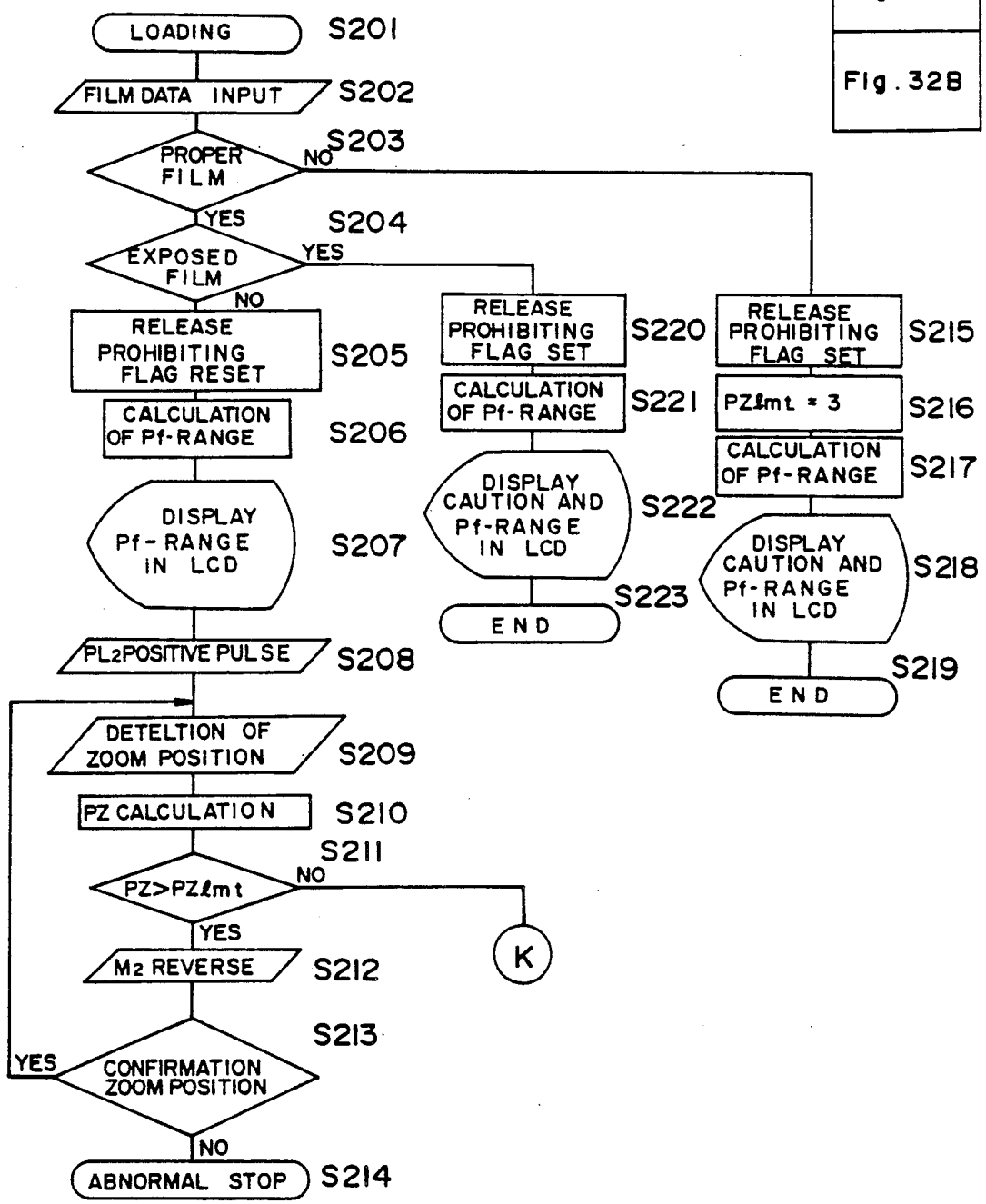

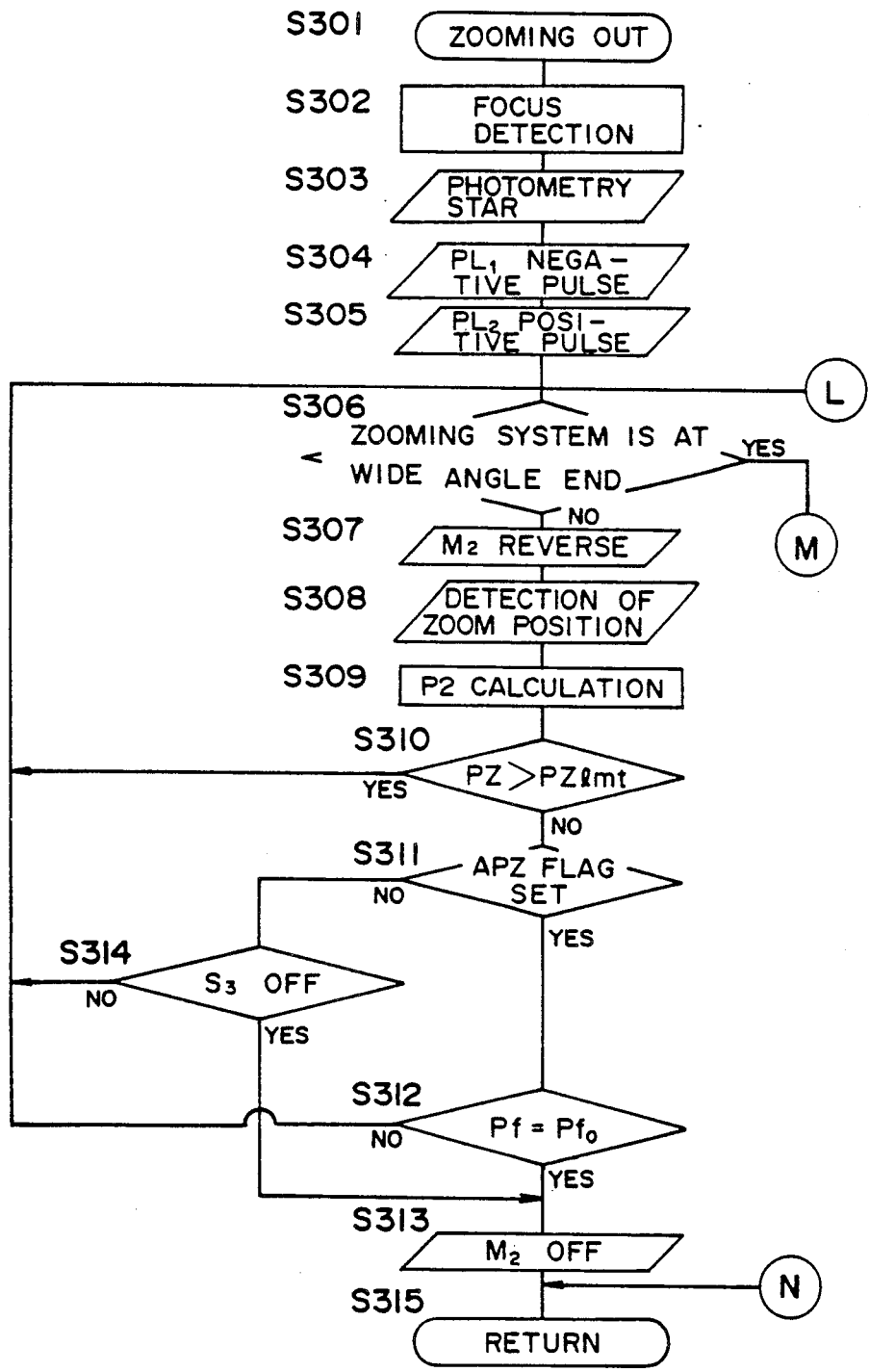

Fig. 34A
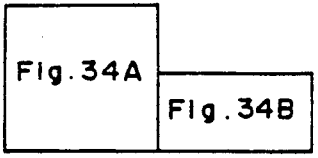
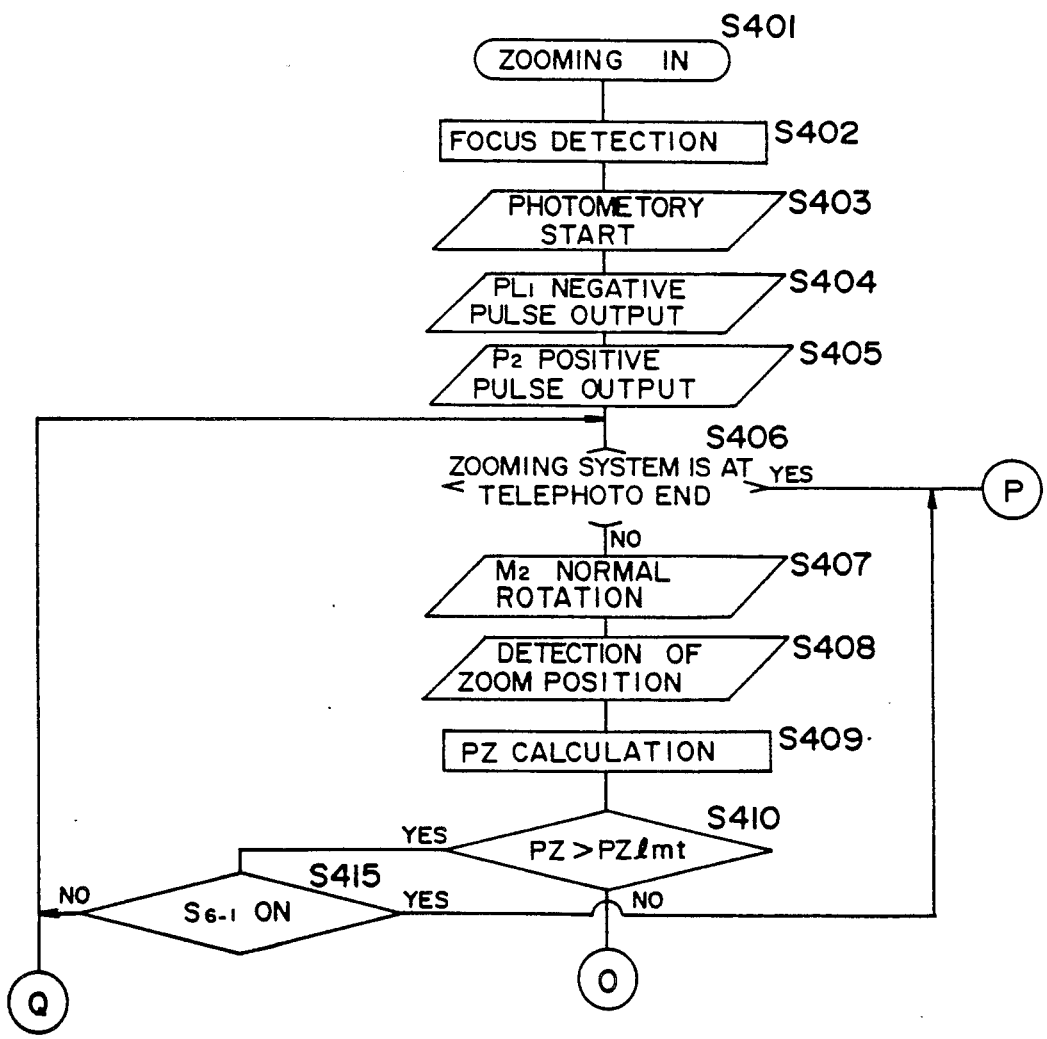

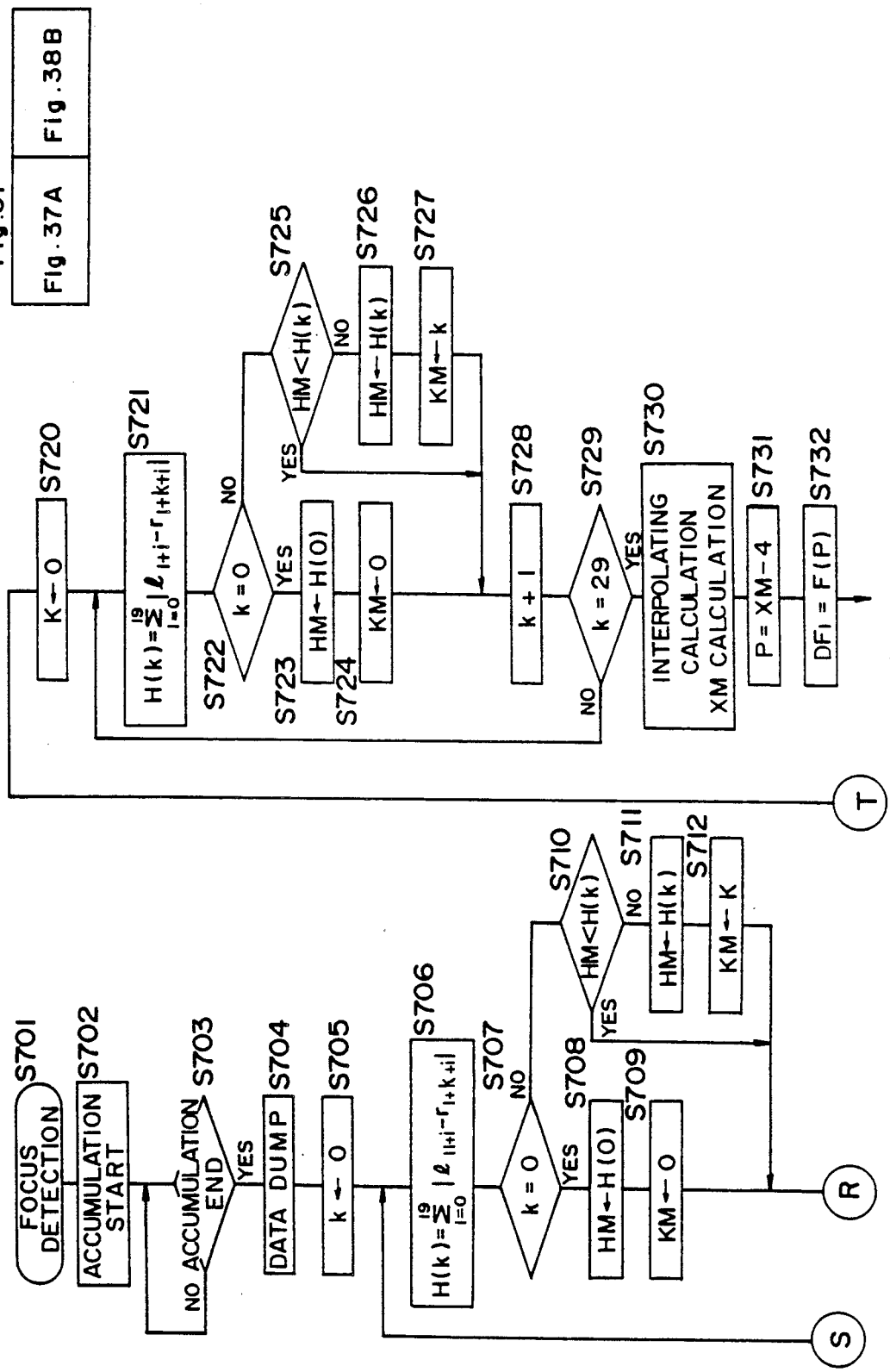

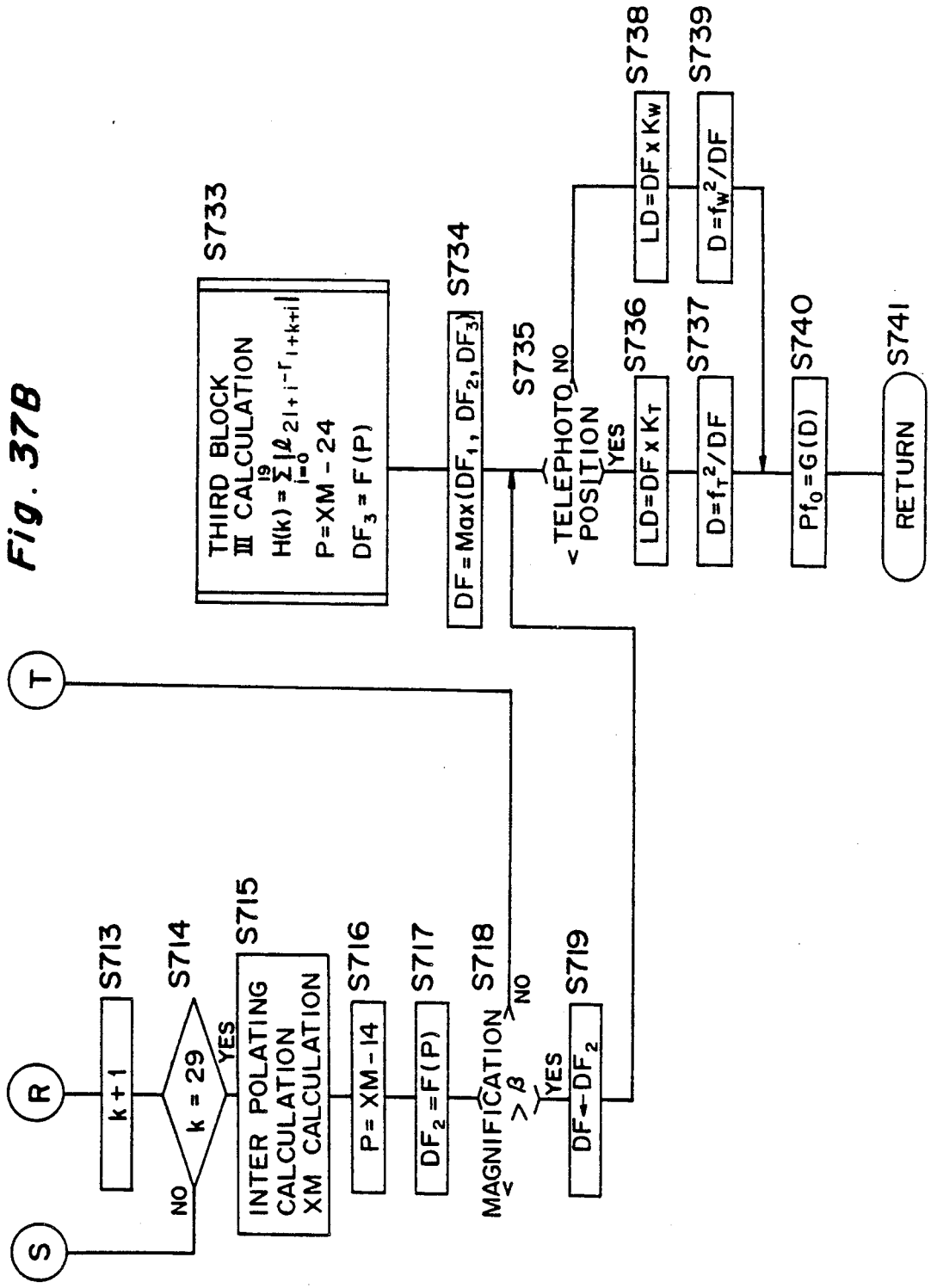

CAMERA HAVING A PSEUDO FORMAT

BACKGROUND OF THE INVENTION

1. Field of the Invention

The present invention relates to a camera having a pseudo format and more particularly to an auto focus camera provided with a taking lens having a plurality of discontinuous, alternative focal lengths and a finder with a variable focal length and that its taking range is set according to the finder's field of vision which is varied as the focal length is varied.

2. Description of the Related Art

In the so-called compact camera it has been rather a common practice to have it provided with as taking lens a multi-focal-length lens with which one of a plurality of discontinuous focal lengths can be arbitrarily selected so that the photographer can take a picture through proper selection of the taking range. Also, there are many with their focal length' magnification ratios set high so that a fairly large picture can be taken of an object located far.

Meanwhile, also known is the so-called pseudo zoom camera, which is a camera capable of varying the taking range without using a multi-focal-length lens and a trimming information is imparted to the film at the time of photographing and at the time of printing the range defined by the trimming information only is enlarged instead of the frame of film as a whole so that an effect similar to zoom photography is obtained.

With such a camera whose taking range is variable the taking range which varies according to manipulation of the taking optical system or the trimming information imparted to the film is requited to be accurately shown in the finder to be clearly visible to the photographer. Hence with a camera having a multi-focal-length lens in its taking optical system is often the case that the finder, too, is of a multi-focal-length type having a multi-focal-length optical system with which any one of a plurality of discontinuous focal lengths can be selected arbitrarily.

Meanwhile, as pseudo zoom cameras are proposed those with which indices are shown in the finder at four corners of the varying taking range by the use of liquid crystal display means or alternatively outside the taking range is masked by the use of similar liquid crystal display means and further those having a multi-focal-length finder as mentioned above or a finder having a zoom optical system which allow continuous variation of the focal length.

When it is tried to increase the magnification ratio for the taking optical system's focal length to say 4-fold so as to attain the object of taking a picture of far object as large as possible as described above, the following problems arise concerning the finder for the purpose.

That is, with the pseudo zoom camera whose taking range is shown in the finder by the use of the liquid crystal display means, the image in the taking range in the finder is bound to be extremely small when magnification is high, this resulting in marked lowering of the finder's recognizability. In this respect, a finder of variable focal length such as zoom finder with which the focal length can be varied continuously allows a high degree of recognizability even in a high magnification range. With a finder of this type, however, the finder itself is bound to be rather bulky if high magnification is to be achieved, this resulting in sizable increase of the camera as a whole.

With camera also having auto-focus function, if they are of the phase differential detection type with their focal length detection means being of TTL (Through The Lens) system, a line sensor having CCD (Charge Coupled Device) or the like as photoreceptor element is bound to be located behind the position equivalent to the film surface with optical elements such as a condenser lens and a separator lens for laterally separating the luminous flux having passed through the taking lens arranged in between. Since with this type of camera the proportion of the distance-measuring range (photoreceptor element's light-receiving range) to the photographed range on the film is constant, it means that the proportion of distance-measuring range to the range to be printed is increased when pseudo zoom photography is done at a proper trimming magnification. Hence, this proportion increases with increasing trimming magnification and probability of the number of objects getting into the distance-measuring range increasing becomes higher, this resulting in a higher probability of erroneous distance-measuring as the distances not only to the main object but also to other objects not intended are likely to be measured.

This problem of the probability of erroneous distance-measuring becoming higher is the case not only with cameras of the phase differential detection type but also with those of the contrast detection type and many others of the external light distance-measuring type instead of TTL system.

In order to take a largest possible picture of a far object, there is also proposed to pseudo zoom camera combining the effect of the telephoto photography (long focal length photography) with that of pseudo telephoto photography so as to increase the settable range of pseudo focal length (product of the real focal length and the trimming factor). With such a pseudo zoom camera the taking lens used is a multi-focal-length lens with which any one of a plurality of discontinuous focal lengths is selectable and it is so arranged that the aforementioned trimming information is imparted to the film at the time of photographing.

With this pseudo zoom camera of the multi-focal length type, however, the taking lens' real focal length is combined with a trimming factor selected as follows. When the taking lens used has two alternative focal lengths of 35 mm and 70 mm, it is most efficient if the pseudo focal distance is 35–70 mm when the taking lens' real focal length is 35 mm for the pseudo focal distance can then be set continuously, hence in this case the trimming factor is set at a maximum of 2. The pseudo focal length, therefore, can be set within a range of 70–140 mm when the real focal length is 70 mm, and this means that an overall range of 35–40 mm can be covered.

In such a composition, however, frequent changing of the focal length becomes necessary when photographing is done with the pseudo focal length set in the vicinity of the taking lens' changeover point, this giving cause for noise and/or increased power consumption.

In the example described above this is the case when it is attempted to set the pseudo focal length in the vicinity of 70 mm. When the photographer tries to find the optimum pseudo focal length in the vicinity thereof and after varying the pseudo focal length from 65 mm through 70 mm to 75 mm or so and, unable to find the optimum taking range, tries to bring it again below 70 mm. If this is done, the taking lens' position is changed each time the focal length passes 70 mm. If such an attempt is repeated a number of times, the focal length of the taking lens is changed the same number of times, this giving rise to noise and/or waste of power as described above.

SUMMARY OF THE INVENTION

A primary object of the present invention is to provides an improvement of a conventional camera such as a 2-focal-length camera with a plurality of discontinuous alternative focal lengths in that a pseudo zooming function is imparted thereto so as to enable pseudo zoom photography in which the focal length can be varied continuously and this improved camera can be made by far more compact than the conventional counterpart.

Another object of the prevent invention is to miniaturize a variable focal length finder for a camera contrived to vary the taking range at a high magnification ratio.

Still another object of the present invention is to preclude erroneous distance-measurement in pseudo zoom photography with an auto focus camera through prevention of increase of the proportion of the distance-measuring range to the range to be printed.

Still a further object of the present invention is to prevent frequent changing of the focal length in a pseudo zoom camera provided with a taking lens of multi-focal-length type to thereby prevent noise as well as waste of power.

A camera having a pseudo format according to an embodiment of the present invention comprises:
  optical system having a short focal length and a long focal length;
  means for designating a certain focal length;
  first control means for controlling the optical system to set the focal length of the optical system to the short focal length when the designated focal length corresponds to the short focal length;
  second control means for controlling the optical system to set the focal length of the optical system to the long focal length when the designated focal length corresponds to the long focal length; and
  means for generating a signal to designate a pseudo focal length between the short and long focal lengths when the designated focal length is between the short and long focal lengths.

A camera having a pseudo format according to another embodiment of the present invention comprises:
  optical system having a short focal length and a long focal length;
  first generating means for generating a signal of magnification between a first magnification and a second magnification greater than the first magnification to the short focal length of the optical system;
  second generating means for generating a signal of magnification between a third magnification and a fourth magnification greater than the third magnification to the long focal length;
  means for designating a certain focal length between the short focal length ad a pseudo focal length corresponding to the product of the long focal length and the fourth magnification; and
  means for controlling the optical system and either of the generating means according to the designated focal length.

In the first modified embodiment of the camera according to the above-described another embodiment of the present invention, the third magnification may equal the first magnification and the fourth magnification may equal the second magnification, and a pseudo focal length corresponding to a product of the short focal length and second magnification may equal the long focal length.

In the second modified embodiment of the camera according to the above-described another embodiment of the present invention, a product of the short focal length and second magnification may be larger than the long focal length, and also the camera may further comprise:
  means, provided in the controlling means, for selecting either of the short and long focal lengths according to the designated focal length;
  means, provided in the controlling means, for making first generating means generate a signal of magnification between the first and second magnifications according to the designated focal length when the short focal length is selected by the selecting means;
  means, provided in the controlling means, for making second generating means generate a signal of magnification between the third and fourth magnifications according to the designated focal length when the long focal length is selected by the selecting means; and
  means, provided in the controlling means, for controlling the selecting means to select the short focal length when the designated focal length is under the long focal length, to select the long focal length when the designated focal length is over the product, to select the short focal length when the designated focal length is between the long focal length and the product and when previous designation of the designating means is not over the product, and to select the long focal length when the designated focal length is between the long focal length and the product and when previous designation of the designating means is not under the long focal length.

In the third modified embodiment of the camera according to the above-described another embodiment of the present invention, a product of the short focal length and second magnification may be larger than the long focal length, the camera may further comprise:
  means for detecting lighting condition of a subject;
  means, provided in the controlling means, for selecting either of the short and long focal lengths according to the designated focal length;
  means, provided in the controlling means, for making first generating means generate a signal of magnification between the first and second magnifications according to the designated focal length when the short focal length is selected by the selecting means;
  means, provided in the controlling means, for making second generating means generate a signal of magnification between the third and fourth magnifications according to the designated focal length when the long focal length is selected by the selecting means; and
  direct means, provided in the controlling means, for controlling the selecting means to select the short focal length when the designated focal length is under the long focal length, to select the long focal length when the designated focal length is over the product, to select either of the short and long focal lengths according to the detected light condition when the designated focal length is between the long focal length and the product.

In the fourth modified embodiment of the camera according to the above-described third modified embodiment of the present invention, may further comprise:

means for illuminating a subject;
means, provided in the detecting means, for calculating light amount from the subject to be illuminated; and
means for comparing the light value and a predetermined value, and wherein the direct means selects either of the short and long focal lengths according to compared result of the comparing means when the designated focal length is between the long focal length and the product.

In the third modified embodiment of the camera according to the above-described another embodiment of the present invention, a product of the short focal length and second magnification may be larger than the long focal length, the camera may further comprise:

means for determining whether to illuminate a subject or not;
means, provided in the controlling means, for selecting either of the short and long focal lengths according to the designated focal length;
means, provided in the controlling means, for making first generating means generates a signal of magnification between the first and second magnification according to the designated focal length when the short focal length is selected by the selecting means;
means, provided in the controlling means, for making second generating means generate a signal of magnification between the third and fourth magnification according to the designated focal length when the long focal distance is selected by the selecting means; and
direct means, provided in the controlling means, for controlling the selecting means to select the short focal length when the designated focal length is under the long foal length, to select the long focal length when the designated focal length is over the product, to select either of the short and long focal lengths according to the determination of the determining means when the designated focal length is between the long focal length and the product.

In the sixth modified embodiment of the camera according to the above-described first modified embodiment of the present invention, may further comprise optical finder system for showing a printing image to photographer, the optical finder system having;

zoom lens movable between a wide side and tele side for changing its focal length between a first focal length corresponding to the short focal length and a second focal length corresponding to the long focal length;
converter lens for attaching to the zoom lens to change zoom range of the zoom lens between the second focal length and a third focal length corresponding to a product of the long focal length and the fourth magnification;
means for driving the zoom lens slowly between the first and second foçal lengths;
means for driving the zoom lens to either side of the wide and tele quickly at the second focal length and for shifting the converter quickly; and
means for driving the zoom lens slowly between the second and third focal lengths.

A camera having a pseudo format according to the still another embodiment of the present invention comprises:

zoom lens;
cam shaft;
first cam groove, carved on the cam shaft, for driving the zoom lens along the first cam groove slowly to change the focal length of the zoom lens between a first focal length and a second focal length, each end of the first cam groove corresponding to the first and second focal lengths;
second cam groove, carved on the cam shaft, for connecting each end of the first groove with the shortest length to drive the zoom lens along the second cam groove quickly; and
means for selecting either of the first and second cam grooves to drive the zoom lens.

In the seventh modified embodiment of the camera according to the above-described still another embodiment of the present invention, may further comprise:

converter lens for attaching to the zoom lens to change zoom range of the zoom lens between a third focal length and a fourth focal length; and
means for shifting the converter lens when the zoom lens is driven along the second cam groove.

In the eighth modified embodiment of the camera according to the above-described still another embodiment of the present invention, the cam shaft may be cylindrical shaped, the first cam groove is carved spirally, the second cam groove may be carved longitudinally and selecting mean rotates the cam shaft for selecting the first cam groove and drive longitudinally for selecting the second cam groove.

A camera having a pseudo format according to the still further embodiment of the present invention comprises:

zoom lens movable between a first and a second positions for changing focal length between a first and a second focal lengths;
converter lens attachable to the zoom lens for changing focal length from the first focal length to a third focal length at the first position of the zoom lens and from the second focal length to a fourth focal lengths;
means for driving the zoom lens from the first position to the second position to change focal length from the first focal length to the second focal length;
means for returning the zoom lens to the first position and for attaching the converter lens to change focal length from the second focal length to the third focal length; and
means for driving the zoom lens from the first position to the second position with attaching the converter lens to change focal length from the third focal length to the fourth focal length.

According to the present invention, the user taking a picture can select the desired pseudo focal length. According to the selected pseudo focal distance it is judged whether the taking lens with a large focal length or one with a small focal length is to be used, and the taking lens's position is changed accordingly. Also, the trimming magnification is calculated from the selected pseudo focal length and the taking lens' focal length and this trimming information is transmitted to and recorded in the film or film cartridge. By printing a part of the film on the basis of this trimming information it is possible to take a picture of the same angle of vision as a picture taken by a real zoom camera at the desired focal length.

Also according to this invention, when the finder is set to be in the wide angle mode in which the field of vision is widest, it means that both zoom optical system and multi-focal-length optical system are set to be in the wide angle mode, hence, if the zoom optical system only is driven toward the telephoto position by the provided driving means, the focal length of the finder itself is increased according to the extent of its movement, that is, in proportion to the magnification of the zoom optical system. If as the multi-focus optical system is used, for example, one with two selectable focal lengths and the focal length of the multi-focus optical system is changed from the wide angle position to the telephoto position with the zoom optical system positioned on the telephoto position, the system's focal length is further increased by the extent in proportion to its magnification, hence the magnification of the finder as a whole is equivalent to the product of the magnification of the zoom optical system and the multi-focal-length optical system. For example, the magnification of the zoom optical system is 2-fold and that of the multi-focal-length optical system is also 2-fold, the combination allows variation of the focal length within a limit of 4-fold.

Since in this case the required extent of shifting of the lenses comprising the zoom optical system is much less than supposed from the high magnification of 4-fold, it is also easy to miniaturize the finder and also the camera as a whole as will be apparent when comparison is made with a finder with which the same magnification is made attainable by simple shifting of lenses of the zoom optical system, that is, from the difference in the extent of shifting of the corresponding lenses.

Meanwhile, when the focal length is shifted from the wide angle position to the telephoto position or vice versa, it is needless to say that it is preferable that such shifting be done continuously. For that, in the aforementioned composition it is preferred to arrange so that the finder's focal length is substantially the same when the multi-focal-length optical system is set at the wide angle position and the zoom optical system is set at the telephoto end of its variable range of focal length and when the multi-focal-length optical system is set at the telephoto position and the zoom optical system is set at the wide angle end. It is also preferred that the aforementioned driving means comprises a first means for driving the zoom optical system such that its focal length varies continuously, a second means for setting the multi-focal-length optical system with its two alternative focal lengths at the telephoto position when the focal length of the zoom optical system has reached the telephoto end and for setting the multi-focal-length optical system at the wide angle position when the focal length of the zoom optical system has reached the wide angle end and a third means for restoring the zoom optical system to the wide angle end substantially simultaneously with setting of the multi-focal-length optical system at the telephoto position and for restoring the same to the telephoto end substantially simultaneously with setting of the multi-focal-length optical system at the wide angle position.

When, in this composition, the finder is driven, for example, from the wide angle position to the telephoto position, the zoom optical system is driven by the first means from the wide angle end to the telephoto end of the variable range of focal length with simultaneous driving by the second means of the multi-focal-length optical system to shift to the telephoto position and, at the same time, the zoom optical system is set again at the wide angle position by the third means so that it can further move toward the telephoto position. When the finder is driven from the telephoto position to the wide angle position, the zoom optical system is driven by the first means from the telephoto end to the wide angle end of the variable range of focal length with simultaneous driving by the second means of the multi-focal-length optical system to shift to the wide angle position and, at the same time, the zoom optical system is set again at the telephoto position by the third means so that it can further move toward the wide angle position.

Thus, according to the composition described above, it is possible to vary a finder's focal length in a high magnification range continuously without increase of the range of shifting lenses as in the case of the composition according to claim 1, this enabling miniaturization of the finder and also of the camera as a whole.

According to the present invention, when in pseudo zoom photography a second pseudo focal length has been set by a pseudo focal length setting means as the pseudo focal length selected by the photographer, first the distance-measuring range with respect to the object is narrowed compared with the case in which setting is made at a first pseudo focal length smaller than the second pseudo focal length. As the method of narrowing the distance-measuring range there are known such alternatives as dividing the range of pseudo focal length to be set and varying the distance-measuring range in individual divisions stepwise, or making the distance-measuring range vary continuously with continuous variation of the pseudo focal length without doing such division.

Setting at the second pseudo focal length larger than the first pseudo focal length means actually that the range to be printed of the film is narrowed and, moreover, such narrow range has to be enlarged to a greater extent. In the aforementioned composition, however, there is no risk of undue increase of the proportion of the distance-measuring range to the range to be printed for, as described above, the distance-measuring range, too, is narrowed as the range to be printed becomes narrower. Of the aforementioned two alternative methods, the method of dividing the range of pseudo focal length to be set and varying the distance-measuring range in individual divisions has a drawback of the proportion of the distance-measuring range to the range to be printed is not always constant, being subject to variation in each division, but the risk of erroneous distance-measurement can substantially be precluded for there is no possibility of undue increase of the proportion of the distance-measuring range to the range to be printed. When, in the other alternative, the distance-measuring range is varied continuously, the proportion of the distance-measuring range to the range to be printed is substantially always constant, this further ensuring against the risk of erroneous distance-measurement.

A further feature of the present invention is that, when the taking lens has two alternative real focal lengths of, for example, 35 mm and 70 mm, the range of pseudo focal lengths which can be set for each real focal length is, for example, 35-80 mm for the real focal length of 35 mm and 70-160 mm for the real focal length of 70 mm, there being thus an overlapped section.

When the photographer with a camera of such composition tries to find the optimum pseudo focal length in the vicinity of 70 mm and, unable to find a proper taking range after varying the pseudo focal length from, for example, 65 mm through 70 to 75 mm or so, again bring the focal length to or below 70 mm, this does not cause forced change of the taking lens' position and exposure is done as it is and the trimming information is imparted to the film. When the taking lens is set at the smaller real focal length of 35 mm and this can cope with a pseudo focal length range of 35-80 mm, the pseudo focal length for the larger real focal length is normally to be set at 80 mm or more. Since in this composition the pseudo focal length can be set at 70 mm or more, no force changing of the taking lens' position is done even if the pseudo focal length is varied from, for example, 85 mm through 80 mm to 75 mm or, thereafter, back to 80 mm or even more.

Thus, the taking lens has a plurality of alternative focal lengths and the ranges of pseudo focal lengths for two alternative real focal lengths are intentionally set to overlap partly, this precluding the possibility of forced changing of the taking lens' real focal length regardless of the times of focal length changing attempts made in the aforementioned overlapped section. Hence, the frequency of shifting lenses as a whole can be reduced and, therefore, noise and/or waste of power can be effectively prevented.

BRIEF DESCRIPTION OF THE DRAWINGS

FIG. 3 is a diagrammatic view of an optical system;

FIG. 6 is a flow chart showing the operation when the camera's main switch $S_W$ is turned ON;

FIG. 7 is a flow chart showing the operation when a photographing preparation switch S1 is turn ON;

FIG. 11 is a flow chart showing the operation when a telephoto side switch $S_T$ of the zoom switch is turned ON;

FIG. 14 is a flow chart showing the operation when the zoom switch's wide side switch $S_W$ is turned ON;

FIG. 15 is a flow chart showing the operation when a mode changing switch $S_{MD}$ is turned ON;

FIGS. 21 through 51 show a camera with a finder whose focal length is variable (a variable focal length finder) according to the second embodiment of the present invention of which;

FIG. 21 is a perspective view of the camera with the taking lens set at the wide angle position;

FIG. 22 is another perspective view of the camera with the taking lens set at the telephoto position;

FIGS. 23 through 26 are views showing shifting of finder lenses in the process of zooming;

FIGS. 27 and 28 are views showing the taking optical system in the wide angle mode and the tele photo mode;

FIG. 29 is a block diagram showing the mechanical constitution of the camera;

FIG. 30 is another block diagram showing the electric circuit of the camera;

FIG. 31 through 38 are flow charts showing the modes of operation of the camera;

FIGS. 39 and 40 are graphs showing the ranges of the pseudo focal length Pf according to the trimming limit PZlmt;

FIGS. 41 and 42 are exposure program charts;

FIG. 43 is a graph showing the timing of shifting the taking lens;

FIG. 44 is an illustratory view showing the arrangement of picture elements of the line sensor;

FIG. 45 is a graph showing the relation between the proportion of the actual distance-measuring area to the finder's distance-measuring frame and the pseudo zoom magnification; and FIGS. 46 through 51 are exploded perspective views showing the constitution of the finder shifting mechanism and the operation thereof.

DETAILED DESCRIPTION OF THE INVENTION

First Embodiment

Figure 1:
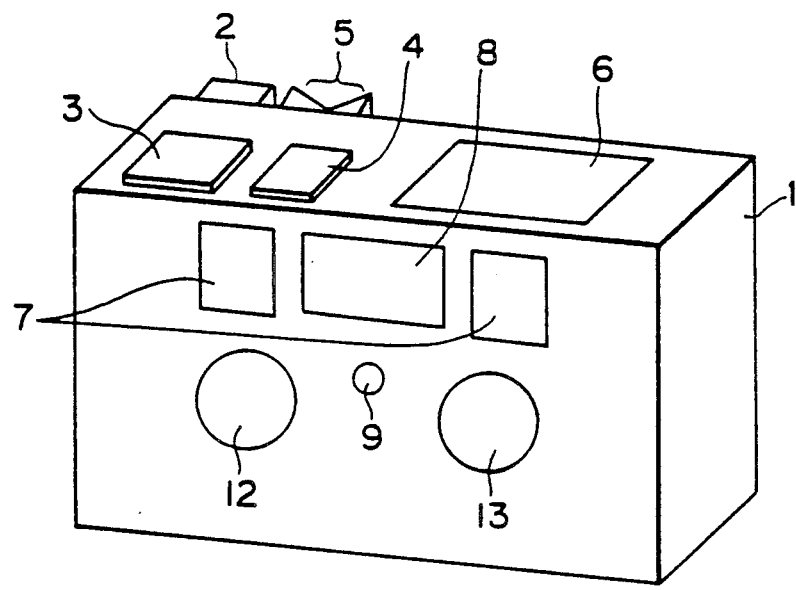
FIG. 1 is a perspective view showing the external appearance of a pseudo zoom camera according to the first embodiment of the present invention.
Figure 2:
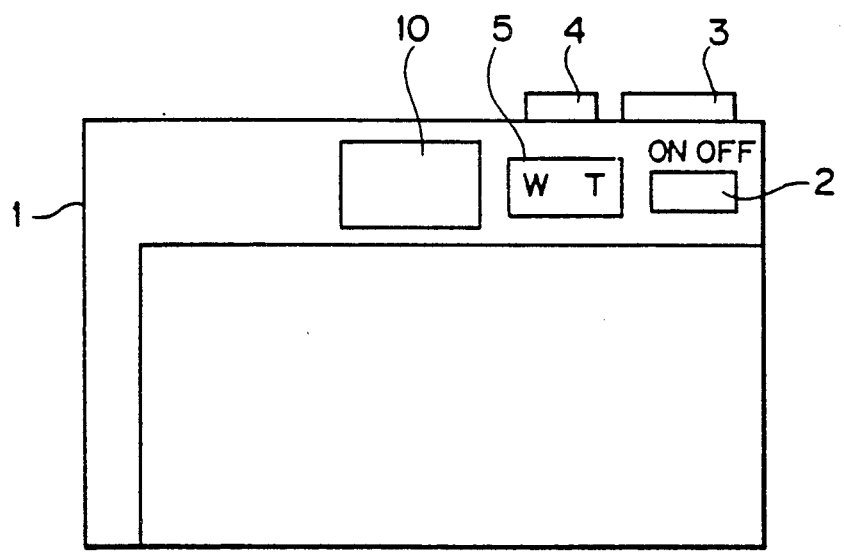
FIG. 2 is a rear view of the same camera.

FIG. 1 is the exterior view of the first embodiment of a camera of the present invention and FIG. 2 is the rear view of the same camera.

A camera housing 1 is of a two-focal point camera and is provided with the following parts. A main switch 2 is of the ON-OFF type and when this switch 2 is ON, power is supplied to the camera's circuit to make the camera operable. A release switch 3 is provided for such preparatory procedure as automatic distance measurement (AF) and automatic photometry (AE) to be done when it is pushed down to the first stage and photographing is done when it is pushed down to the second stage. A mode switch 4 is a push-type switch with its contacts being normally open and as it is pushed once, changeover takes place between the normal zoom mode and the stereo mode of the camera. A zoom switch 5 is a seesaw-type switch and when it is pushed from behind on the left side, the camera is set for zooming on the wide side, and when it is pushed on the right side, setting is changed for zooming on the telephoto side. A display panel 6 is composed of liquid crystal display (LCD) or the like and serves to display the photographing information.

On the front side of the camera housing 1 there are provided a window 7 emitting and receiving light for AF mode of distance measurement by the active type triangular distance measuring method and further a lighting window 8, a telephoto side taking lens 12 and a wide side taking lens 13. On the back side of the camera housing 1 there is provided a finder window 10 for viewing the taking area.

In this embodiment, for film of 35 mm format, used are a wide side taking lens 13 35 mm in focal length and F3.5 in aperture and a telephoto side taken lens 12 50 mm in focal length and F5.6 in aperture. The magnification ratio which is the ratio of the focal length of the taking lens 12 to that of the taking lens 13 (50/35 in this case) is desirable to be within the range of the trimming limit (for example, 2-fold) which is determined by the film's graininess and the like. The trimming limit is explained in detail in the specification of U.S. application Ser. No. 488,999 filed on Mar. 6, 1990.

The camera of this embodiment is imparted the function of a pseudo zoom camera (also called electronic zoom camera), that is, the function of obtaining a picture whose angle of view is equal to that of a picture taken by the use of a lens whose focal length is larger than that of the lens actually used for taking the picture by doing trimming of the exposed frame of film at the time of printing. As to variation of magnification on the film surface at the time of printing, pseudo zooming is feasible within a focal length range of 35-100 mm in normal zooming by setting the pseudo focal length variable within a range of 35-70 mm on the wide side and of 50-100 mm on the telephoto side. The lens is changed over such that in photographing in the trimming mode corresponding to a pseudo focal length range of 35-70 mm, the taking lens 13 on the wide side is used, while the telephoto side taking lens 12 is used for photographing in the trimming mode corresponding to a pseudo focal length of 70-100 mm. Also, as described below, in the stereo mode zooming is feasible in a common zoom range of 50-70 mm.

The finder consists the optical zooming type being 35-100 mm of focal length and shows the image on the printed picture.

Figure 4A:
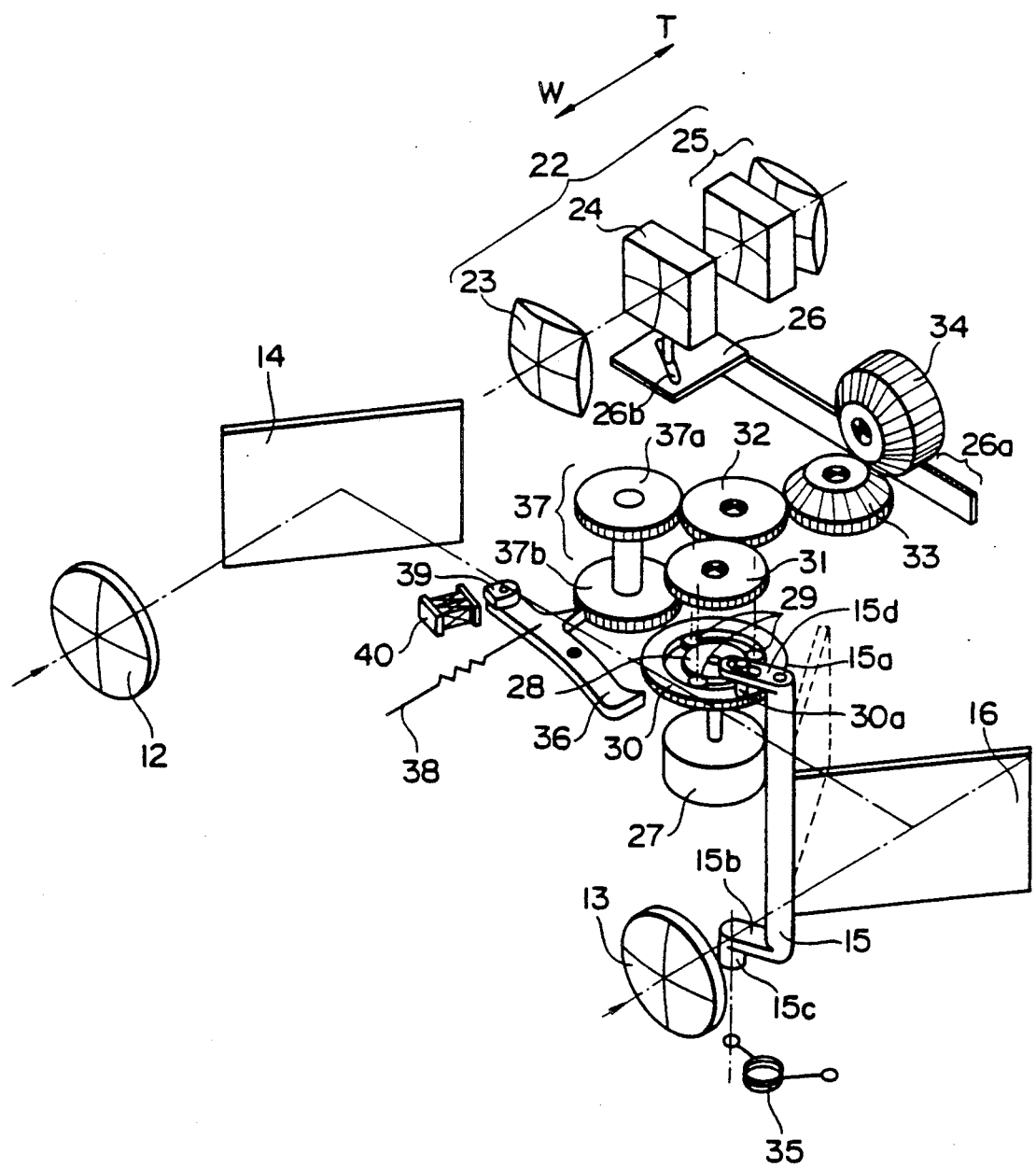
FIG. 4A is a perspective view of a mirror switchover and finder magnification varying mechanism.

FIG. 3 shows the outline constitution of the optical system of the present embodiment, and FIG. 4A shows the constitution of the mirror changeover and the finder's magnification varying mechanism of the optical system. In these figures the camera housing 1 is provided with two optical systems having different focal lengths. When the optical system on the long focal length side (telephoto side) is used, the light passing the telephoto side taking lens 12 is first reflected by a mirror 14 and reflected by a changeover mirror 16 mounted on a rotatable holder 15 and then form an image on a film 17. At this time the changeover mirror 16 gets into the optical path 18 on the short focal point side (wide side) to intercept its incident light. Meanwhile, when the optical system on the short focal point side is used, the light passing through the wide side taking lens 13 forms an image directly on the film surface 17. At this time the changeover mirror 16 serves as an optical path's side wall to intercept the incident light from the optical system on the long focal point side. In the camera housing 1 there are provided a wall 19 for housing a film cartridge and another wall equipped with a spool 21.

A finder 22 comprises a zoom finder. Although the zoom finder used in this embodiment is of the virtual image type, that of the real image type may as well be used. This finder 22 comprises an objective lens 23, a variable magnification lens 24 and an eye piece 25. The variable magnification lens 24 is engaged with a cam groove 26b formed in a cam plate 26 to be freely slidable. This cam plate 26 includes a rack portion 26a for receiving the driving force and the cam groove 26b.

The driving force generating by the motor 27 is transmitted to the cam plate 26 through a gear train 28-34. The changeover mirror 16 is held by the holder 15 and this holder 15 has two arms 15a and 15b on both sides thereof. The arm 15b is provided with a pin 15c and with it is engaged with one end of a toggle spring 35. The other end of this toggle spring 35 is engaged with the camera body. Due to this construction the mirror 16 is constantly urged toward either of its both ends (19a and 21a of FIG. 3) thereof. The arm 15a has formed therein an oblong hole 15d and is engaged with an eccentric pin 30a on a gear 30 to be freely slidable.

In the embodiment of FIG. 4A a single motor 27 is provided for changeover between magnification variation of the finder 22 and the mirror 16. For changeover of the driving force there are provided a differential (DEF) mechanism comprising gears 28-30 and a locking mechanism comprising members 36-40. The individual mechanisms are constituted as follows. The gear 28 and the gear 30 are meshed with each three planetary gears 29 in the concentric mode. The rotation axis of these planetary gears 29 is provided on another gear 31. On the outer periphery of the gear 30 are formed teeth engaging with a locking pawl of a member 36. A gear 37a of a gear system 37 is meshed with the gear 31 via a gear 32. The other locking pawl of the member 36 is engageable with a gear 37b. The locking pawl 36 engages with the gear 37b or the gear 30 as it swivels to switchover the output of the differential mechanism. This locking pawl is urged by a spring 38 to be normally engaged with the gear 30, and has a permanent magnet 39 attached to one end thereof. When the locking pawl 36 is in engagement with the gear 30, the permanent magnet 39 is in contact with an electric magnet 40. When this electric magnet 40 is energized, the permanent magnet 39 is repelled for the locking pawl 36 to engage with the gear 37b against the urging force of the spring 38.

Figure 10:
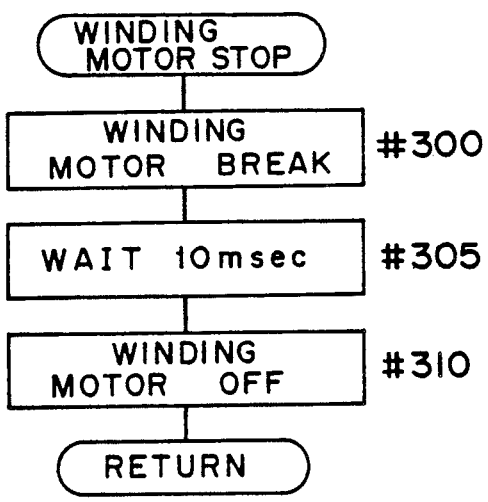
FIG. 10 is a flow chart showing a subroutine for stopping a film winding motor.

Then the operation of the aforementioned embodiment will be described. The motor 27 is controlled to turn forward (clockwise), stop or turn reverse (counter-clockwise) as the zoom switch 5 (FIG. 10 is manipulated. As described below, a micro-computer μCl of FIG. 5 detects the required zooming amount from the position information of the magnification varying lens 24 of the zoom finder 22 and determines the finder 22's focal length data.

As the pseudo focal length is increased from 35 mm to 100 mm, first the electric magnet 40 is not energized and the locking pawl 36 is urged by the spring 38 to be engaged with the gear 30. When the instruction to run forward is then given to the motor 27, the planetary gear 29 rotates backward and clockwise around the gear 28 for the gear 30 is fixed, and the motor 27's driving force is transmitted to the finder 22. As the pseudo focal length is increased to 70 mm, the electric magnet 40 is energized and the locking pawl 36 rotates clockwise against the urging force of the spring 38 and is engaged with the gear 37b. The finder 22 is then stopped. Since the rotation axis of the planetary gear 29 is fixed, the driving force of the motor 27 is transmitted to the gear 30 via the gears 28 and 29, and the gear 30 rotates counterclockwise. Since an eccentric pin 30a fits in the oblong hole 15d of the holder 15, the changeover mirror 16 and the holder 15 rotate clockwise on their rotation axis, and the locus of the mirror 16 changes from the broken line to the solid line of FIG. 4A.

Since, after rotation, the mirror 16 is urged clockwise by the toggle spring 35 the light from the wide side optical system is perfectly intercepted. When completion of changeover of the mirror 16 is detected by a detection switch (not shown), the electric magnet 40 is deenergized and thereupon the locking claw 36 is re-engaged with the gear 30. Then the driving force of the motor 27 is transmitted again to the cam plate 26 and magnification variation of the finder 22 is continued. When the pseudo focal length has reached 100 mm, power supply to the motor 27 is stopped automatically.

Then what results from decrease of the pseudo focal length from 100 mm to 35 mm will be explained. The zoom switch is then manipulated to give instruction to the motor 27 to reverse. The electric magnet 40 remains deenergized as it changes from 100 mm to 70 mm and the locking pawl 36 remains engaged with the gear 30 by the urging force of the spring 38. When the motor 27 is reversed, the planetary gear 29 revolves around the gear 28 since the gear 30 is fixed, and the motor's driving force is transmitted to the finder 22. When the pseudo focal length is increased to 70 mm, the electric magnet 40 is energized, the locking claw 36 rotates clockwise against the urge of the spring 38 and is engaged with the gear 37b. The gear 31, around which the planetary gear 29 rotates, is thereby fixed, the finder 22 stops shifting, the driving force of the motor 27 is transmitted via the gears 28 and 29 and the gear 30 rotates clockwise. Since the eccentric pin 30a is fitted in the oblong hole 15d, the changeover mirror 16 and the holder 15 rotate counterclockwise on the rotary shaft and the mirror 16 shifts from where indicated by the solid line to where indicated by the broken line.

Since, after rotation, the mirror 16 is urged counterclockwise by the toggle spring 35, the light from the optical system on the telephoto side is intercepted completely. Upon detection of completion of shifting of the position of the mirror 16 by another detection switch (not shown) the electric magnet 40 is deenergized. Thereupon the driving force of the motor 27 is retransmitted to the cam plate 26, and magnification variation of the finder 22 is continued. When the pseudo focal length has reached 35 mm, power supply to the motor 27 is stopped automatically.

Figure 4B:
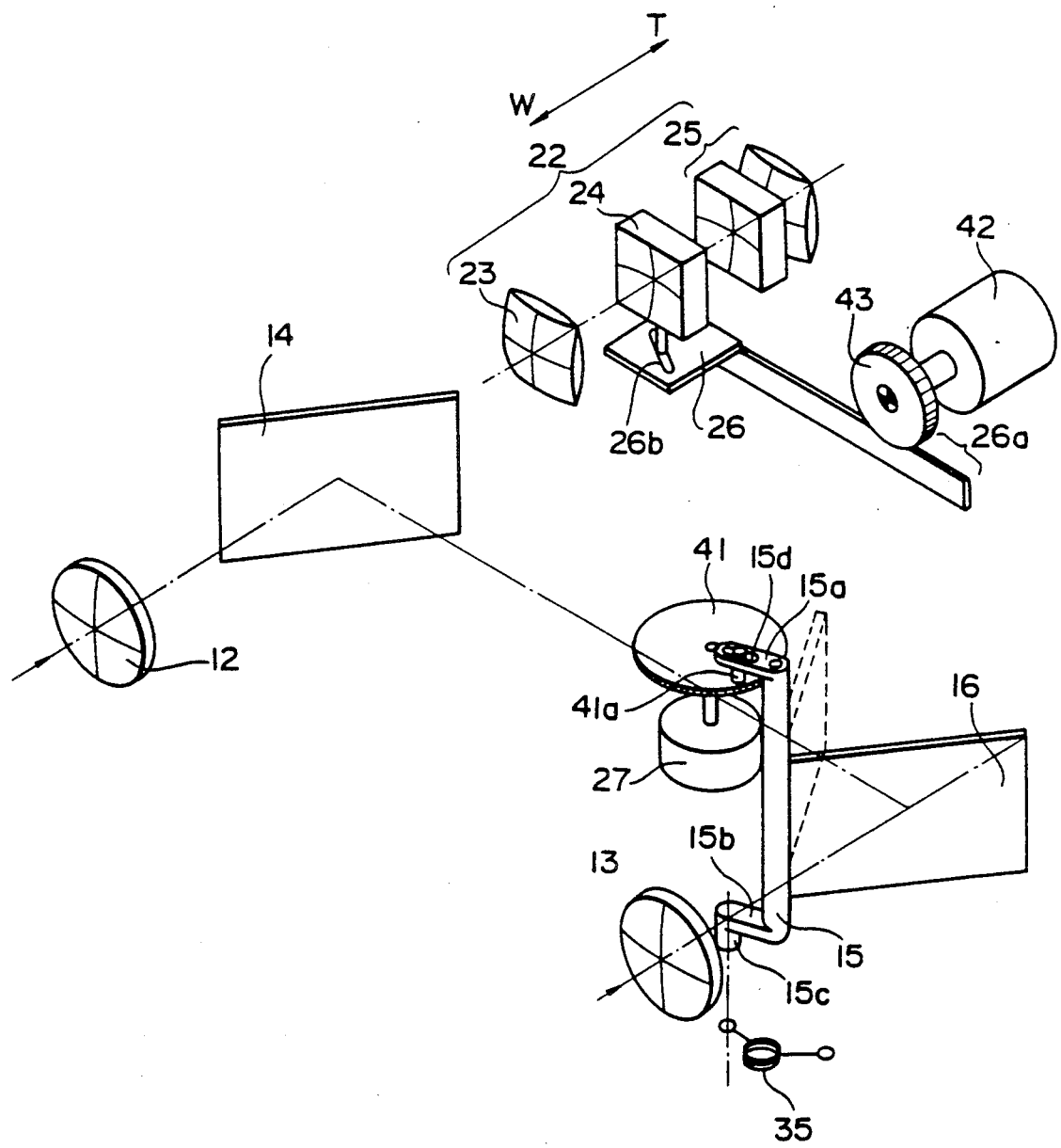
FIG. 4B is a diagrammatic view of a mirror switchover and finder magnification varying mechanism according to another embodiment of the present invention.

Although in the embodiment of FIG. 4A the single motor 27 is used for both mirror changeover and finder's magnification variation, shown in FIG. 4B is an embodiment using two motors 27 and 42. In this embodiment the driving force of the motor 42 is transmitted to the cam plate 26 via a gear 43. This cam plate 26 includes a rack portion 26a which receives the driving force and a cam groove 26b which transmits the driving force to the finder's magnification varying lens 24. The holder 15 holding the changeover mirror 16 has two arms 15a, 15b at both ends thereof, the arm 15b has a pin 15c and engages with one end of the toggle spring 35, the other end of which is engaged with the camera's body. In this composition, same as in the case described above, the mirror 16 is urged to be in the position indicated by either the solid line or the broken line. The arm 15a has formed therein the oblong hole 15d, which has fitted therein an eccentric pin 41a formed on a gear 41. This gear 41 is driven by the motor 27.

Then the operation of the camera of the above condition will be explained. As in the case described above, when the focal length corresponding to the pseudo focal length increases from 35 mm to 100 mm, the magnification varying lens 24 approaches the objective lens 23 to increase the magnification as the motor 42 rotates clockwise. Meanwhile, as the pseudo focal length reaches 70 mm, the motor 42 is stopped with simultaneous start of clockwise rotation of the motor 27. Since the eccentric pin 41a is fitted in the oblong hole in the holder 15, the changeover mirror 16 and the holder 15 rotate on its axis of rotation and the mirror 16 shifted from the position indicated by the broken line in FIG. 4B to that indicated by the solid line. After rotation, the mirror 16 is urged clockwise by the toggle spring 35 and completely intercepted the light from the wide side optical system. After completion of change-over of the mirror 16 (not shown) power supply to the motor is stopped with simultaneous start of power supply to the motor 42. When the pseudo focal length has reached 100 mm, power supply to the motor 42 is stopped automatically.

Next, the process accompanying decrease of the pseudo focal length from 100 mm to 35 mm will be explained. The motor 42 is then driven to rotate counterclockwise. The magnification varying lens 24 moves away from the objective lens 23 to decrease the magnification. When it has reached 70 mm, the motor 42 is once stopped with simultaneous stop of clockwise rotation of the motor 27. Since the eccentric pin 41a is fitted in the oblong hole 15d in the holder 15, the changeover mirror 16 and the holder 15 then rotate counterclockwise on its axis of rotation and the mirror 16 is shifted from the position indicated in the figure by the solid line from that indicated by the broken line. After rotation, the mirror 16 is urged counterclockwise by the toggle spring 35 and the light from the telephoto side optical system is intercepted completely. When completion of changeover of the mirror 16 has been detected by another detection switch (not shown), power supply to the motor 27 is stopped with simultaneous restart of power supply to the motor 42. When 35 mm has been reached, power supply to the motor 42 is stopped automatically.

Figure 5:
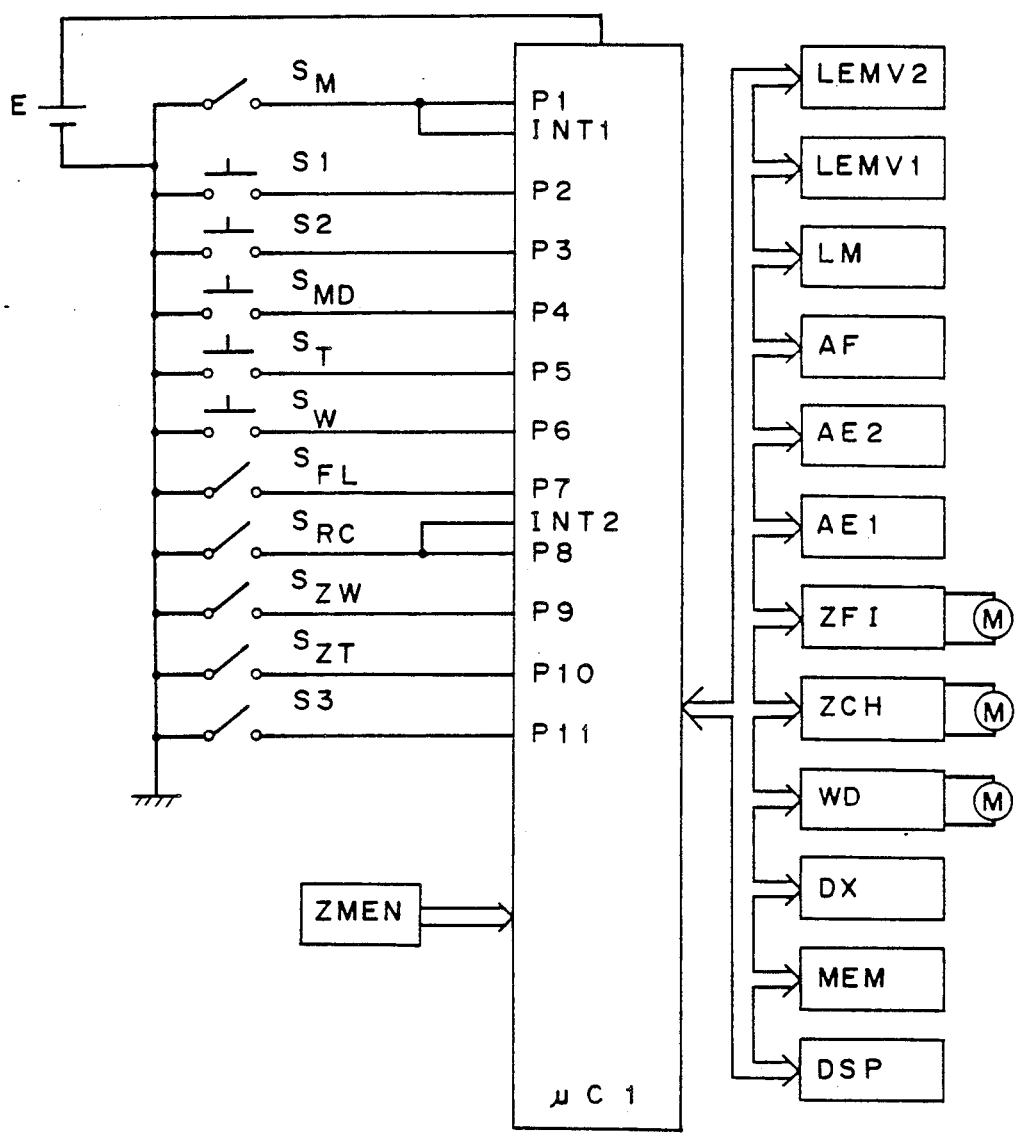
FIG. 5 is a circuit block diagram of the camera as a whole.

FIG. 5 indicates the block composition of the circuit of the camera as a whole. The reference symbol $\mu$Cl indicates a microcomputer used for calculation required for sequence control and determination of proper exposure and LEMV1, LEMV2 are the circuits for adjusting the focus on the wide mode or the telephoto mode selected on the result of the distance measuring circuit AF, respectively, as described below. LM is the photometric circuit for measuring the luminance of the object, AF is the distance measuring circuit for measuring the distance to the object, AE1, AE2 are the exposure control circuits for controlling exposure in the wide mode and the telephoto mode respectively. ZFI is a finder drive circuit for driving the aforementioned zoom finder drive circuit, and this circuit serves to control the driving of the motor M (Motors 27, 42 of FIG. 4). ZCH is the taking lens changeover circuit for switching between the wide side and the telephoto side, and this circuit ZCH serves to drive or control the motor M or the electric magnet (Motor 27 and electric magnet 40 in FIG. 4A and the motor 27 in FIG. 4B).

WD is a control circuit for winding film, and this circuit WD serves to control the driving of the film winding motor M. DX is a reading circuit provided on the film container for reading the code pattern showing the film's sensitivity and the number of frames of film contained, MEM is a memory for storing data such as magnification data for trimming at the time of printing and existence of stereo mode, for instance, located on the cartridge. DSP is a display circuit for driving the aforementioned display panel 6. ZMEN is a zoom encoder for detecting the focal length of the finder zoom optical system. E is a power source.

As memory MEM may be used, besides $E^2$ PROM, also IC card (specification of U.S. Pat. No. 4,728,978) or magnetic disc (specification of U.S. Pat. No. 4,500,183) or magnetic layer on the film (specification of U.S. Pat. No. 4,482,924) or the film within code is printed optically (specification of U.S. Pat. No. 4,583,831, publication of Japanese Laid-Open Pat. No. 126631) etc.

Then explanation will be made of switches. $S_M$ is a main switch (main switch 2 in FIG. 1), which execute an interruption routine INT1 in response to turning ON of this switch $S_M$. S1 is a photographing preparatory switch which is turned ON by the first stroke of pushing down the aforementioned release switch 3, S2 is a release switch 3 which is turned ON by second stroke of pushing down the release switch 3, $S_{MD}$ is a push-type mode changing switch which is turned ON when the mode switch 4 is operated, $S_T$ is a telephoto side switch which is turned ON as the zoom switch 5 is shifted to the telephone side, $S_W$ is a wide side switch which is turned ON as the zoom switch 5 is shifted to the wide side and there is provided a mechanism which prohibits simultaneous turning ON of the switches $S_T$ and $S_W$. $S_{FL}$ is a switch which detects presence of film and is disposed in the plane containing the top of the rails on which the film runs and it is turned ON when film is present. $S_{RC}$ is a detection switch which responds to the closing of the back lid and executes a routine INT2 described below. $S_{ZW}$ is a changeover detection switch showing completion of telephoto mode setting. S3 is a winding detection switch which is turned ON when the film has been wound by one frame.

Then, the camera's operation will be explained with reference being made to FIGS. 6 and on.

Figure 6:
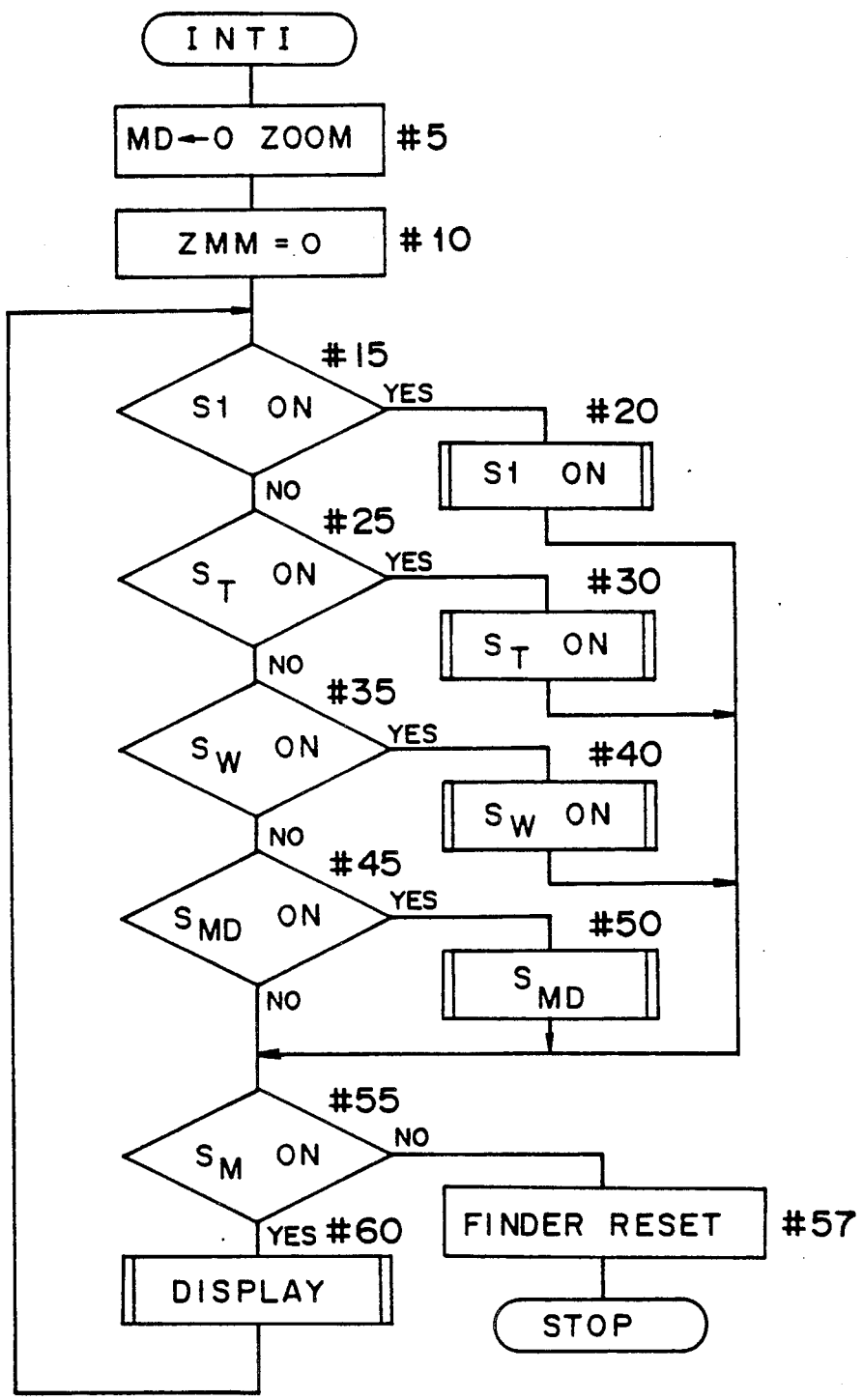

When the main switch $S_M$ is turned ON, the interruption switch INT1 shown in FIG. 6 is executed. In this routine, first a flag MD showing the mode is reset to 0 to set it in the zoom mode (#5). Then the mirror 16 is switched over to the wide side for initial setting with simultaneous setting of a flag ZMM showing the zoom mode to make it in the wide mode (#10). Then, judgment is made whether the photographing preparation switch S1 has been turned ON or not and, if it is ON, a subroutine for S1 ON described below is executed (#20) before proceeding to step #55.

If the photographing preparation switch S1 is OFF, judgment is made whether the telephoto side switch $S_T$ or the wide side switch $S_W$ of the zoom switch is turned ON (#25, #35) and, if either is turned ON, a subroutine $S_T$ ON or $S_W$ ON described below is executed (#30, #40) before proceeding to the step #55. When neither of the zoom switches $S_T$ and $S_W$ on the telephoto side and the wide side is ON, judgment is made whether a mode changing switch $S_{MD}$ is turned ON or not (#45) and, if the switch $S_{MD}$ is ON, the subroutine $S_{MD}$ for changing the mode (#50) is executed (#50) before proceeding to the step #55). If the switch $S_{MD}$ is not ON, the process proceeds to the step #55 without processing of the step #50, in the step #55 judgment is made whether the main switch $S_M$ is turned ON or not, and if it is ON, the display routine is executed (#60) before returning to #15 and the same procedure is repeated thereafter. Meanwhile, when it has been judged that the main switch $S_M$ is OFF, the finder is reset to the initial condition, that is, the focal length (corresponding to the angle of view) is set at 35 mm (#57), and the processing is then stopped.

Figure 7A:
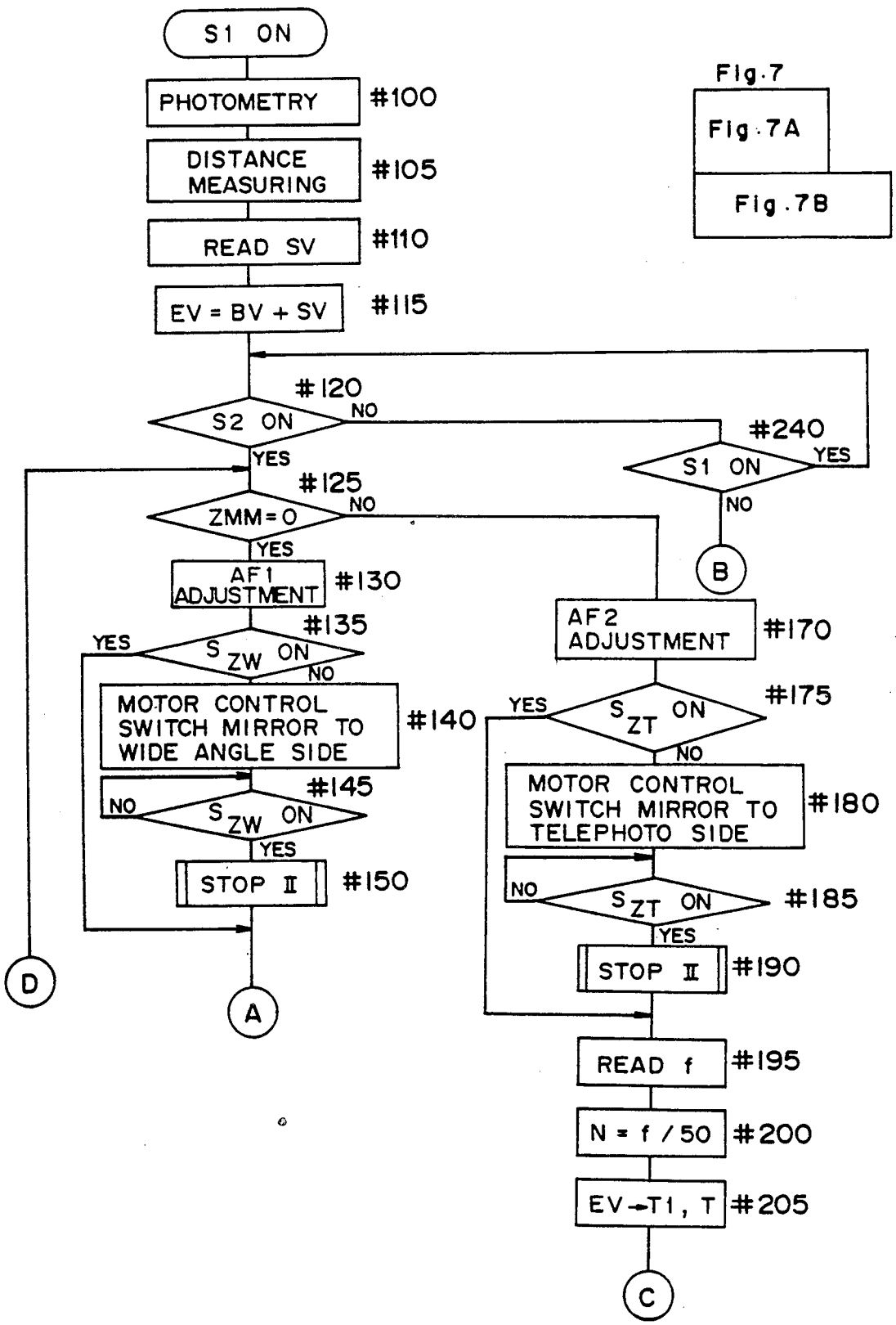
Figure 7B:
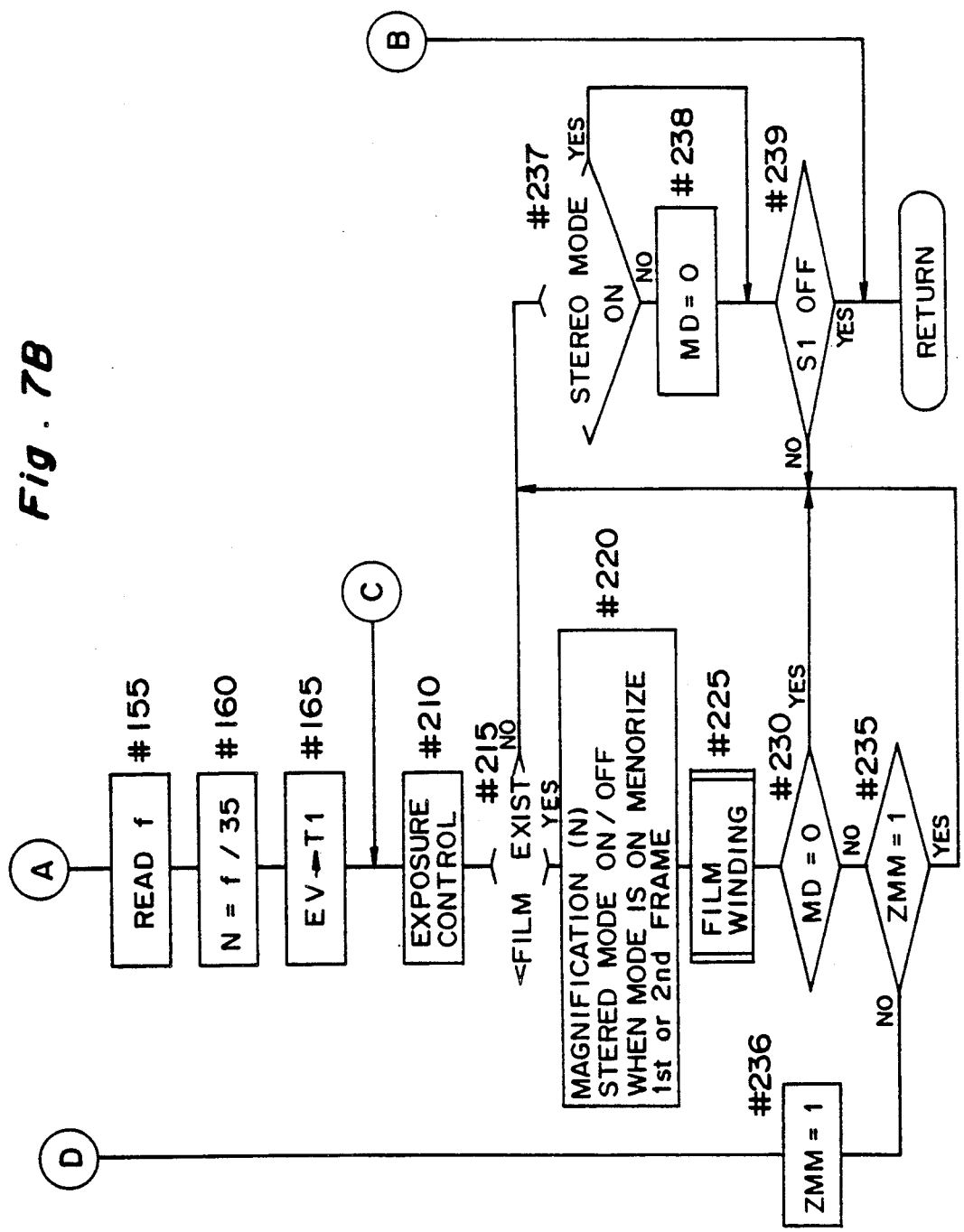

Hereinafter the operation of each subroutine will be explained. FIG. 7 shows the flow chart of the subroutine used when the photographing preparation switch S1 has been turned ON. The operation is as described below. First a photometric value BV is inputted from a photometric circuit LM (#100), then the distance measuring data in inputted from the distance measuring circuit AF (#105), the film's sensitivity SV is read from a film sensitivity reading circuit DX (#110) and the exposure value EV is calculated by the formula BV+SV (#115), then in the step #120 judgment is made whether a release switch S2 is turned ON or not. If it is not ON, whether the photographing preparation switch S1 is ON or not is checked (#240), and if the switch S1 is ON, return to the step #120, if not ON returns to the INT1 routine (FIG. 6).

When the release switch S2 is ON at the step #120, judgment is made to see whether the flag ZMM showing the zoom mode indicates the wide mode (=0) or telephoto mode (#125) and, if the indicated mode is wide, focal point adjustment of the taking lens is done by means of a lens' focal point adjusting circuit LEMV1 on the wide side (AF1 adjustment) (#130).

Then, judgment is made to see whether a changeover detection switch $S_{ZW}$ for detecting changeover of the mirror 16 to the wide side is ON or not (#135) and, if it is not ON, motor control is done for switching the mirror 16 to the wide side by means of a taking lens changeover circuit ZCH (#140). In the embodiment of FIG. 4A this control procedure includes control of the electric magnet 40. After change-over of the mirror 16 and turning ON of the switch $S_{ZW}$ (YES at #145), stop II subroutine for stopping the motor as described below (#150) is done before proceeding to #155. If the switch $S_{ZW}$ is ON at #155, the treatments of #140–#150 are skipped for direct proceeding to #155.

At the step #155 the microcomputer μCl reads the pseudo focal length f set by zooming the finder 22, and a trimming magnification N is calculated by the formula N=f/35 from this pseudo focal length f and the focal length 35 mm of the wide side taking lens 13 used in the existing wide mode (#160). Then the exposure control time T1 is obtained from the exposure value EV determined at the step #115 (#165).

Since the camera of this embodiment stereo photographing, too, is feasible and the stereo effect can be intensified by setting the depth of field of two pictures equal, the shutter used is capable of controlling also the aperture so as to control the depth of field. This shutter is usable as a so-called trapezoidal apertures shutter which lengthens the exposure time alone with the aperture diameter fixed in the process of aperture opening procedure and also as a so-called triangular aperture shutter which operates in the closing direction from the time when the predetermined maximum aperture diameter is reached. Although further detailed description is omitted, at the time of photographing on the wide side it is so designed that the shutter operates as the so-called triangular aperture shutter, and the time from the starting point with the shutter open to the point when the aperture diameter having reached maximum starts changing to the closing direction is taken as T1.

After the step #165 exposure control is done (#210), then judgment is done by the film detection switch $S_{FL}$ to see whether film is available and, film is not available, the next step is #237. At the step #237 judgment is done to see whether the remaining number of film frames is not less than 2, that is, whether stereo-photography is feasible or not. If it should turn out that stero-photography is not feasible, setting for the zoom mode (MD=0) is done forcibly at the step #238. Then, turning OFF of the photographing preparation switch S1 is waited at #239, and upon turning OFF thereof there follows return to the INT1 routine. If 2 frames remain, the magnification N calculated as described above, existence of the stereo mode and, if the stereo mode is ON, whether the picture taken is on the first frame or the second frame of the film is recorded on E² PROM of the memory MEM (#220), and then the subroutine for winding 1 frame of the film is executed (#225).

Then a mode flag MD is checked to detect whether the zoom mode is ON (#230) and, if it is ON (MD=0), #237 is selected as the next step, while, if it is OFF, it is judged that the stereo mode is ON and after proceeding to #235, the flag ZMM indicating the zoom mode to be wide or telephoto is examined. And, if it si in the telephoto mode (ZMM=1), it is judged that photography of the second frame in the stereo mode has been completed (in this embodiment it is so set that the first frame is photographed in the stereo mode and the second frame in the telephoto side), and #237 is selected as the next step.

If at #235 the telephoto side mode is OFF (ZMM=0), 1 indicating the telephoto side is set on the flag ZMM (#236) and after returning to #125, the process proceeds to #170 and photographing is done on the telephoto side thereafter. It is so set that in the stereo mode first the wide side is photographed and then the telephoto side. Thus, in the stereo mode the left and the right-side frames of film can be photographed automatically by a single release operation (pushing down of the release switch 3, re-pushing the release switch 3 is not needed. When the flag ZMM is already erected by the subroutine processing with $S_T$ ON in the aforementioned INT1 routine, proceeding to #170 is done immediately at the step #125. At this step focal point adjustment of the telephone side taking lens 12 is done by means of the telephoto side focal point adjusting circuit LEMV2 (AF2 adjustment) and then checking is done to see whether the mirror 16 has been switched over to the telephoto side by means of a detection switch $S_{ZT}$ (#175), and if this switch $S_{ZT}$ is not turned ON, control of the motor is done for switching of the mirror 16 to the telephoto side by means of the taking lens changeover circuit ZCH in a like manner as described above (#180), stop II processing is done when the same switch $S_{ZT}$ has been turned ON (#190), and the next step is #195. If $S_{ZT}$ is ON at #175, it means that the mirror 16 has switched over to the telephoto side, hence proceeding to #195 is done without processing at #180-190.

At #195, like at #155, the pseudo focal length f is read and then the trimming magnification N is calculated by the formula N=f/50 from this pseudo focal length f and the focal length (50 mm) of the telephoto side taking lens 12 (#200). Then the exposure control time T1+T are obtained from the exposure value EV (#205), this followed by proceeding to #210, and the like procedure is repeated thereafter. The time T1 determined at #205 for the aforementioned so-called trapezoidal aperture shutter is from the moment the shutter starts opening to the moment at which the aperture diameter becomes fixed in the process of opening of the aperture, while the time T is the duration the aperture diameter is kept fixed, and upon lapse of the time T, that is, lapse of the time T1+T from the moment of starting of the shutter, the shutter starts closing.

The pseudo focal length f on the wide side and the telephoto side read at the steps #155 and #195 are what have been selected by zooming of the finder and these become identical at the time of stereo-photographing. In the stereo-photographing the magnification N determined at the steps #160 and #200 are naturally different, and the angle of view of two pictures can be made identical only by trimming and printing at the aforementioned magnification.

The exposure control time T1 (wide), T1 (telephoto) and T may be calculated by the aid of tables prepared on a ROM in advance for the lenses 13 and 12 on the wide side and the telephoto side, respectively.

Now the depth of field in the case of stereo-photographing will be explained.

When a lens f mm in focal length and aperture (F-Number) designated as F are used, the depth of field W is represented by the formula:

$$W = \frac{2 \cdot u^2 \cdot \delta \cdot F}{f^2}$$

where: u is the distance from the object to the front principal point of the lens and, δ is the diameter of the permissible circle of confusion.

When trimming is done to be equivalent to a picture taken by a lens f' in focal length (f'=n·f) with the trimming magnification of n, it means that 1/n portion of the scope of photography is trimmed and it is seen in the same size, hence compensation is made by making the diameter of the permissible circle of confusion δ/n of the original value.

The then depth of field W' is, therefore, $$W' = \frac{2 \cdot u^2 \cdot \delta/n \cdot F}{f^2}$$

where two lenses of focal lengths $f_1$ and $f_2$ are used ($f_1 < f_2$) for stereo-photography with a pseudo focal length of $f_3$ ($f_3 = n_1 f_1 = n_2$, $n_1 > n_2$).

Supposing that photographing is done with the aperture (F-number) of the lens $f_1$ in focal length, the depth of field $W_1$ is as follows when the pseudo focal length is $f_3$.

$$W_1 = \frac{2 \cdot u^2 \cdot \delta \cdot F_1}{n_1 f_1^2}$$

Similarly, when photographing is done with the aperture (F-number) of the lens $f_2$ in focal length, the field of view $W_2$ is as follows when the pseudo focal length is $f_3$.

$$W_2 = \frac{2 \cdot u^2 \cdot \delta \cdot F_2}{n_2 f_2^2}$$

Hence in order to make both depths of field $W_1$ and $W_2$ equal, the condition of $$\frac{F_1}{n_1 f_1^2} = \frac{F_2}{n_2 f_2^2}$$

has to be satisfied. Since $$n_1 f_2 = n_2 f_2 f_3,$$

it is enough to satisfy the condition $$F_1/f_1 = F_2/f_2.$$

That is, the depth of field of both lenses are equal when the photographing is done with the aperture $F_2$ of the lens $f_2$ in focal length reduced to be $(f_2/f_1)F_1(>F_2)$.

Specifically, when the aperture F8 has been determined to be F8 by an automatic exposure control means as a result of photometry under the condition of $f_1 = 35$ mm and $f_2 = 50$ mm as in this embodiment, the depth of field can be made equal for the pictures taken by the use of a lens 35 mm in focal length and that 50 mm in focal length respectively if the exposure is controlled by setting the aperture at F8 for the former lens and the same control is made by setting the aperture at approximately F11.4[(50/35)×8=11.4] for the latter lens.

As to the relation between pseudo focal length and depth of field, detailed explanation is made also in the specification of U.S. Pat. No. 4,768,047.

As mentioned above, when taking a picture with a lens 50 mm in focal length with the shutter opening operation stopped when the shutter has been opened to an aperture (F-number) satisfying $F_2 = (50/35) F_1$ ($F_1$ is the F-number, aperture, when a picture is taken with a lens 35 mm in focal length), the depths of field are equal for photographing with lenses 35 mm and 50 mm in focal length if the pseudo focal length is equal. When a picture is taken with a telephoto side lens 50 mm in focal length (hereinafter called 50 mm lens), however, the shutter opening operation is stopped halfway, hence exposure becomes insufficient when the shutter is then shifted in the closing direction right away. At the time of photographing with a lens' focal length of 50 mm, therefore, the shutter is kept open for an appropriate length of time for compensation of the exposure.

Figure 19:
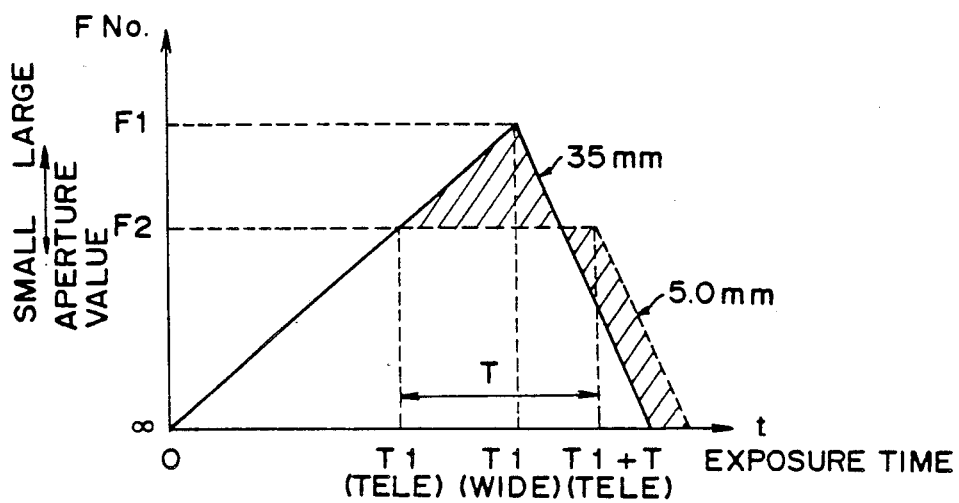
FIG. 19 is an illustratory view showing the opening-closing action of a shutter of this embodiment.

Referring to FIG. 19, the above operation will be specifically described hereinafter.

When photographing with a 35 mm lens, the shutter aperture's waveform is triangular as in the case of a normal shutter combining the function of aperture-stop. That is, the shutter is progressively opened until the time T1 (wide) when the aperture is increased to $F_1$, and is then closed also progressively. Meanwhile, when photographing with a 50 mm lens, the shutter is progressively opened until the aperture is increased to $F_2$ and after this time T1 (telephoto) (the time determined at the step #205) the shutter is kept at that aperture diameter for the time T and it is then shifted to start closing at the time T1 (telephoto)+T. Hence the shutter aperture's waveform when photographing with a 50 mm lens is trapezoidal as shown by the broken line in FIG. 19. The time T for the shutter to be kept open is to be determined for the area of the shadowed triangle in the figure to be equal to the area of the trapezoid also shadowed. The exposure is thereby made equal for photographing with both 35 mm and 50 mm lenses.

The time T for which the shutter has to be kept open to obtain a given exposure EV and the time T1 at which the shutter opening is to be stopped may be determined and stored in ROM in advance so that the exposure EV can be determined at the steps #165 and #205 of FIG. 7.

Figure 8:
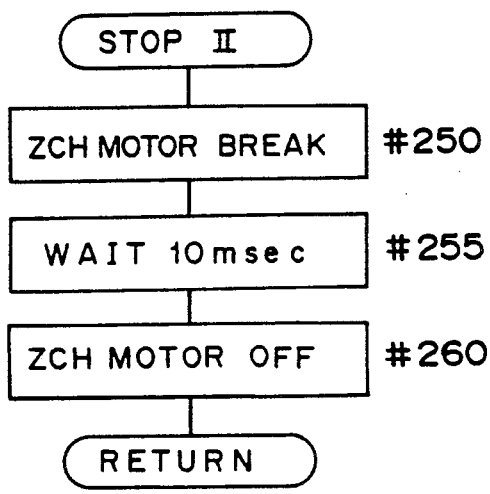
FIG. 8 is a flow chart showing a stop II subroutine in the aforementioned flow.

FIG. 8 shows the stop II subroutine at the steps #150 and #190. To explain stop II subroutine, first brake is applied to the motor 27 or 42 by means of a photographing lens changeover circuit ZCH (#250) for braking for 10 msec. (#250) and then power supply to the motor is stopped (#260) before returning to the routine for S1 ON.

Figure 9:
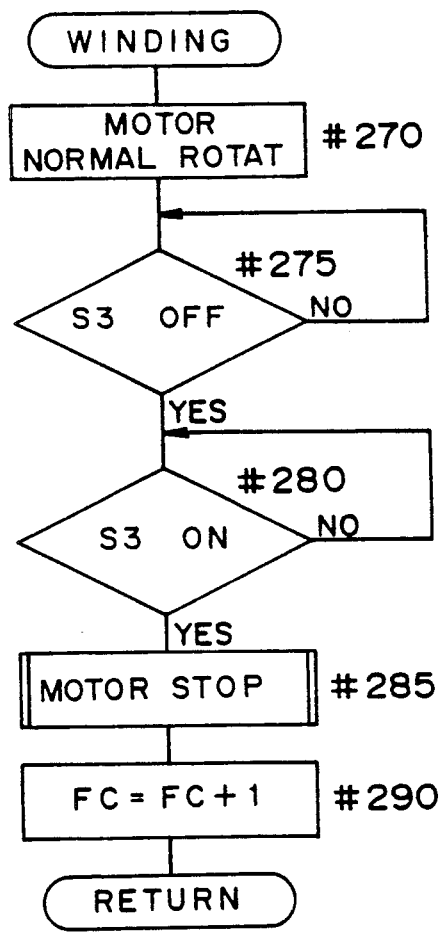
FIG. 9 is a flow chart showing a subroutine for winding film.

FIG. 9 shows the subroutine for winding the film at the step #225 shown in FIG. 7. In this winding control the winding motor is driven forward (#270), then waiting turning OFF of the 1 frame winding detection switch S3 (#275), it is judged that the film has been driven a little if the switch is turned OFF. Thereafter, it is checked to see whether the same switch S3 is turned ON (#280) and if it is ON, it is judged that winding is over and subroutine for stopping the winding motor is executed (#285) and film counter FC is advanced by one increment (#290) before returning to the routine for S1 ON.

FIG. 10 shows the subroutine for stopping the film winding motor at the step #285 shown in FIG. 10. In this subroutine first brake is applied to the winding motor (#300) and after braking for 10 msec. (#305) power supply to the winding motor is stopped (#310) before returning to the film winding subroutine.

Then, referring to FIG. 11, $S_T$ ON subroutine (#30) for the telephone side zooming when the telephoto side switch $S_T$ of the zoom switch 5 is turned ON in the INT1 routine will be explained. In this subroutine the flag ZMM for indicating whether the zoom mode is wide or telephoto is reset to wide (=0)(#320), then 1 is set on a flag FMF indicating the driving direction of the zoom finder 22 to show that it is zooming out (telephoto side)(#325) and zooming of the lens of the finder 22 is thus controlled (#330). Then it is checked to see whether the mode flag MD is indicating the zoom mode (=0)(#335) and, if it is so, the next step is #340 and there the pseudo focal length f is read. Driving of the finder's lens (pseudo zooming) is continued (#345, #350), proceeding to #355 is done when the pseudo focal length f reaches 100 mm or the telephoto side switch $S_T$ is turned OFF (#345, #350), and the stop I subroutine for stopping zooming is executed.

Then, the pseudo focal length f is read (#360), judgment is made whether the read distance f is in excess of 70 mm or not (#365) and, if it is in excess thereof and the zoom mode flag is set to 1 indicating the telephoto mode (#370) before returning to INT1 routine. If the pseudo focal length f is not in excess of 70 mm at #365, returning is done without processing at #370. When the flag ZMM is set to 1 at #370, shifting to the telephoto side takes place upon judgment at #125 of the routine for the photographing preparation switch S1 ON, and changeover to the mirror 16 is done at #180.

If the mode flag MD is not set to 0 at #335, it means that it is in the stereo mode and after proceeding to #375, the pseudo focal length is read, zooming is continued until the pseudo focal length f reaches 70 mm or until the telephoto side switch $S_T$ is turned OFF (#380, #385), and thereupon the stop I subroutine to stop zooming is executed before returning (#390). Thus, it is so arranged that zooming toward the telephoto side cannot be done when the focal length is in excess of 70 mm.

This is because in the stereo mode the left and the right angles of view have to be made equal. In the camera of this embodiment a lens 35 mm in focal length is used as the left lens 13 and that 50 mm in focal length is used as the right lens 12. And the trimming limit according to the film's graininess etc. is set at 2-fold. Hence, by means of pseudo-zooming an angle of view corresponding to a focal length of 35–70 mm can be set for the left lens, while that corresponding to a focal length of 50–100 mm can be set for the right lens. As a result, in the stereo mode the angle of view can be set on the basis of the common portion the left and right angles of view set.

Figure 12:
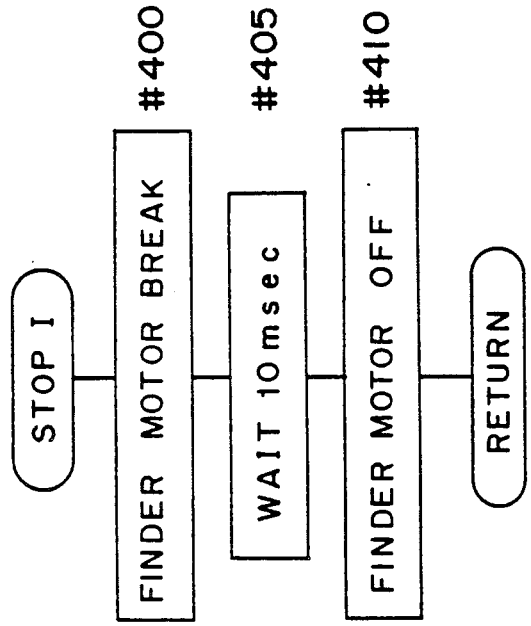
FIG. 12 is a flow chart showing a subroutine for driving a finder's lens in the aforementioned flow.

FIG. 12 shows the subroutine for control of the finder's lens at #330. In this subroutine judgment is made whether the flag FMF indicating the direction of finder zooming is set at 0, that is, whether it is inward (#392). And if the flag is set to 0, the zoom finder driving motor is reversed (#395), and zooming is done toward the wide side before returning. The above operation is done as the microcomputer μC1 outputs to the finder zooming circuit ZFI an instruction to run forward or reverse.

Figure 11:
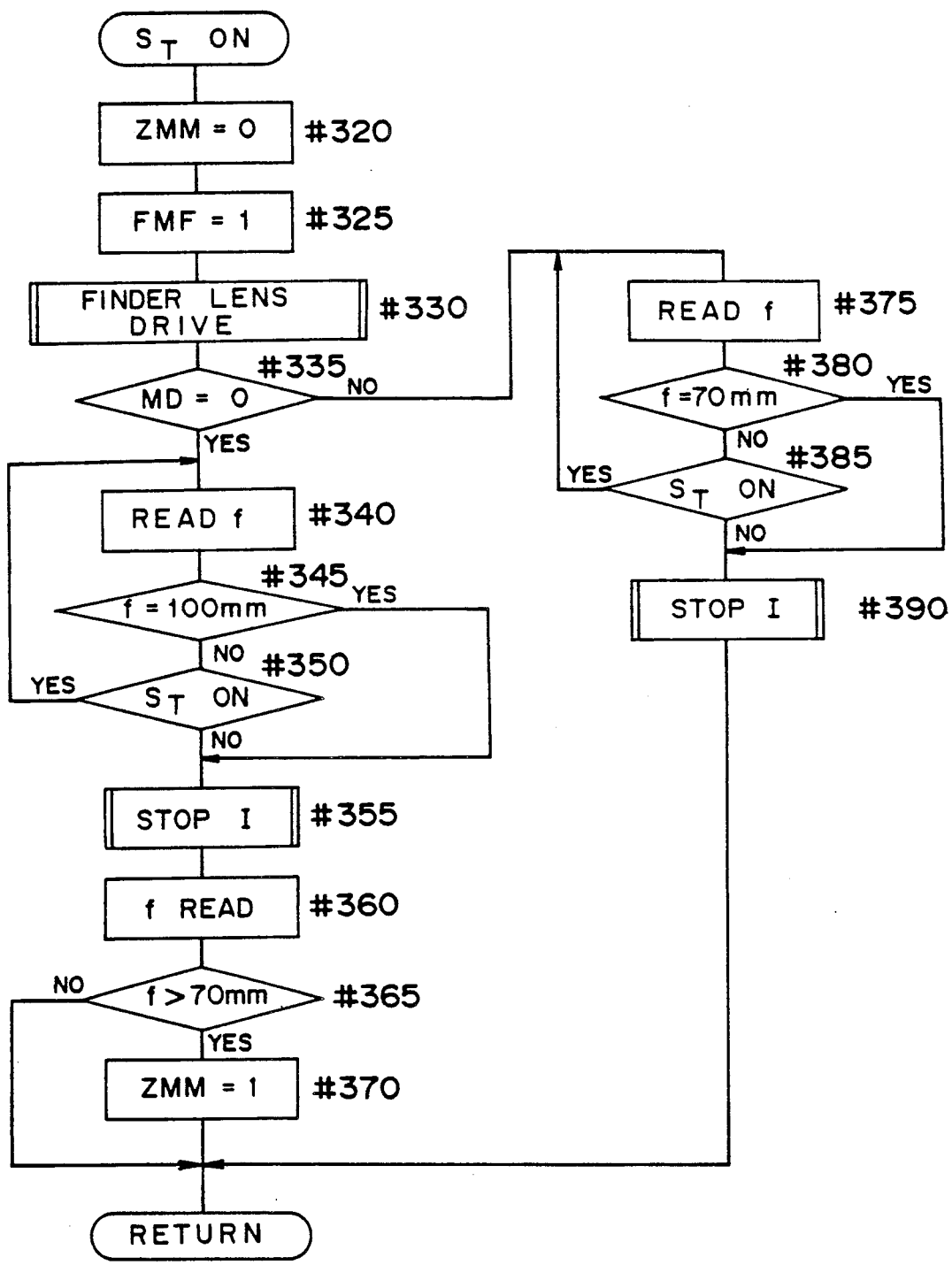
Figure 13:
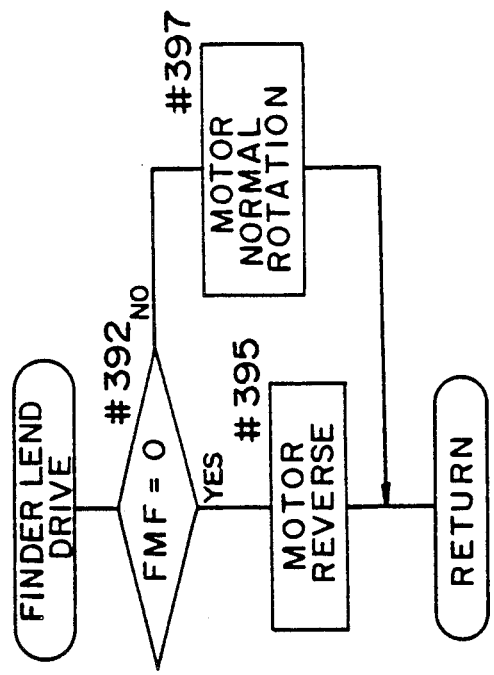
FIG. 13 is a flow chart showing a stop I subroutine.

FIG. 13 shows the stop I subroutine of #355 and #390 of FIG. 11. In this subroutine brake is applied to the motor for driving finder zooming (#400), this is continued for 10 msec. (#405) and then power supply to the motor is stopped (#410) before returning.

Figure 14:
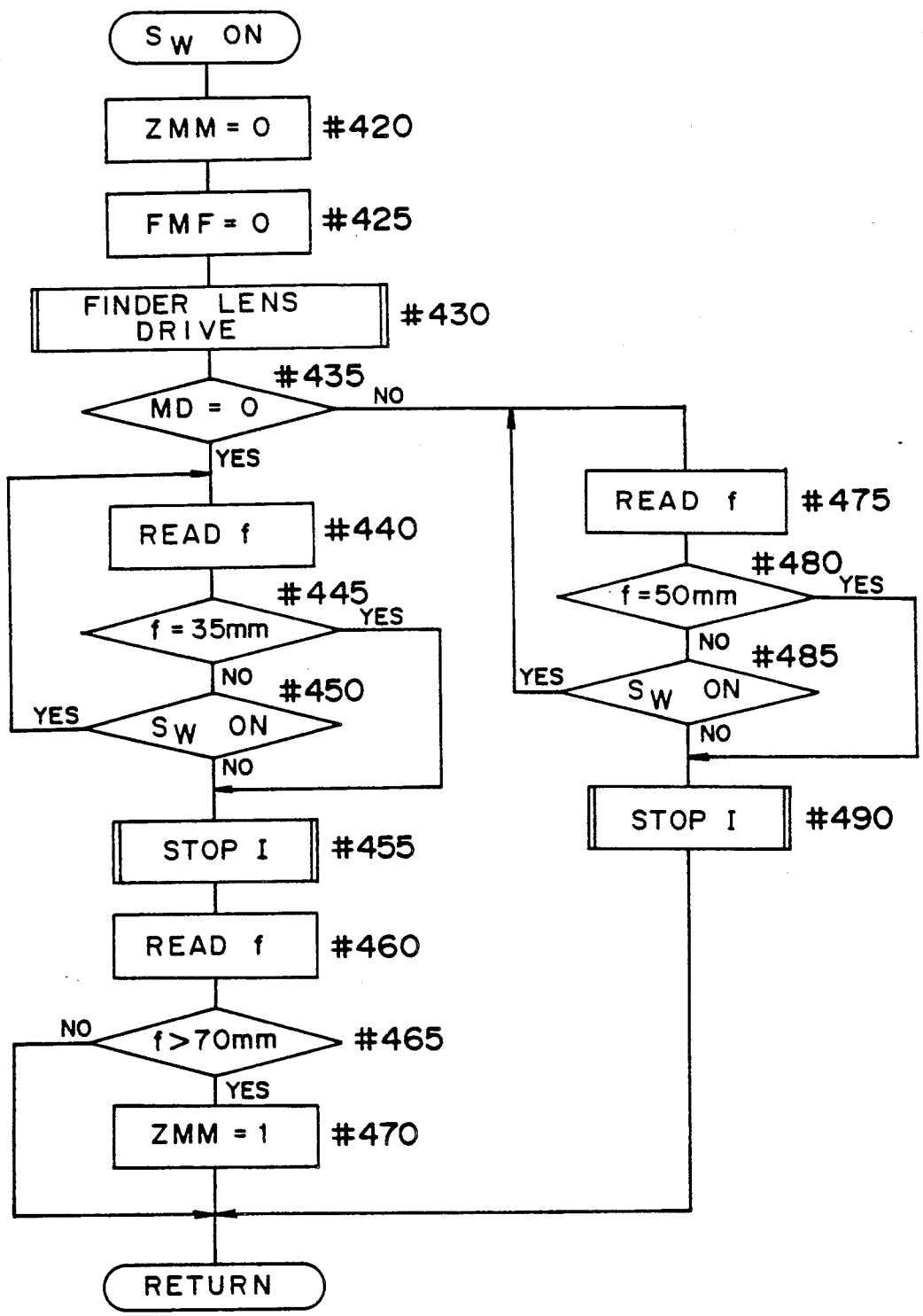

Then, in the INT1 routine of FIG. 6, the subroutine (#40) of $S_W$ON as zooming operation toward the wide side when the wide side switch $S_W$ of the zoom switch 5 is turned ON (#40) will be explained with reference being made to FIG. 14.

First the flag ZMM indicating the zoom mode is set to 0 showing that it is in the wide mode (#420), then the flag FMF indicating the finder zooming direction is reset to 0 showing that it is inward (wide side) and thereafter the subroutine for driving the finder lens is executed (#430). Also, the mode flag MD is checked (#435) and if the flag is set at 0 with the zoom mode set accordingly, the next step is #440 where the pseudo focal length f is read, and zooming toward the wide side is continued until the pseudo focal length f reaches 35 mm or the wide side switch $S_W$ is turned OFF (#445, #450), and the stop I subroutine for stopping zooming is executed when the pseudo focal length has reached 35 mm or the switch $S_W$ has been turned OFF (#455). Then the pseudo focal length f is read (#460) and if it is longer than 70 mm, the zoom mode flag ZMM is set to 1 for the telephoto mode (#465, #470) before returning. If the pseudo focal point is less than 70 mm, returning to the INT1 routine takes place without processing of #470.

If the mode flag MD is not set to 0 at #435 and the mode is stereo, the next step is #475 and there the pseudo focal length f is read and zooming toward the wide side is continued until it reaches 50 mm or the wide side switch $S_W$ is turned OFF and, the stop I subroutine for stopping zooming toward the wide side is executed when the pseudo focal length has reached 50 mm or the switch $S_W$ has turned OFF (#490), this followed by returning to the INT1 routine. Thus, the extent of zooming toward the wide side in the stereo mode is limited to be less than 50 mm. As mentioned above, this is because the maximum angle of view in the stereo mode corresponds to a focal length of 50 mm. Driving of the finder's lens at #430 and the stop I subroutine at #455 and #490 re as described above.

Figure 15:
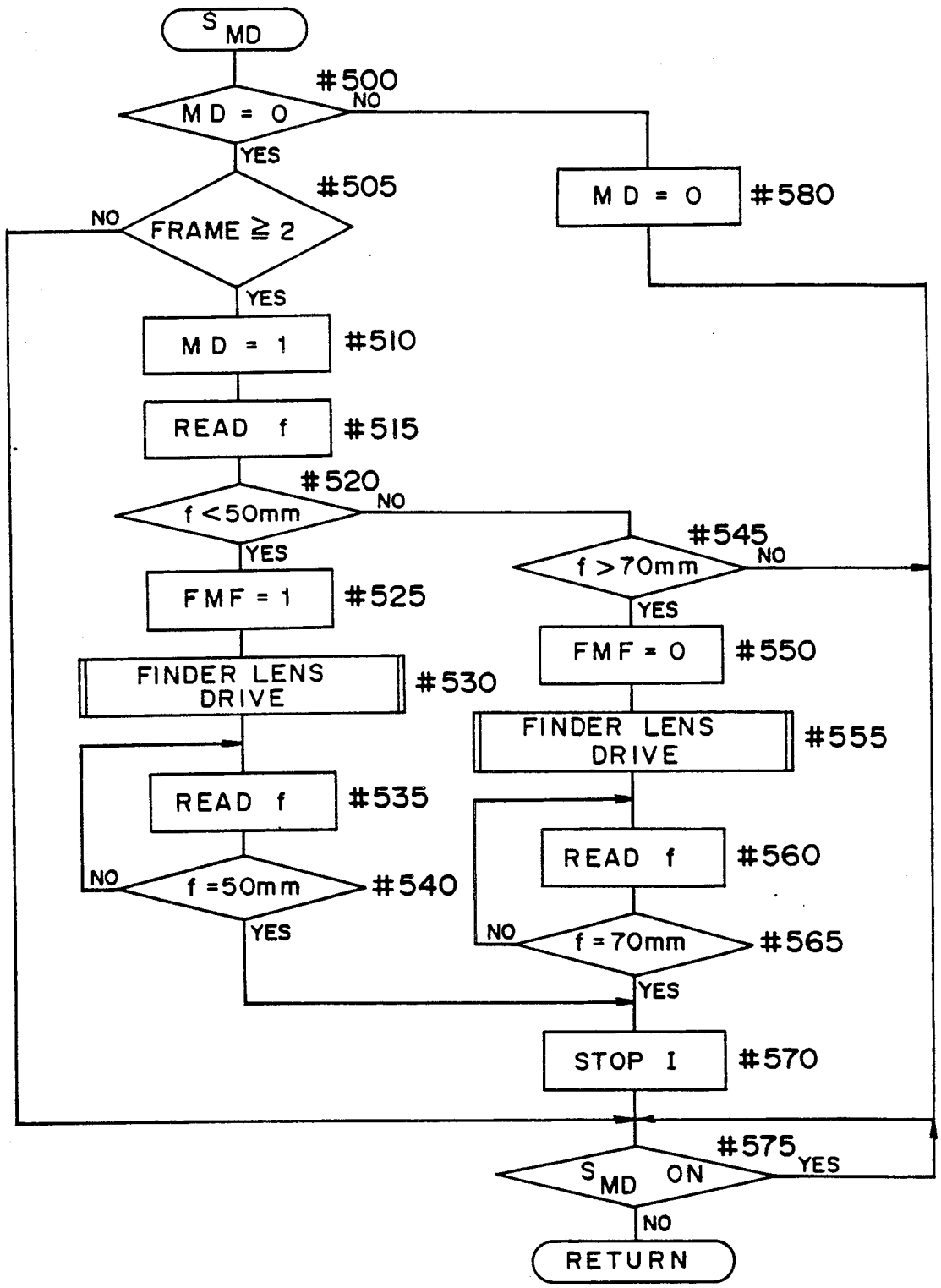

Then, referring to FIG. 15, mode-changing subroutine when, in the INT1 routine shown in FIG. 6, the mode-changing switch $S_{MD}$ (#50) has been turned ON. In this mode-changing subroutine first it is checked to see whether the mode flag is set at 0 and it is in the zoom mode (#500), and, if it is in the zoom mode, it is judged that the mode-changing switch $S_{MD}$ has been manipulated to shift from the same mode to the stereo mode and proceeding to #505 is selected to see whether stereo photography is feasible or not, that is, whether not less than 2 frames of film are available and, if not, the process proceeds to #575 and turning OFF of the mode-changing switch $S_{MD}$ is waited before returning to the INT1 routine. If not less than 2 frames of film are available, #510 is selected as the next step and the mode is changed to stereo by setting the mode flag MD to 1. Then, the pseudo focal length f is read (#515) to see whether it is less than 50 mm (#520) and, if so, the flag FMF indicating the finder zooming direction is set to 1 showing that it is outward (toward telephoto side) and the finder's lens is zoomed toward the telephoto side (#530). This over, the pseudo focal length f is read (#535) and, when it has reached 50 mm, the stop I subroutine for stopping the finder zooming is executed (#570) before proceeding to #575.

When the pseudo focal length is more than 50 mm at #520, the next step is #545 there is checked to see whether the pseudo focal length is in excess of 70 mm. If it is in excess thereof, the flag FMF is set to 0 showing the inward direction (wide side)(#550) and the finder's lens is zoomed toward the wide side (#555). Then, the pseudo focal length f is read (#560) and, when it has reached 70 mm, the stop I subroutine for stopping the finder zooming toward the wide side is executed (#570) before proceeding to #575. When the pseudo focal length is less than 70 mm, the processing of #550–570 is skipped and the next step is #575. When changing to the stereo mode has been made, the finder's lens is driven (pseudo zoomed) automatically to be in the possible zooming range (50–70 mm) in the stereo mode.

When at #500 the mode flag is set to 1 and the mode is stereo, it is judge that the mode-changing switch $S_{MD}$ has been manipulated for changing from stereo mode to zoom mode and the next step is #580, and the mode flag MD is set to 0 showing selection of the zoom mode before proceeding to #575.

Figure 16:
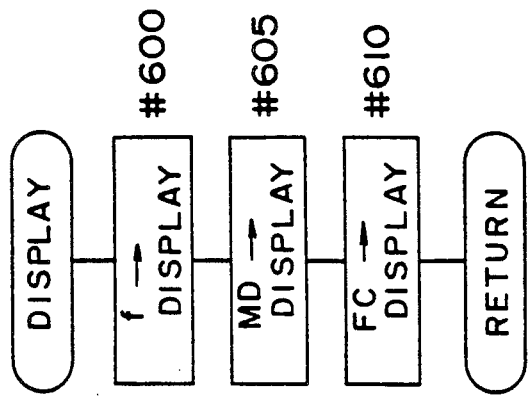
FIG. 16 is a flow chart showing display operation.

Referring to FIG. 16, display subroutine (#60) for the INT1 routine of FIG. 6 will now be explained. In this display subroutine the pseudo focal length read is displayed (#600) and, according to 0/1 setting of the mode flag MD, display is made of zoom mode/stereo mode (#605) and the value of film counter FC is displayed (#610) before returning.

Figure 17:
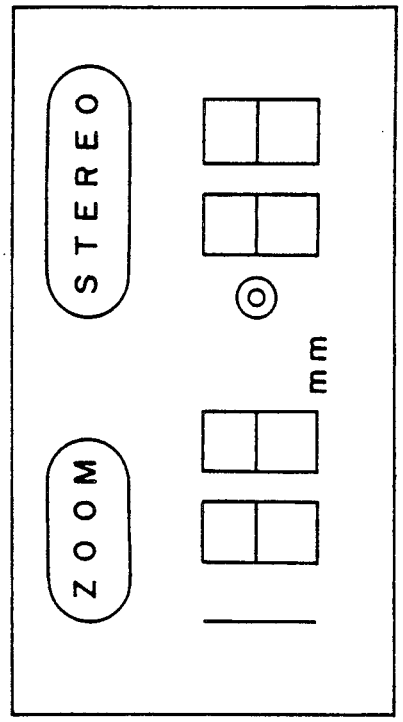
FIG. 17 is a view showing an example of display.

FIG. 17 shows a specific example of way of display in which the mode selected, either zoom or stereo, is displayed as well as the pseudo focal length and the number of frames of film.

Figure 18:
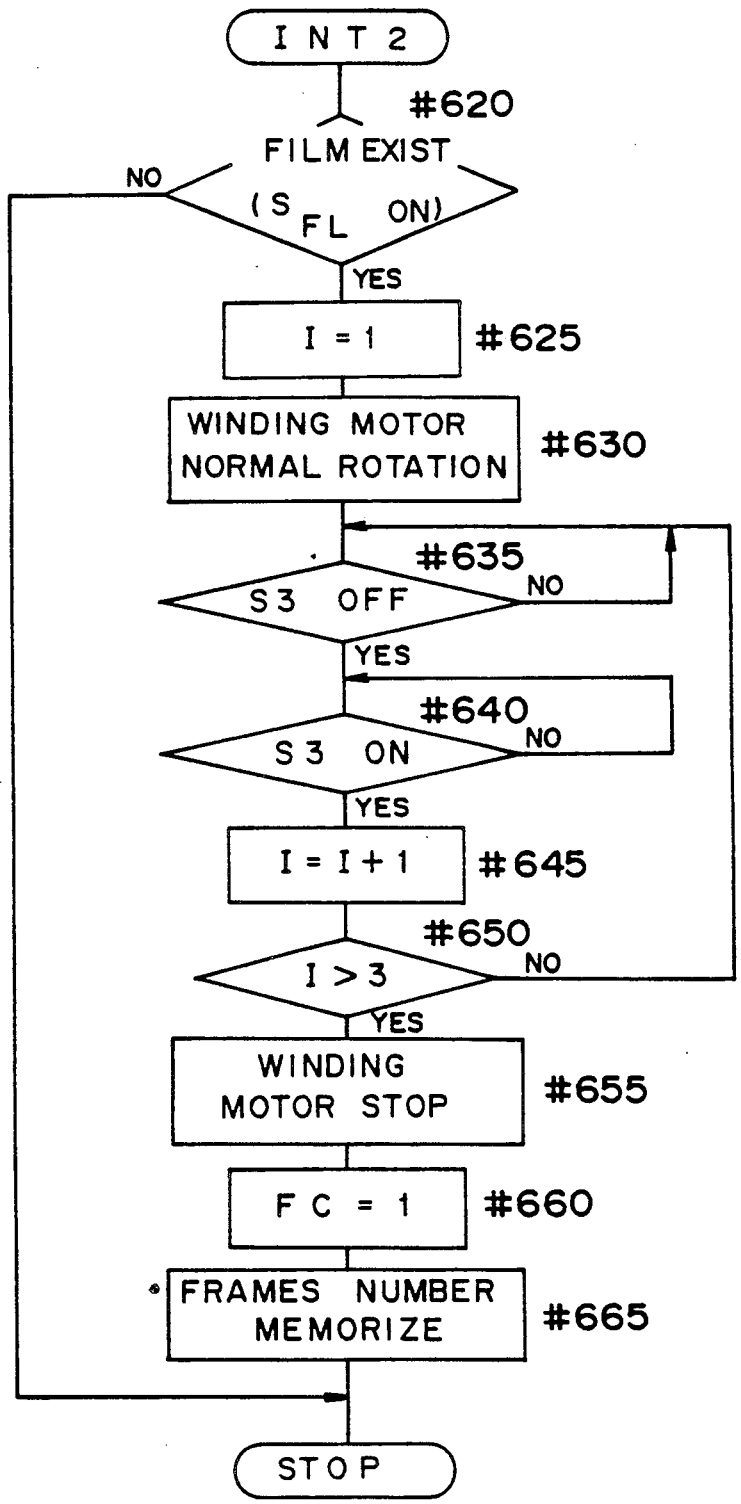
FIG. 18 is a flow chart showing an initial loading operation when the camera's back lid is closed.

Then, referring to FIG. 18, the routine of interrupting INT2 upon initial loading when the back lid is closed. In this INT2 routine first presence of film is detected by means of the film detection switch $S_{FL}$ (#620) and, when the switch $S_{FL}$ is ON, it is judged that film is present and a variable I is taken as 1 (#625). Then the winding motor is driven forward by means of the control circuit for film winding (#630), turning OFF of the winding detection switch S3 is waited (#635) and, when it is turned OFF, it is interpreted that film has moved a little and there follows waiting for turning ON of the switch S3 (#640), and when it is turned ON, the variable I is increased by 1 increment (#645). Then, it is checked whether this variable I has exceeded 3 or not (#650) and, if not, the same routine is repeated after returning to #635. If the variable I is in excess of 3, the winding motor is stopped (#655), reading of the film counter FC is set to 1 (#660), the number of remaining frames of film is read and memorized (#665) and the initial loading is then stopped. If the switch $S_{FL}$ is OFF at #620, it is judged that film is not available, and the routine is stopped forthwith skipping the procedure of initial loading.

Figure 20:
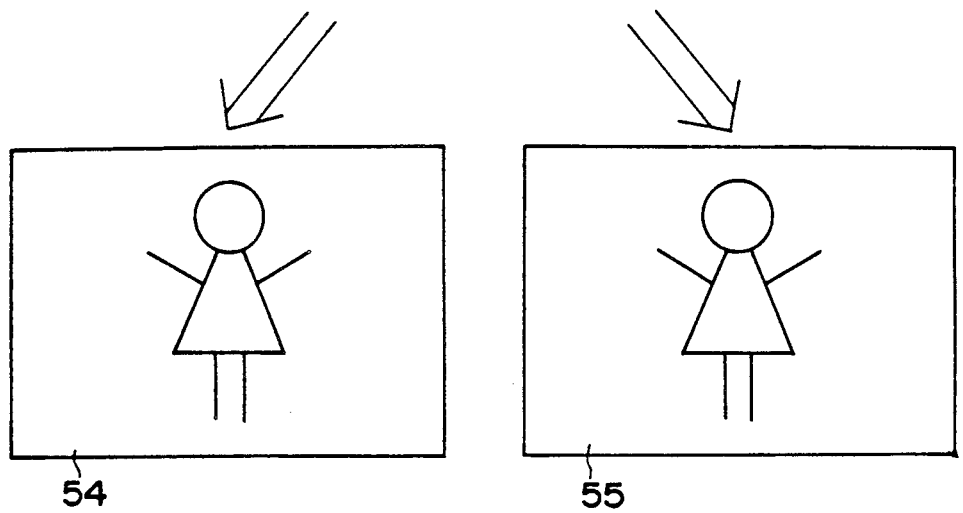
FIG. 20 is a view showing the relative relation between an image on film photographed by the camera of this embodiment and a corresponding printed picture.

Having thus completed explanation about the of a camera of this embodiment, the relative relation working mechanism between the image photographed on the film using the camera of this embodiment and the corresponding printed picture with reference being made to FIG. 20.

In the figure a frame 52 of a reel of film 51 has been photographed using a wide side 35 mm taking lens 13, while the frame 53 has likewise been photographed using a telephoto side 50 mm taking lens. A picture 54 is an enlarged one obtained by trimming and printing the area enclosed by the broken line in the frame 52 being equivalent to one taken by the use of a lens 70 mm in focal length, while another picture 55 is one obtained likewise by printing the area enclosed by the broken line in the frame 53 also being equivalent to one taken by the use of a lens 70 mm in focal length. These pictures 56 and 57 are same in the angle of view and suited for stereo observation by the left and right eyes.

Although in the aforementioned embodiment a shutter combining an aperture-stop was used it may as well be possible to use a shutter aperture from an aperture-stop like the one for an ordinary single-lens reflex camera. By having the aperture-stop and the shutter independent from each other it is largely facilitated to make the depth of field identical for both, left and right, eyes.

In the aforementioned embodiment the wide side lens and the telephoto side lens were provided independently but it may as well be possible to have the taking lens constituted by a main lens and a sub-lens so arranged that the main lens alone can be used for wide mode photography (first taking lens) and the main lens having the sub-lens inserted behind it can be used for telephoto mode photography (second taking lens).

Further, although in the aforementioned example the trimming limit was fixed set at 2-fold, it may as well be possible to arrange for the information showing the trimming limit to be inputted from the film as disclosed in the specification of Japanese Patent Application No. 1-53391. In this case, if the inputted trimming limit n is smaller than the ratio $f_2/f_1$ of the focal lengths $f_1$ and $f_2$ of the two lenses ($f_1 < f_2$), it is so arranged that the trimming limit is set at $f_2/f_1$ regardless of the inputted trimming limit information. It is thereby possible to make the pseudo zoom range always continuous.

Second Embodiment

Referring to FIGS. 21–51, the second embodiment of the present invention will be described in detail.

Figure 21:
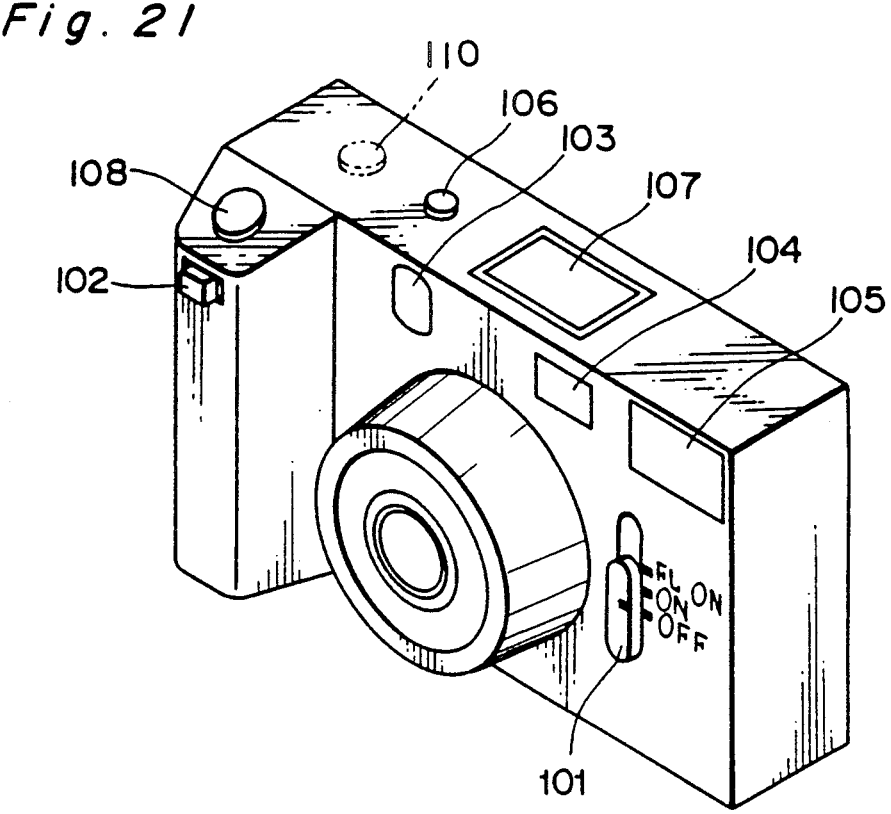
Figure 22:
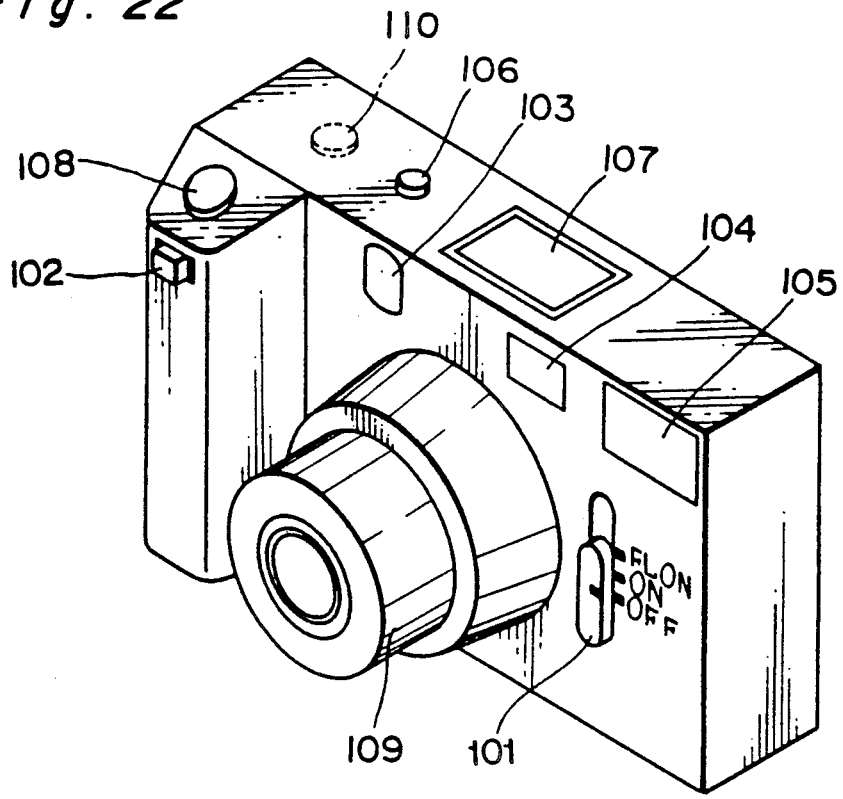

FIGS. 21 and 22 are perspective views of this camera. This camera has its optical system with two selectable focal points 35 mm and 70 mm in focal length, and FIG. 21 shows the wide angle mode with the focal length set at 35 mm, while FIG. 22 shows the telephoto mode with that set at 70 mm.

In the figures reference numeral 101 designates a main switch button for selecting the position ON/OFF of the power source and the position for flash photography. For arbitrary setting of one of these three alternatives the switch button 101 has three selectable positions of "OFF", "ON" and "FL ON" as illustrated. When the "OFF" position is selected, the camera cannot function with the power source off, when the "ON" position is selected, normal photography without flashlight is feasible and when the "FL ON" position is selected, flash photography is feasible.

Although the view finder of this camera is the so-called zoom finder, it is composed of two groups of lenses whose arrangement and zooming setup are shown in FIGS. 23 through 26. Of these groups of lenses, positioned fore is a two-focus changeover optical system 14 with two selectable focal points, while positioned rear is a zooming optical system 15 with its focal length continuously variable until two-fold.

The two-focus changeover optical system 14 is composed of a concave lens 14a and a convex lens 14b. Although the concave lens 14a has its position fixed, the focal length of this optical system 14 varies depending on the position of the convex lens 14b, that is, whether it is at a first position (away from the concave lens 14a) shown in FIGS. 23 and 24 or at a second position (near the concave lens 14a) shown in FIGS. 25 and 26. This two-focus changeover optical system 14 has its focal length shorter when the convex lens 14b is at the aforementioned first position than when it is at the second position. This means that it is the wide angle mode when the convex lens 14b is at the first position and it is the telephoto mode when it is at the second position. Meanwhile the zooming optical system 15 is composed of a convex lens 15a and a concave lens 15b and it is so arranged that these lenses shift from the position shown in FIG. 23 to the position shown in FIG. 24 with the mutual distance being reduced. As the zooming optical system 15 shifts, the focal length gets progressively longer and zooming is done continuously from the wide angle end of the stroke shown in FIG. 23 to the telephoto end shown in FIG. 24.

Figure 23:
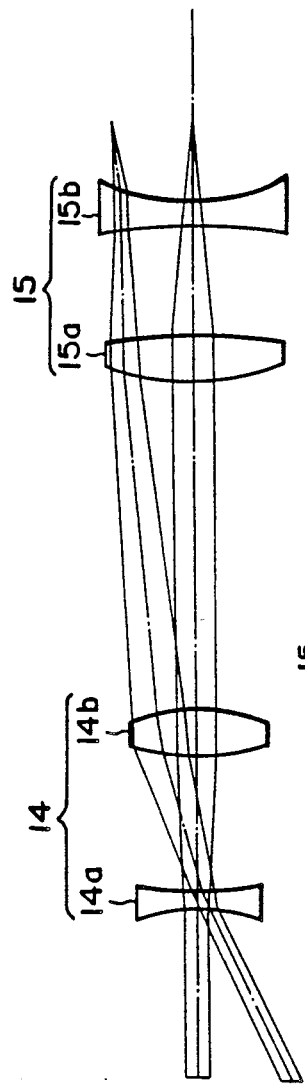
Figure 24:
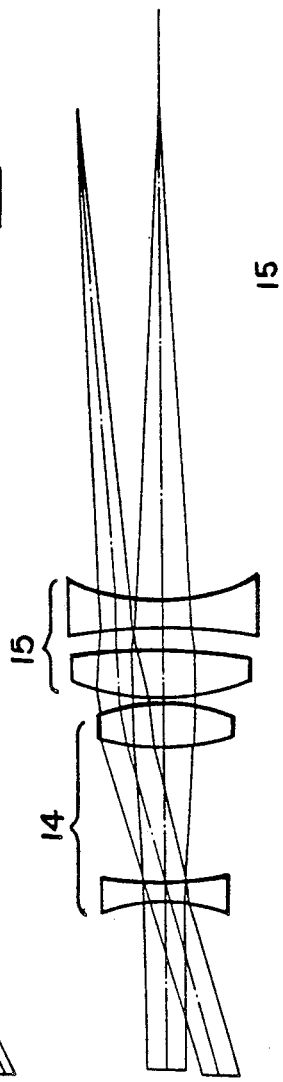
Figure 25:
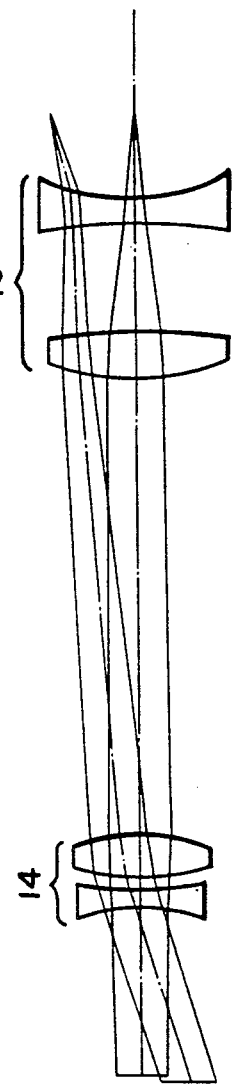
Figure 26:
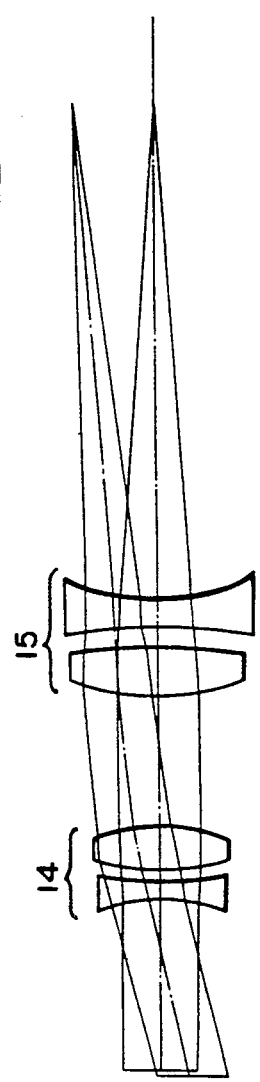

FIG. 23 shows the state in which the two-focus changeover optical system 14 is at the wide angle position and the zooming optical system 15 is at the wide angle end of the stroke, and this corresponds to the case in which the focal length of the taking lens is set at 35 mm. FIG. 24 shows the state having changed from that shown in FIG. 23 in which the zooming optical system 15 alone has shifted from the position shown in FIG. 23 to the telephoto end, and this corresponds to the case in which the focal length of the taking lens is set at 70 mm. FIG. 25 shows the state having changed from tat in FIG. 23 in which the two-focus change-over optical system 14 only has shifted to the telephoto position with the zooming optical system 14 only remaining at the wide angle end, and this, too, corresponds to the case in which the focal length of the taking lens is set at 70 mm although the width of the luminous flux is different from that in FIG. 24. FIG. 26 shows the state in which the two-focus changeover optical system 14 is at the telephoto position and the zooming optical system 15 is at the telephoto end respectively, this corresponding to the case in which the focal length of the taking lens is 140 mm.

Since, as mentioned above, the taking optical system of this camera has two selectable focal lengths of 35 mm and 70 mm, the field of view that can be set in the finder does not agree with the actual taking range, if no compensatory measure is taken. In this camera, therefore, it is so arranged that trimming information about the range to be printed of the exposed film is imparted to the film at the time of photographing so that the taking range roughly agrees with the field of view by printing the range corresponding to the focal length of the finder so that an effect is obtained as if a picture has been taken with a taking lens whose focal length is equal to that of the finder (pseudo zoom effect) when, for instance, the taking lens' vocal length is 35 mm against the finder's focal length of 50 mm or the taking lens' focal length is 70 mm against the finder's focal length of 100 mm.

A zoom switch button for zooming a finder of the aforementioned constitution is designated by reference numeral 102 in FIGS. 21 and 22. This zoom switch button 102 is slidable to the left and the right from the neutral position and, as it is slid, the finder is zoomed toward the wide angle side or the telephoto side continuously with resultant variation of the focal length between 35 mm and 140 mm.

Also in the figure reference numeral 103 designates an AF auxiliary light emitting window used for measuring the distance to a dark object requiring use of flash, 104 is finder's objective lens, 105 is a light emitting part of a flash unit, 106 is an auto-program zoom mode (hereinafter called APZ mode) changeover button, 107 is a liquid display window for displaying various data, 108 is a shutter release button and 109 is a movable lens barrel respectively. The APZ mode is a mode in which the combination of the magnification of the pseudo zooming and the taking lens' focal length (that is, the pseudo focal length) is selected automatically according to the object distance so that the proportion of the object to the range of photography, that is, the size of the object when printed is substantially constant even when object distance varies due to movement of the object, and the APZ mode changeover button 106 is for arbitrary switching between this APZ mode and the ordinary photographing mode. By selecting the APZ mode photographing can be done with the proportion of the object to the print to be substantially constant without operating the zoom switch button 102 even when the object is a child moving toward or away from the camera.

Figure 27:
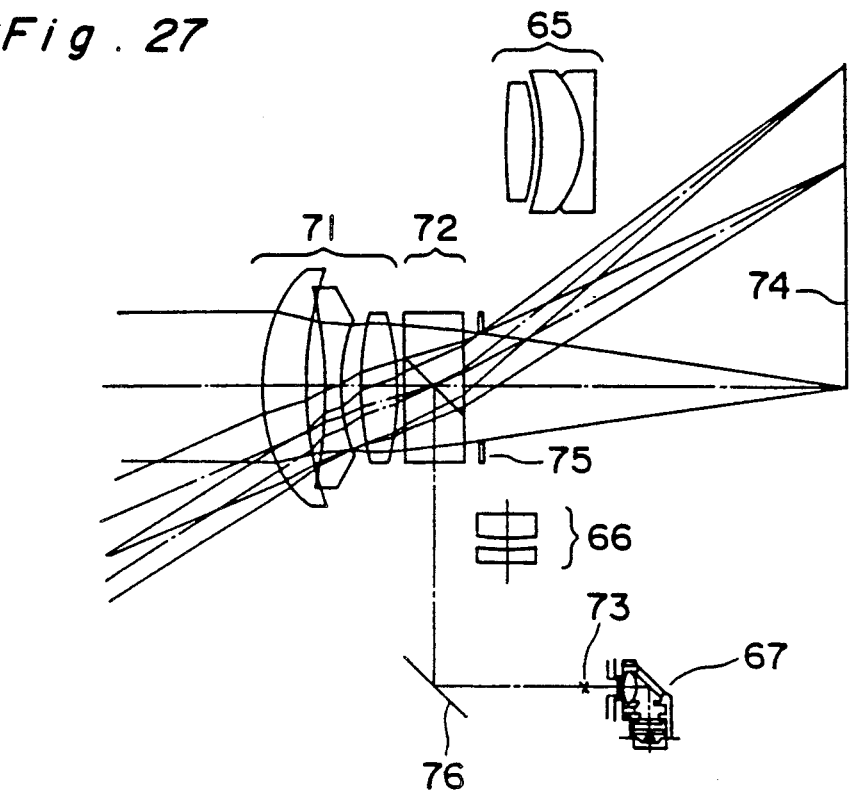

Then, referring to FIGS. 27 and 28, the constitution of the taking optical system will be explained. FIG. 27 shows the constitution of the taking optical system in the wide angle mode. Reference numeral 71 designates a main lens and behind it there are arranged a beam splitter 72 for leading the light having passed the main lens 71 and being reflected on a specular surface 76 to an element for automatic focus adjustment (AF element) 67 and aperture-stop 75. 74 behind it is the film surface and 73 in front of the AF element 67 is a film surface equivalent position. 65 and 66 are tele converters for the taking optical system and the AF optical system branched from this taking optical system respectively, being roughly equal in power.

The tele converter for AF 66 is incorporated into the AF optical system simultaneously with incorporation of the tele converter 65 into the taking optical system. If this tele converter for AF 66 is not used, information within the distance measuring range is increased to give rise to an increased risk of distance measuring error because of increase of the proportion of the distance-measuring range to the taking range when the focal length of the taking lens is changed from that for the wide angle mode to that for the telephoto mode. When it is used, however, there is no such a risk for the proportion of the distance-measuring range to remain almost unaltered even if the taking lens' focal length is changed as mentioned above.

Referring to the block diagram of FIG. 29, the mechanical constitution of this camera will now be explained. As illustrated, this camera comprises a finder unit 52, a film feeding unit 53, a lens barrel unit 61, a flash unit 68 and driving mechanisms therefor.

The finder unit 52 comprises the two-focus changeover optical system 14 and its magnification changeover mechanism 13, and the two-fold zooming optical system 15 and its zooming mechanism 10, 11 and 12. The film feeing unit 53 comprises a film cartridge chamber in which a film cartridge 54 is loaded, a sprocket 55 for counting the number of frames of film wound and a spool 56 for winding the film provided in the film chamber in the camera housing and a film winding/rewinding/loading mechanism 60. The lens barrel unit 61 comprises the taking lens including the main lens 71 and the beam splitter 72, the tele converter lens 65, a lens moving-out mechanism 63, a shutter mechanism 64, a third motor 77 for driving the lens moving-out mechanism 63 and the shutter mechanism 64, the AF element 67 and the tele converter lens for AF 66. The flash unit 68 comprises a flashlight emitting part 70 and a flashlight changeover mechanism 69.

The mechanism for transmitting power to these units will hereinafter be explained.

As power source there are provided in the camera housing a first motor 1 and a second motor 18, The power generated by the first motor 1 is inputted to a first clutch mechanism 51 via a speed-reducing system 50. In the first clutch mechanism 51 the output is selectively supplied to either of $P_1$ and $P_2$ by a first plunger 9 for changeover control. This first plunger 9 is so arranged that the plunger shaft is shifted to a predetermined position by application of a positive or negative pulse voltage. When a positive pulse voltage is applied, $P_2$ is selected as the output of the first clutch mechanism 51 for the film winding/rewinding/loading mechanism 60 to be driven, while when a negative pulse voltage is applied, the output of the first clutch mechanism 51 switch to $P_2$ for the magnification changeover mechanism 13 of the two-focus changeover optical system 14 to be driven. To explain the process in greater detail, when the output $P_1$ is selected, the two-focus changeover optical system 14 is shifted to the telephoto position as the first motor runs forward and it is shifted to the wide angle position as the same motor reverses. When with the two-focus optical system 14 at the wide angle position the zooming optical system 15 has shifted from the wide angle end to the telephoto end, the two-focus changeover optical system 14 is set at the telephoto end with simultaneous instantaneous shifting of the zooming optical system 15 to the wide angle end as the first motor is further driven.

The power generated by the second motor 18 is inputted to a second clutch mechanism 58 via a speed-reduction system 57. In the second clutch mechanism 58 the output is selected either $P_3$ or $P_4$ by a second plunger 26 for changeover control. This second plunger 26, like the first plunger 9, is so arranged that the plunger shaft shifts to a predetermined position as a positive/negative pulse voltage is applied. When a positive pulse voltage is applied, P₃ is selected as the output of the second clutch mechanism 58 for the zooming mechanism 10, 11 and 12 of the two-fold zoom finder 15 to be operated, while when a negative pulse voltage is applied, a lens barrel unit 61 is driven by a two-focus changeover mechanism 59 and a flash unit 68 is operated at the time of flash photography. With the output of the second clutch mechanism 58 switch to P₃, the zooming optical system 15 shifts from the wide angle end to the telephoto end as the second motor 18 runs forward, and from the telephoto end to the wide angle end as the same reverses. Meanwhile, when the output P₄ is selected, the taking lens 62 is shifted between the telephoto position and the wide angle position by the second motor 18.

Figure 30:
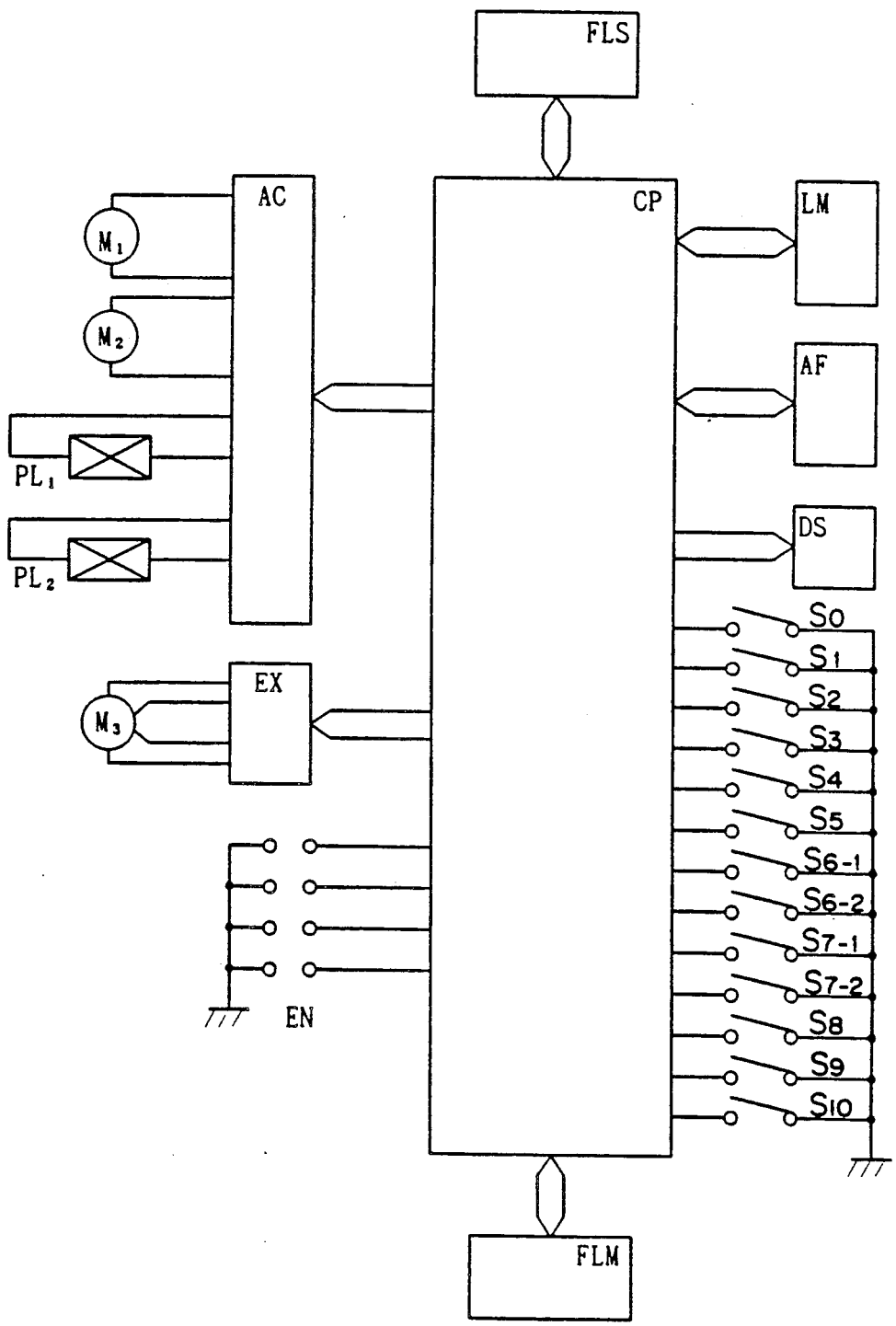

FIG. 30 is a block diagram showing the camera's electric circuitry. The control mechanism of this camera will be explained below with reference to this figure.

CP is a microcomputer for controlling the operation of this camera. FLS represents a flash control unit, which controls light emission from the flash unit by the aid of the microcomputer CP. Also, LM and AF represent a photometric unit and a distance measuring unit respectively and these undertake photometry and distance measurement according to the instruction given by the microcomputer CP and feedback of the measured data to the microcomputer CP. DS represents a display control unit, which controls the data displayed on the liquid crystal display window 107.

$S_0$–$S_{10}$ designate individual switches and the camera's operation is determined by ON/OFF of these switches. $S_0$ is a main switch and the camera is operable when it is ON, $S_1$ is a photometric switch for photometry to be done when it is ON and $S_2$ is a release switch the shutter is releasable when it is ON. $S_3$ is a zoom out switch to shift the finder from the telephoto position to the wide angle position when it is turned ON by shifting of the zoom switch button 102 to the wide angle mode, and $S_4$ is a zoom in switch to shift the finder from the wide angle position to the telephoto position when it is turned ON by shifting of the zoom switch button 102 to the telephoto mode. $S_5$ is a back cover switch which is ON when the back cover of the camera housing is closed, $S_{6-1}$ and $S_{6-2}$ are a telephoto position detection switch and wide angle position detection switch for the two-focus changeover optical system 14, which are turned ON when the two-focus changeover optical system 14 is at the telephoto position and the wide angle position respectively, and $S_{7-1}$ and $S_{7-2}$ are a telephoto position detection switch and a wide angle position detection switch which are turn ON the taking lens is at the telephoto position and at the wide angle position respectively. $S_8$ is a sprocket switch which is turned ON and OFF each time the film has been fed by a given length, $S_9$ is a flash switch which is ON when the main switch button 101 is set to "FL ON" and reports to the microcomputer that it is in the flash photography mode and $S_{10}$ is an APZ switch which is turned ON/OFF each time the APZ mode changeover switch button 106 is operated to set and reset the APZ mode alternately.

FLM represents a film memory set in a film cartridge used for this camera. This memory FLM has recorded therein film information such as trimming limits to be explained later and at the time of photography information such as trimming magnification required for obtaining the pseudo zoom effect at the time of printing is recorded from the microcomputer CP.

Figure 29B:
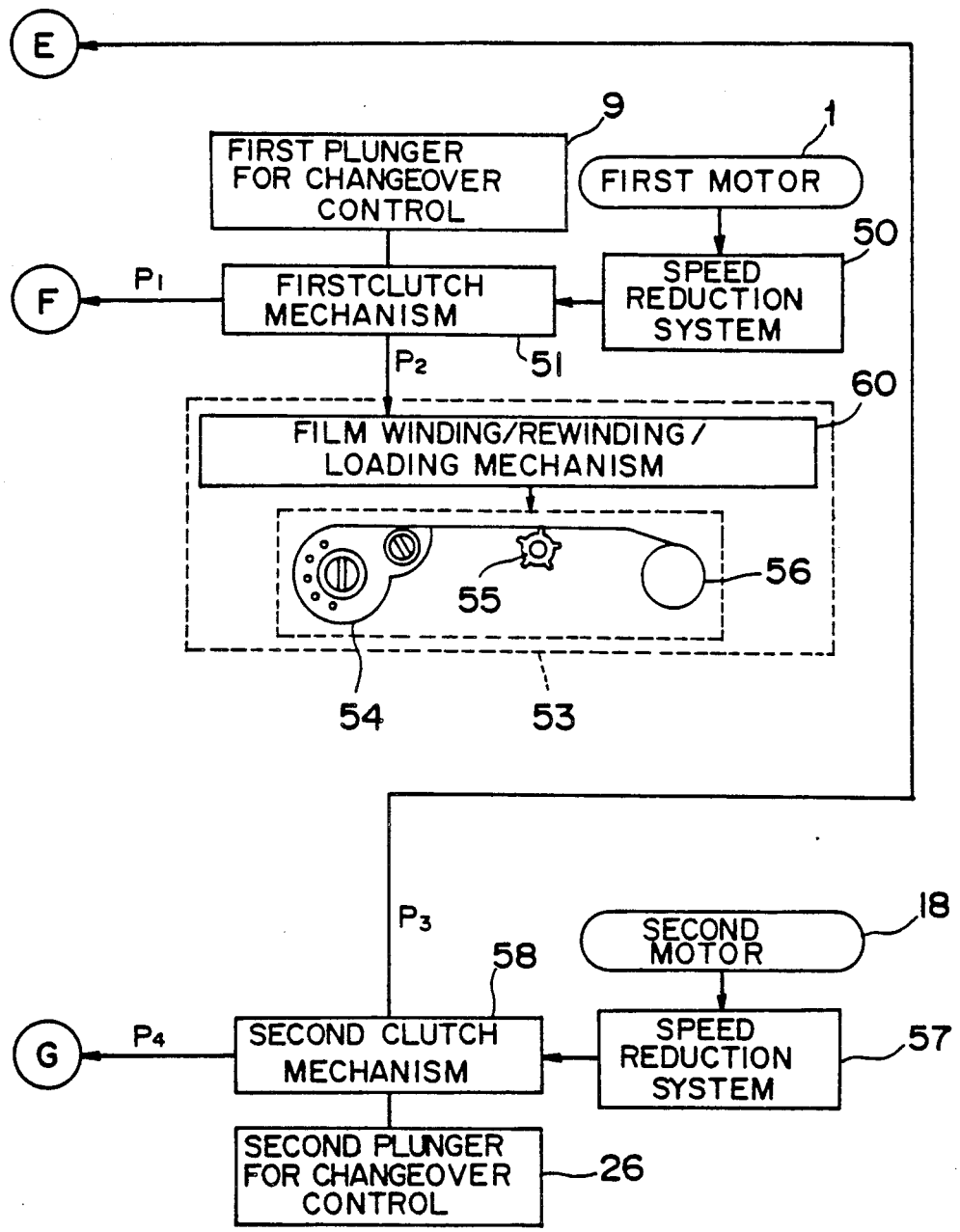

AC is an actuator driving unit which controls a first motor $M_1$ and a second motor $M_2$, and the movement of a first plunger $PL_1$ for changeover control and a second plunger $PL_2$ for changeover control (in FIG. 29 these are designated by the reference numerals 1, 18, 9 and 26 respectively). EX is an exposure control unit which controls a third motor $M_3$ for focusing of the main lens and opening/closing of the shutter. And EN is a zoom encoder for detecting the position of the zooming lens in the finder.

The operation of the camera of the aforementioned composition will be explained using the flow charts shown in FIGS. 31 through 38.

Figure 31B:
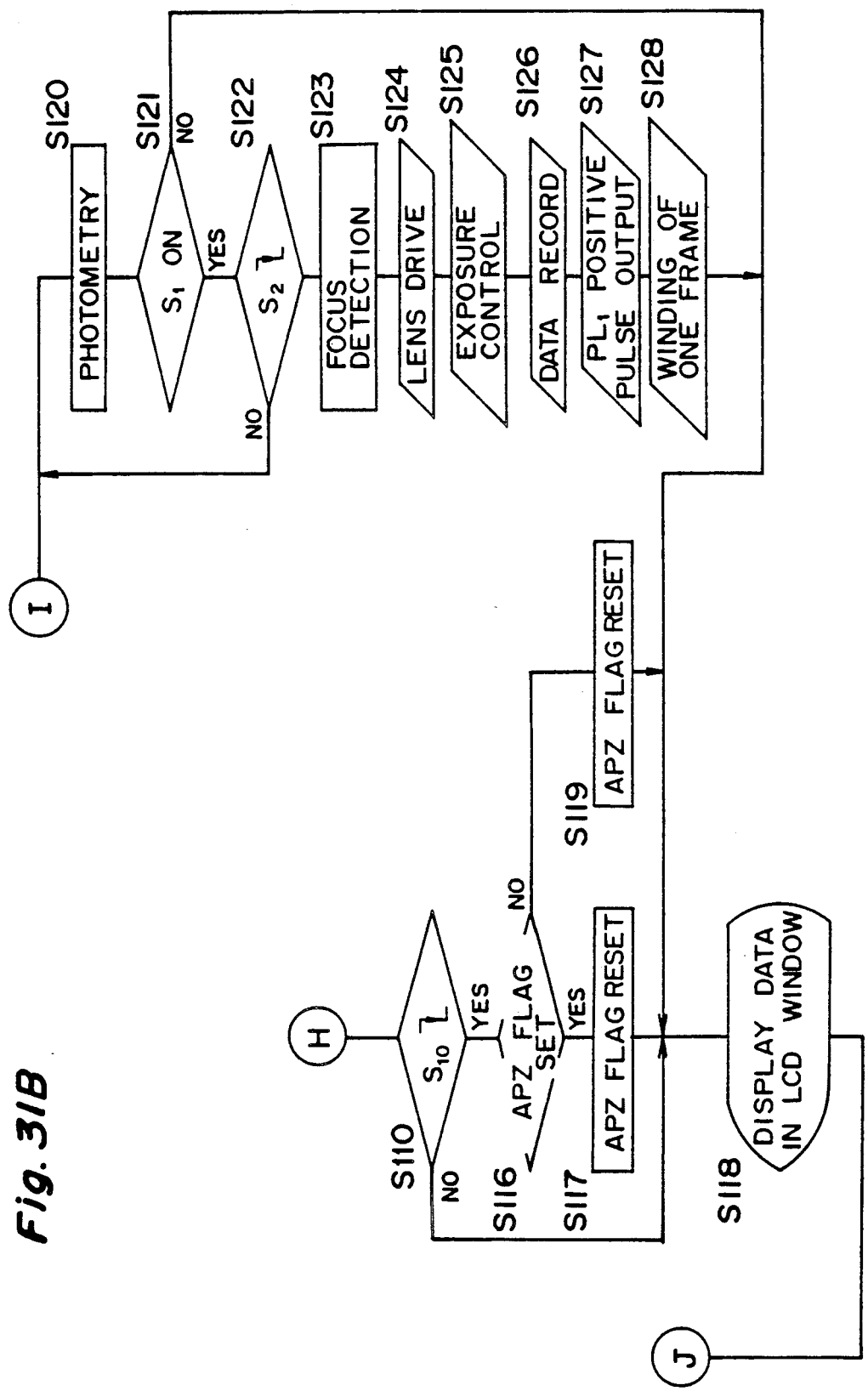

Shown in FIG. 31 is a main routine showing the whole picture of the operation of this camera. At step 101 the camera is stopped waiting for inputting. If something is done to the camera in this state, checking is done at step 102 to see whether the back cover switch $S_5$ has been shifted from OFF to ON or not, that is, the back cover has been closed or not. If the back cover has been closed, loading of a reel of film is done at step 103 according to a film loading routine shown in FIG. 32. In any other case, checking is done at step 104 to see whether the main switch $S_0$ is ON and the shutter release is feasible of not. If the main switch $S_0$ is OFF or a release inhibiting flag is set, display of the main power source OFF is made in a liquid crystal display window 107 at step 106 (FIG. 21), this followed by returning to the step 101 where inputting is waited again.

Meanwhile, when shutter release has been judged to be feasible at the step 104, display of the main power source ON is made in the liquid crystal display window 107 at step 105, this followed by checking to see whether a photometric switch $S_1$ has been shifted from OFF to ON (step 107). If there is no change about the position of the photometric switch $S_1$, checking is then done at step 108 see whether the zoom out switch $S_3$ has been turned ON or not and, if not, judgment is made at step 109 whether the zoom in switch $S_4$ has been turned ON or not. If both switches are OFF, that is, if the zoom switch button 102 is not operated, checking is done at step 110 to see whether any change has been made about the position of the APZ switch $S_{10}$.

Figure 34B:
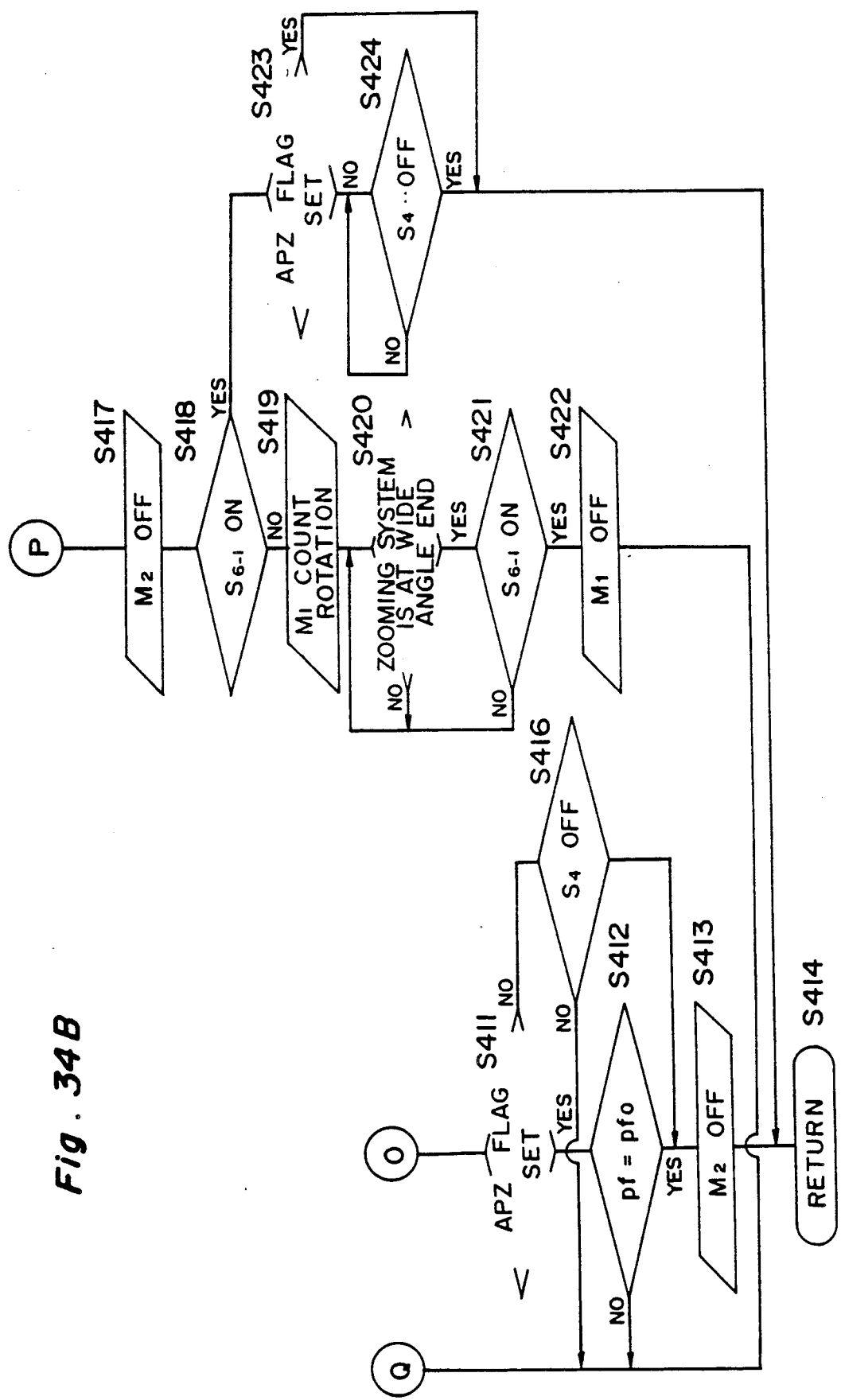
Figure 35:
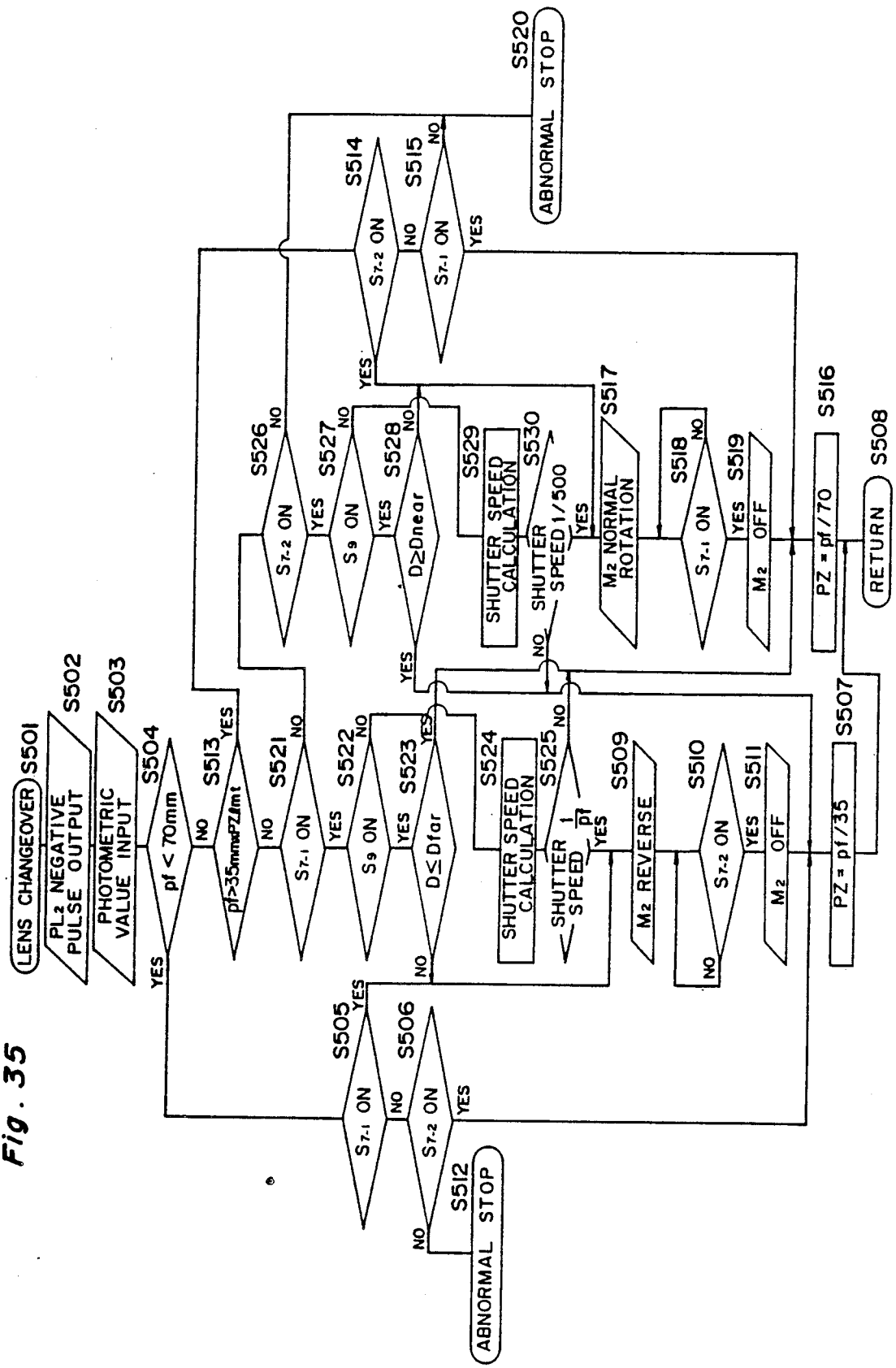

When judgment has been made at step 108 that the zoom out switch $S_3$ is ON, this means that the photographer has intentionally selected photography in the wide angle mode. Hence, if the APZ mode is set, first the APZ flag is reset at step 111 to release the mode. Then, at step 112 zooming out for changing the finder's focal length from that for the wide angle mode to that for the telephoto mode is done according to the flow chart of FIG. 33. Meanwhile, when it is confirmed at step 114 that the zoom in switch $S_4$ is ON, similarly the APZ flag is reset at step 114 and zooming in for changing the finder's focal length from that for the wide angle mode to that for the telephoto mode is done according to the flow chart of FIG. 34. When the zoom out switch $S_3$ or the zoom in switch $S_4$ has been turned ON, the subroutine for shifting of lenses as shown in FIG. 35 is executed at step 113 for determining the combination of the taking lens' focal length and the trimming magnification for pseudo zooming according to the finder's angle of view set by varying the magnification of the finder, and then judgment is made in the step 110 whether any change has been made about the position of the APZ switch $S_{10}$.

As mentioned above, it is checked in the step 110 to see whether the APZ switch $S_{10}$ has been shifted or not. When it is judged that this switch $S_{10}$ has been shifted, setting and cancellation of the APZ mode is done by changeover of the APZ flag position, that is, if the APZ flag is set in the subsequent steps 116, 117 and 119 it is to be reset and, conversely, if it is reset, it is to be set. Display is then made of whether the APZ mode is selected according to operation of the switch in step 118, this followed by returning to the step 101 and waiting there again for inputting.

When it is judged that the photometric switch $S_1$ has been shifted from OFF to ON, a photometric routine shown in FIG. 26 (actually a subroutine including focus detection, shifting of lenses and zooming in/zooming out done in the APZ mode, as described later) is executed and, this over, checking is done to see whether the photometric switch $S_1$ is still ON (step 121). When this switch $S_1$ is found OFF, the photometric value is not held and the state of waiting for inputting is restored after jumping to the step 118. If, conversely, the switch is found kept ON, it is checked at step 122 to see whether the release switch $S_2$ has been shifted from OFF to ON, if no shifting is detected, the steps 120, 121 and 122 are repeated. If the release switch $S_2$ is turned ON, focus detection done in the photometric routine (FIG. 37 or 38) is executed again in step 123 immediately before releasing of the shutter to ensure against misfocusing. And focusing of the taking lens to match the detected focal position by the third motor 77 for exposure control (step 124) and at the same time the shutter is pushed for exposure to be done (step 125). Exposure over, the then trimming magnification is recorded on the film memory FLM by the microcomputer CP in step 126. Further in step 127 a positive pulse voltage is applied to the first plunger $PL_1$ and the output of the first clutch mechanism 51 is thereby shifted to $P_2$ and, after winding of film by one frame at step 128, the state of waiting for inputting is restored once again with the routine returning from the step 118 to the step 101.

Figure 32B:
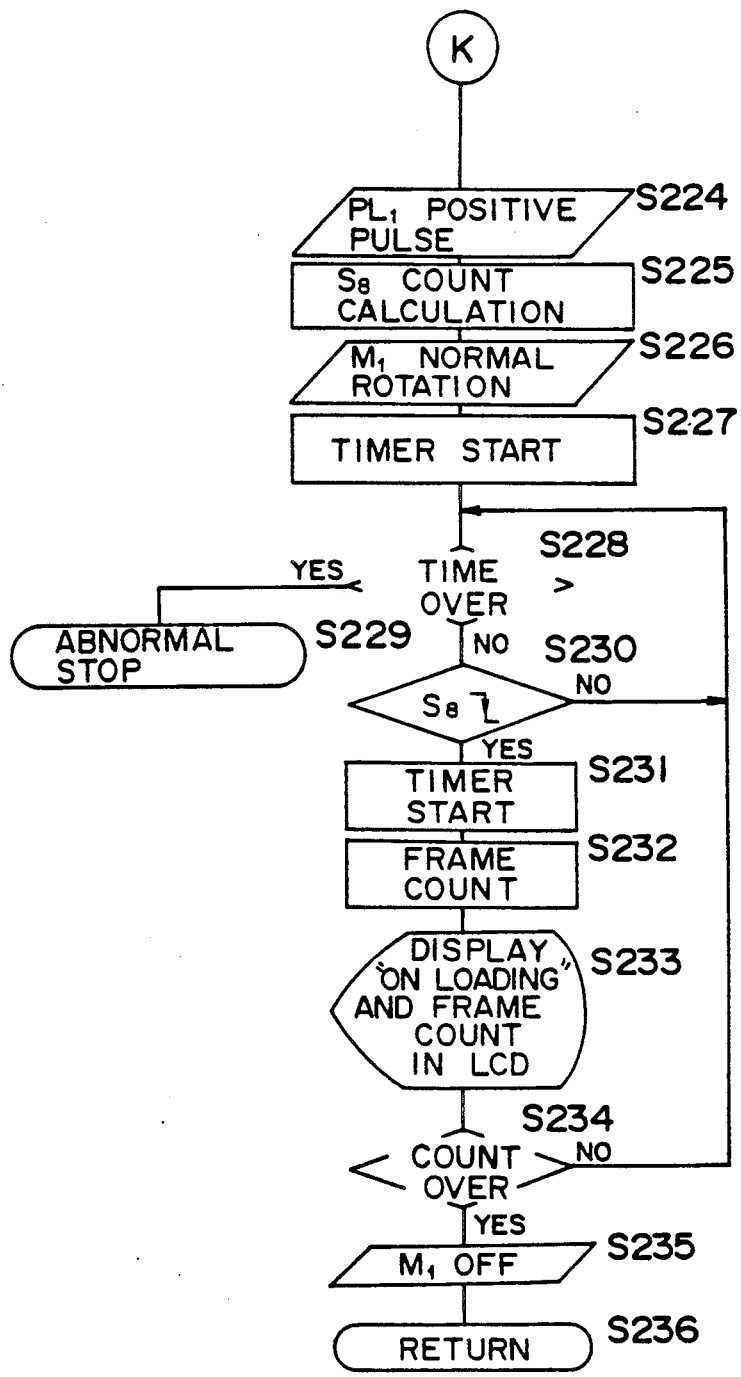

Next, the film loading operation at the step 103 of the main routine described above will be explained in detail with reference to the flow chart shown in FIG. 32. In this flow chart each step of the subroutine is designated by a reference numeral on the order of 200.

When the film loading routine is started, first the microcomputer CP reads from the film memory FLM the information stored in the film such as about the trimming limit (step 202). The trimming limit is a value intrinsic of a given film, meaning the limit to which enlargement may be done without causing deterioration of the print's quality, and is determined by the grit size of film's emulsion. For instance, if this value of a given film is 1.5, a zoom effect is obtainable as if photography is done with a lens of focal length up to 1.5 times the real focal length of the taking lens used and if this value is 3 a zoom effect is obtainable as if photography is done with a lens of focal length up to 3 times the real focal length of the taking lens used.

After this trimming limit has been read at the step 202, it is checked at step 203 to see whether the film loaded is proper for the camera. If the film loaded is a proper one, checking is then made at step 204 to make sure that the film loaded is not exposed by seeing whether information is recorded in the whole memory area of the film memory FLM provided in the film cartridge where recording is made by the camera. If the film loaded is not exposed yet, it is good for photography, hence, to enable releasing of the shutter without fail, a release prohibiting flag is reset (step 205). And, the range of the pseudo focal length Pf which can be set is calculated from the film's trimming limit PZlmt and the focal length of the taking lens (step 206).

Figure 40:
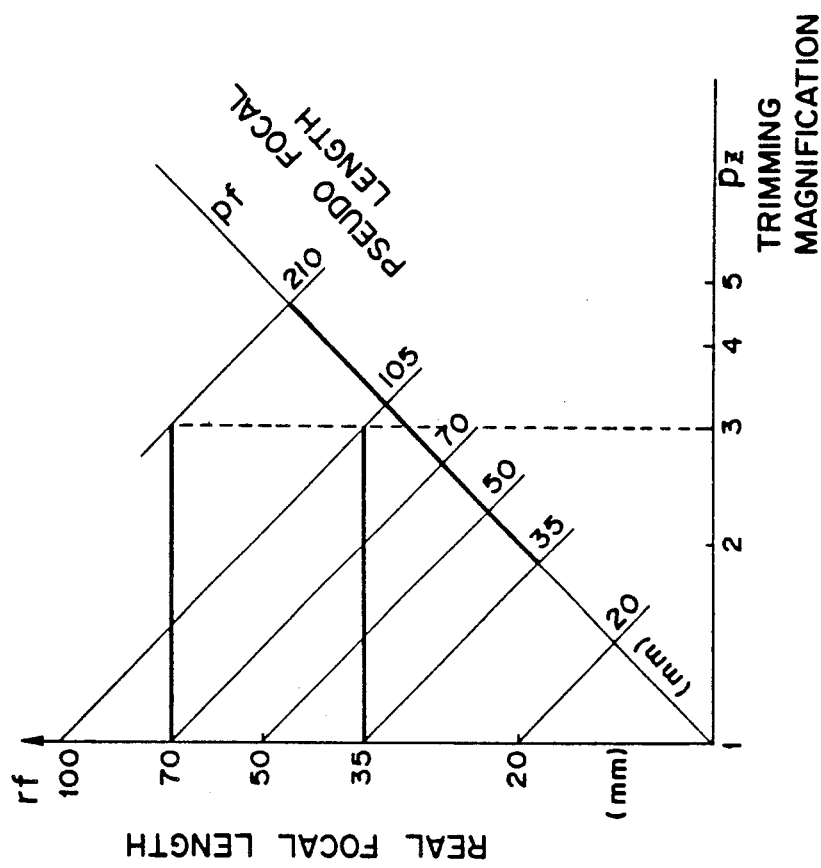
Figure 39:
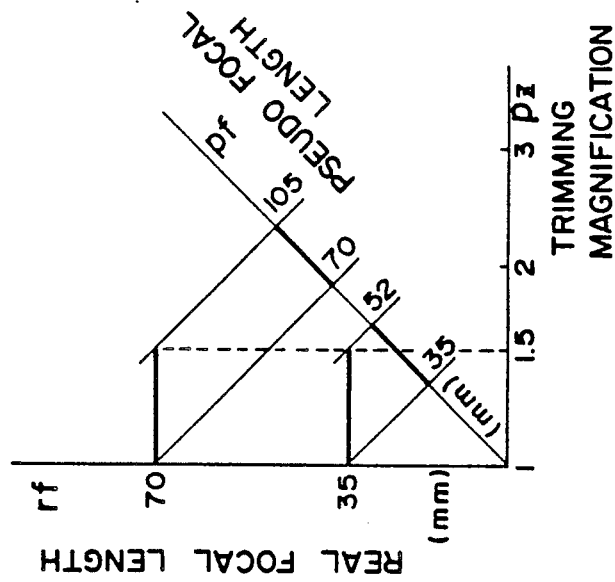

Now, how the range of the pseudo focal length Pf is set will be briefly explained with reference to FIGS. 39 and 40. FIGS. 39 and 40 are graphs showing the ranges of the pseudo focal length Pf when the trimming limit PZlmt is 1.5 and 3 respectively. In both graphs the taking lens' real focal length rf is taken on the axis of ordinate, the trimming magnification PZ on the axis of abscissa and the pseudo focal length Pf on the diagonal axis. Since, as already explained, the focal lengths of this camera's taking lens are 35 mm and 70 mm, the range of the pseudo focal length Pf is either 35-52 mm when the taking lens's focal length is 35 mm or 70-105 mm when it is 70 mm and there is a blank therebetween as seen from FIG. 39. When the trimming limit PZlmt is 3 as shown in FIG. 40, the range of the pseudo focal length Pf is either 35-105 mm when the taking lens' focal length is 35 mm or 70-210 mm when it is 70 mm, hence the overall range of the pseudo focal length Pf in this case is 35-210 mm. Thus, as the range of the pseudo focal length Pf is calculated, the calculated range is displayed in the display window as shown in FIG. 32. The zooming range of the camera's finder is 35-140 mm and this cannot cover whole of the range 35-210 mm of the pseudo focal length Pf. When the pseudo focal length Pf is set longer than 140 mm, therefore, the portion outside the taking range visible in the finder's field of view is masked by the liquid crystal display device according to the trimming magnification ratio of the four corners of the taking range are likewise shown (marked) by the liquid crystal display device to thereby display the taking range.

When the range of the pseudo focal length Pf has been determined, the second clutch mechanism 58 is switched so that the driving mechanisms 10, 11 and 12 of the two-fold zooming optical system 15 can be actuated by applying a positive pulse voltage to the second plunger $PL_2$ at step 208. Then, the then zoom position of the finder is detected by a zoom encoder EN (step 209) and the then trimming magnification PZ is calculated from the finder's focal length and that of the taking lens (step 210). At step 211 the calculated trimming magnification PZ and the aforementioned trimming limit PZlmt is compared with the trimming limit P mt as the intrinsic value of the film and, if the former should be larger than the latter, the second motor $M_2$ is reversed at step 212 for the trimming limit PZ mt to become smaller than the trimming magnification PZ and the zooming optical system 15 is shifted from the telephoto position to the wide angle position to decrease the focal length. When it is confirmed that this zooming has been done without fail (step 213), the steps 209, 210 and 211 are repeated to see whether the trimming magnification PZ has come to be less than the trimming limit PZlmt. Conversely, this means that the zooming optical system 15 is driven until the trimming magnification PZ becomes less than the trimming limit PZlmt. If it is judged at the step 213 that the finder's zooming has not been done correctly, it is judged that something wrong has occurred and the camera's entire functions are stopped at step 214. Meanwhile, when it is confirmed at the step 211 that the trimming magnification PZ has come to be within the range of the trimming limit PZlmt, a positive pulse voltage is applied to the first plunger $PL_1$ so that the first clutch mechanism 51 is switched for the film feeding unit 53 (FIG. 29) to be driven (step 224). When the loaded film is exposed, for instance, half thereof, it is detected from which frame on are unexposed and good for photography by the information from the film memory FLM and on the basis thereof how many times of repeated ON/OFF of the sprocket switch $S_8$ are required for correct loading of the film is detected by calculation as the necessary count at step 225. Then, at step 226 feeding of the film is started as the first motor $M_1$ is started. Then, the timer in the microprocessor CP is started (step 227) and checking is made at steps 228 through 230 to see whether the sprocket switch $S_8$ has been shifted within a predetermined length of time. If it should turn out that the sprocket switch $S_8$ has not shifted within the predetermined length of time, it is judged that something wrong has occurred at step 229 and the entire functions of the camera are stopped. Conversely, if the sprocket switch $S_8$ has been shifted and the number of times thereof is counted, the timer is restarted (step 231), which frame counted from the beginning end of the film is at the exposure position at the moment is determined by calculation (step 232), and that the film is being loaded and its count are displayed in the display window (step 233). Then in step 234 checking is made to see whether the count of shifting of the sprocket switch $S_8$ has reached the number calculated at the step 225 and, if it has not reached yet, the steps 228-234 are repeated until it is reached. When the count has reached the calculated number, the first motor $M_1$ is stopped at step 235 and, loading over, return to the main routine is done for proceeding to the next stage of operation (step 236).

When at the step 203 it has turned out that the film loaded is not a proper one, the release prohibiting flag is set at the step 215. In this case, since the trimming information cannot be read therefrom, the trimming limit PZlmt is tentatively set as 3 (step 216). Then, after calculation of the range of the pseudo focal length Pf on the basis of this PZlmt (step 217) and the range of the pseudo focal length Pf and that the film loaded is not a proper one are displayed (step 218) before film loading is over at the step 219. Even if the film loaded is a proper one, when it has turned out that the film is already exposed, the release inhibiting flag is set at the step 220 and after the pseudo focal length Pf has been calculated from the trimming limit PZlmt at the step 221, the range of the pseudo focal length Pf is displayed as well as that the located film is already exposed (step 222) and film loading is over at the step 223. That the range of the pseudo focal length Pf is calculable even when photography in infeasible is for precluding the risk of information embarrassing the photographer being displayed if inadequate data should be stored in the register for storage of data about the range of Pf.

Figure 33B:
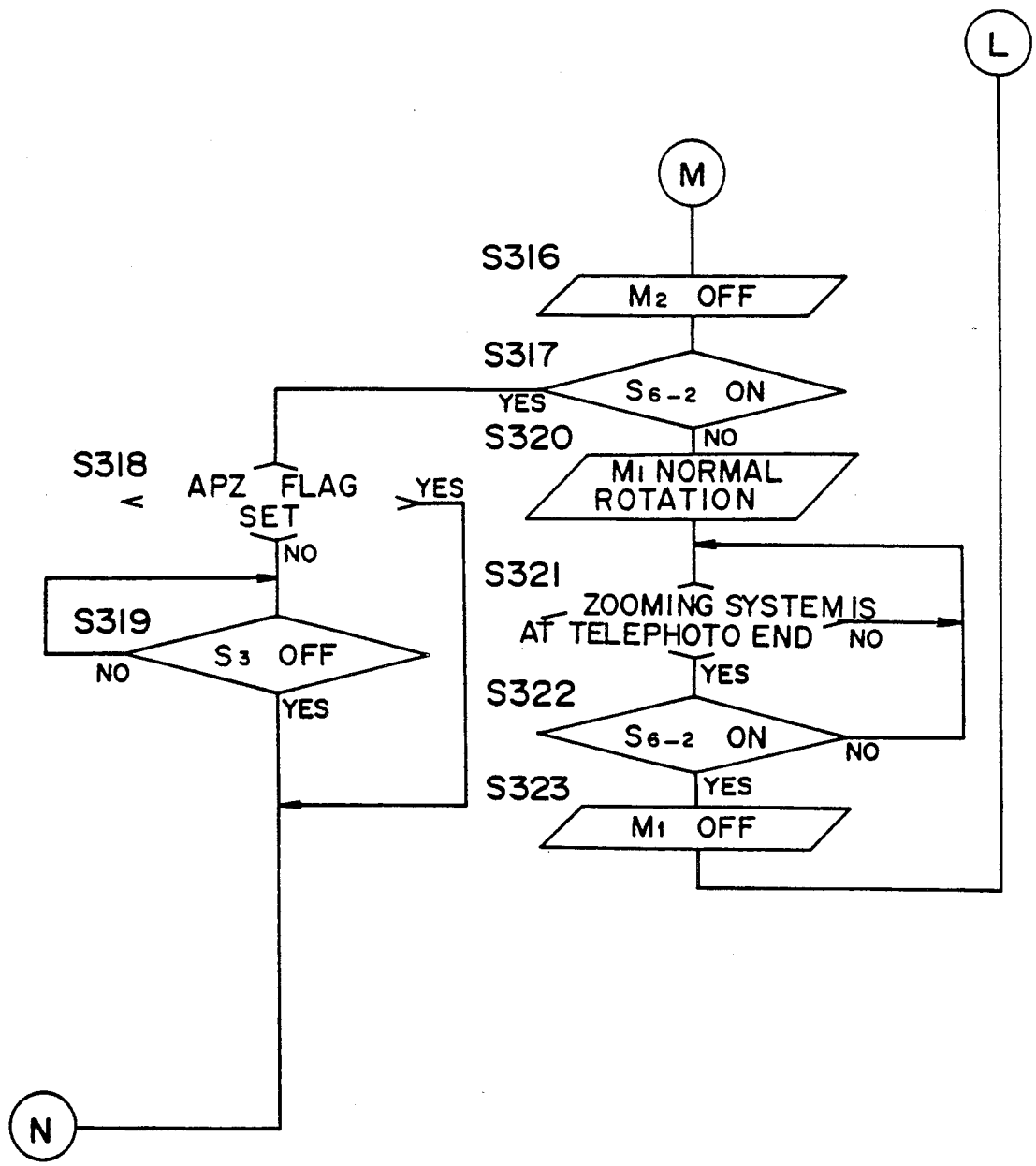

Then, of the main routine shown in FIG. 21, the step 112 of zooming out the finder, that is, zooming of the finder from the telephoto end toward the wide angle end will be explained with reference to FIG. 33 in which each step of the subroutine is designated by a reference numeral on the order of 300.

In this subroutine first the focus detection (to be explained later) is executed according to the flow chart in FIG. 37 or 38 and then photography is started (steps 302 and 303). Then at step 304 a negative pulse voltage is applied to the first plunger $PL_1$ and at step 305 a positive pulse voltage is applied to the second plunger $PL_2$. Hence the first clutch mechanism 51 is switched so that the magnification varying mechanism 13 of the two-focus change-over optical system 14 is driven by the first motor 1, while the driving mechanisms 10, 11 and 12 of the two-fold zooming optical system 15 are driven by the second motor 18.

After the power transmission mechanism has been thus switched, it is checked at step 306 to see whether the zooming optical system 15 is at the wide angle end according to the signals from the zoom encoder EN. If the zooming optical systems 15 is not positioned at the wide angle end, the second motor $M_2$ reverses at step 307 to shift it to the wide angle end. At steps 308 and 309 the signals from the zoom encoder EN are read successively as the zooming optical system 15 is shifted toward the wide angle end, and the trimming magnification PZ corresponding to the finder's position is calculated continuously. And at step 310 the calculated trimming magnification PZ and the film's trimming limit PZlmt are compared and, if the former is larger than the latter, the steps 306 and under are repeated until it becomes smaller.

If the trimming magnification PZ comes to be within the trimming limit PZlmt, judgment is made at step 311 whether the APZ flag is set or not, that is, whether the APZ mode is selected or not at the moment. This is for seeing whether the zooming out being done at the moment is in the APZ mode or not. If it is judged that the APZ mode is set, the second motor $M_2$ reverses until the pseudo focal length Pf determined by the trimming magnification PZ calculated on the basis of the signals from the zoom encoder EN becomes equal to the pseudo focal length $PF_0$ determined by the focus detecting routine described later (this is for keeping the size of the printed image regardless of change of the object distance) and after zooming out is ended with the second motor stopped when they become equal, the lens shifting routine shown in FIG. 35 is started, there represented by steps 312, 313 and 315. Meanwhile, when it is judged at step 311 that the APZ mode is not set, the second motor $M_2$ is driven at step 314 until the zoom out switch $S_3$ is turned OFF in step 314, and the second motor $M_2$ stops when the switch is turned OFF with simultaneous starting of the lens shifting routine.

When in the aforementioned step 306 it is judged that the zooming optical system 15 has been at the wide angle end from the beginning or that it has already been shifted to the wide angle end, the second motor $M_2$ stops to once stop zooming (step 316) and it is checked at step 317 to see whether the wide angle position detection switch $S_{6-2}$ of the two-focus changeover optical system 14 is ON or not. If this switch $S_{6-2}$ is ON, it is then checked to see whether the camera is set at the APZ mode at the moment. Since in this state further zooming out is infeasible with the zooming optical system 15 at the wide angle end and the two-focus changeover optical system 14 at the wide angle position, this routine is ended forthwith and the next lens shifting routine is started, if it is in the APZ mode, while, if it is not in the APZ mode, the zooming out is ended when the zoom out switch $S_3$ is turned OFF at step 319, this followed by the lens shifting routine.

Conversely, when it is judged at the step 317 that the wide angle position detection switch $S_{6-2}$ of the two-focus changeover optical system 14 is not ON, that is, the two-focus changeover optical system 14 is not at the wide angle position, the first motor $M_1$ reverses at steps 320 through 323 to switch the two-focus changeover optical system 14 to the wide angle side with simultaneous sifting of the zooming optical system 15 to the telephoto end. Thereafter, the routine returns to the step 306 and after zooming out to the necessary extent, the lens shifting routine is started at the step 315.

This means that, in this subroutine, if the zooming optical system 15 is at the wide angle end and the two-focus changeover optical system 14 is at the telephoto position, the zooming optical system 15 is shifted to the telephoto end and the setting of the two-focus changeover optical system 14 is changed to be at the wide angle position to enable further zooming out and then zooming is done to the necessary extent. If, on the other hand, the zooming optical system 15 and the two-focus changeover optical system 14 are both on the wide angle side, zooming is ended under this condition, this followed by starting of the lens shifting routine, while, when the zooming optical system 15 is somewhere off the wide angle position, the zooming optical system 15 alone is shifted to where it is necessary regardless of the position of the two-focus changeover optical system 14.

Then, zooming in of the finder represented by the step 115 of the main routine shown in FIG. 31, that is, zooming of the finder from the wide angle and toward the telephoto end will be explained with reference to FIG. 34 in which each step is designated by a reference numeral on the order of 400.

Figure 38A:
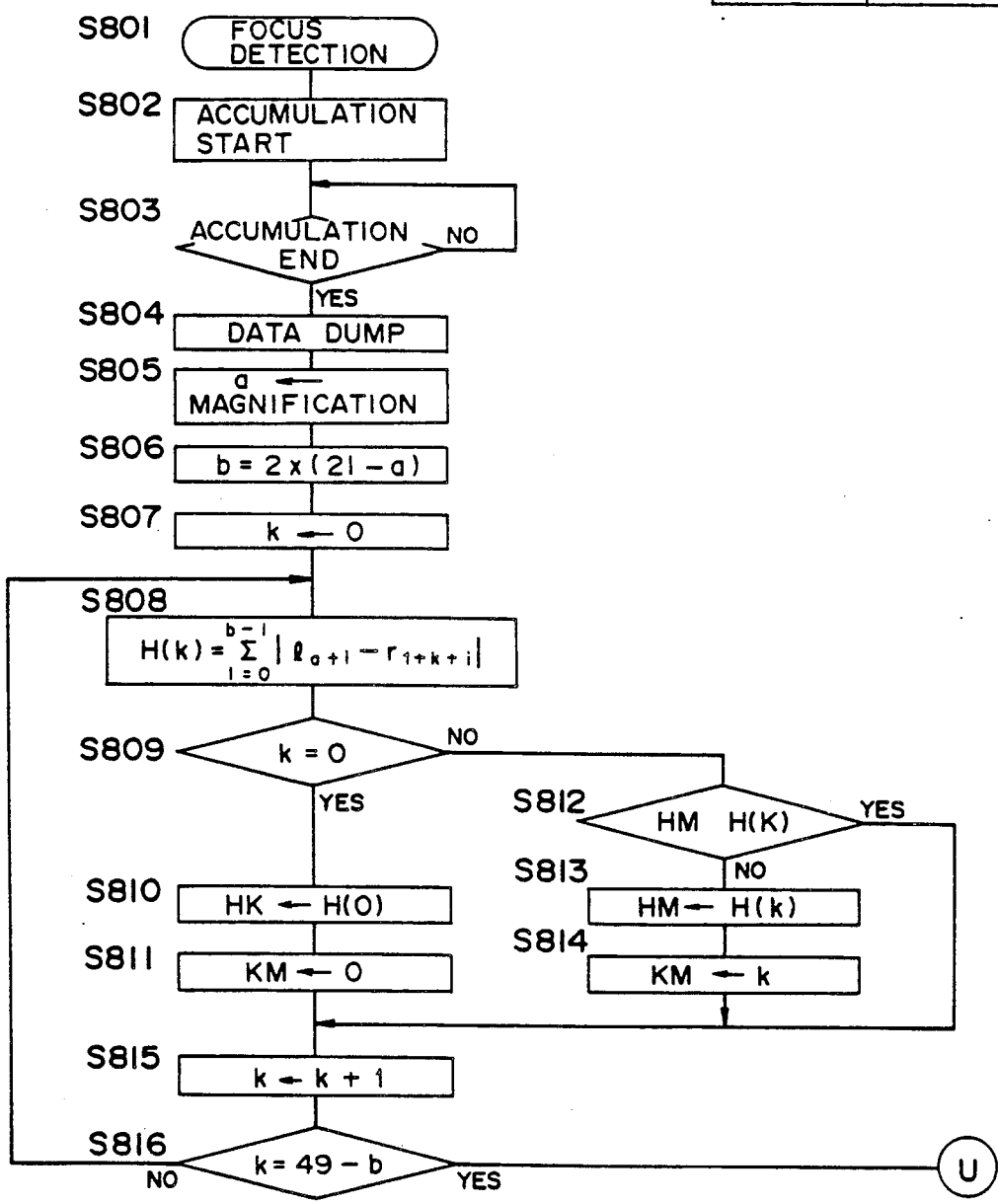
Figure 38B:
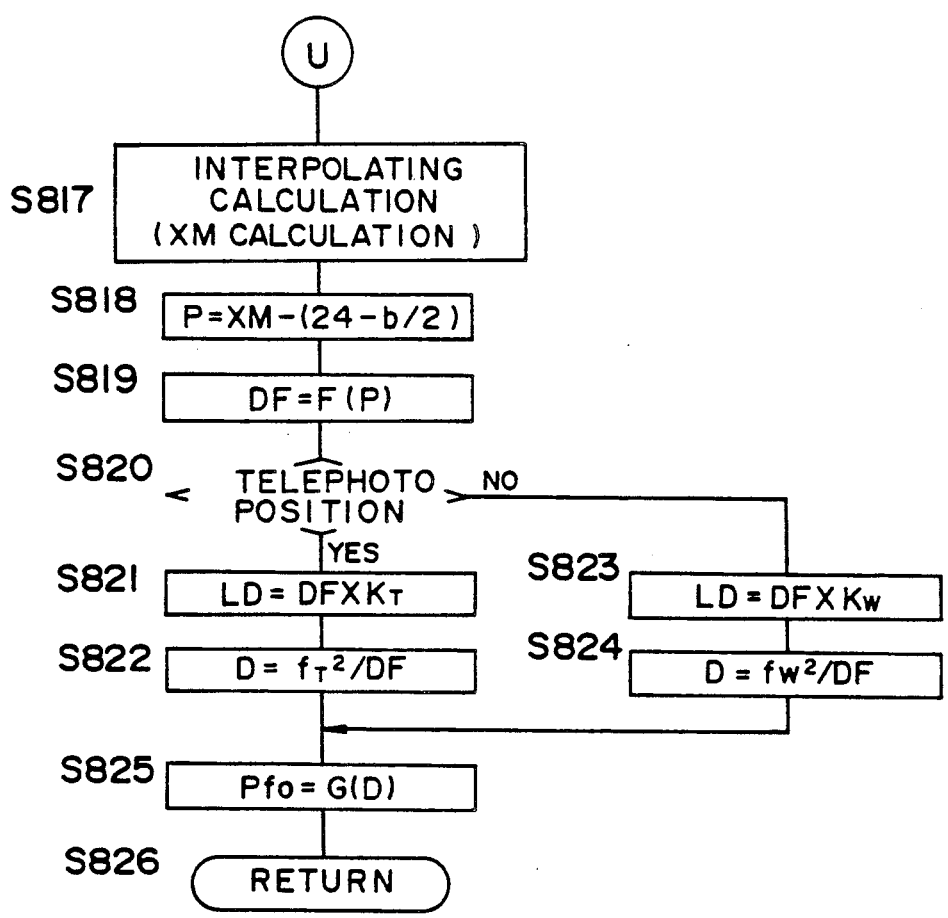

In this subroutine, like zooming out subroutine, first focus detection is done following the flow chart shown in FIG. 37 and 38, and then photometry is started (steps 402 and 403). Then at step 404 a negative pulse voltage is applied to the first plunger $PL_1$ and at step 405 a positive pulse voltage to the second plunger $PL_2$. Hence, the first clutch mechanism 51 is so switched that the first motor 1 shifts the magnification varying mechanism 13 of the two-focus changeover optical system 14, while the second clutch mechanism 58 is so switched that the second motor 18 can shift the driving mechanisms 10, 11 and 12 for the two-fold zooming optical system 15.

After the power transmission mechanism is so switched it is judged at step 406 the basis of the signals from the zoom encoder EN whether the zooming optical system 15 is at the telephoto end or not. If the zooming optical system 15 is not positioned at the telephoto end, the second motor $M_2$ runs forward at step 407 to shift it to the telephoto end. At steps 408 and 409 the signals from the zoom encoder EN are used successively as the zooming optical system 15 is shifted toward the telephoto end and the trimming magnification PZ corresponding to the finder position is calculated continuously. And at step 410 the calculated trimming magnification PZ is compared with the film's trimming limit PZlmt and, if the trimming magnification PZ is larger than the trimming limit PZlmt, it is judged at step 415 whether the two-focus changeover optical system 14 is set at the telephoto position depending on the finder's telephoto position detected by the detection switch $S_{6-1}$. If the two-focus changeover optical system 14 is at the wide angle position, the routine returns to the step 406 and zooming is continued until the zooming optical system 15 reaches the telephoto end.

Meanwhile, if the trimming magnification PZ comes to be within the trimming limit PZlmt at step 410, it is checked at step 411 to see whether the APZ flag is set or not, that is, whether the APZ mode is selected at the moment or not. Like the zooming out routine, it is for checking to see whether the zooming in routine now being executed is in the APZ mode or not. When it is judged that the APZ mode is set, the second motor $M_2$ runs forward until the pseudo focal length $Pf_0$ (which is used for keeping roughly constant the size of the printed image regardless of the object distance) determined by the trimming magnification PZ calculated on the basis of the signals from the zoom encoder EN, and after the second motor $M_2$ is stopped with resultant stopping of the zooming in subroutine when the two values have come to be equal, the lens shifting routine as shown in FIG. 35 is started in steps 412, 413 and 414. Meanwhile, when it is judged that the APZ mode is not set in step 411, the second motor $M_2$ is driven at step 416 until the zoom in switch $S_4$ is turned OFF and, when it is turned OFF, the second motor $M_2$ stops and the lens shifting routine is started.

When at the aforementioned step 406 it is judged that the zooming optical system 15 has been already at the telephoto end or when at the step 415 it is judged that the telephoto position detection switch $S_{6-1}$ of the two-focus changeover optical system 14 is ON, the second motor $M_2$ stops with resultant stopping of zooming (step 417) and at step 418 checking is done to see whether the telephoto position detection switch $S_{6-1}$ is ON or not. Then, if it is judged that the two-focus changeover optical system 14 is at the telephoto position, it is then checked to see whether the camera is set in the APZ mode at the moment. If so, the zooming optical system 15 is at the telephoto end and the two-focus changeover optical system 14 is at the telephoto position, hence no further zooming in is feasible. In the APZ mode, therefore, this routine is ended forthwith and the lens shifting routine is started. If it is not in the APZ mode, the lens shifting routine is started when the zoom in switch $S_4$ has been turned OFF.

When, conversely, it is judged at step 418 that the telephoto position detection switch $S_{6-1}$ for the two-focus changeover optical system 14 is not ON, that is, the two-focus changeover optical system 14 is not at the telephoto position, the first motor $M_1$ runs forward for the two-focus changeover optical system 14 to be shifted to the telephoto position with simultaneous shifting of the zooming optical system 15 to the wide angle end. Then the routine returns to the step 406 and after zooming to the necessary extent the lens shifting routine is started at the step 414.

That is, in this subroutine if the zooming optical system 15 is at the telephoto end and the two-focus changeover optical system is at the wide angle position, further zooming in is made feasibly by shifting the zooming optical system 15 to the wide angle end with simultaneous shifting of the two-focus changeover optical system 14 to the telephoto position and then zooming is done to the necessary extent. If the two-focus changeover system 14 is at the telephoto position and the zooming optical system 15 is at the telephoto end or at the pseudo zooming limit position, zooming is ended where determined thereby and the lens shifting routine is then started, while, if the zooming optical system 15 is off the telephoto end and also if it is not beyond the pseudo zooming limit position, the zooming optical system 15 alone is tentatively shifted toward the telephoto end by the necessary extent regardless of the position of the two-focus changeover optical system 14.

Then, the lens shifting subroutine (the step 113 of FIG. 31) is executed following the zooming out and the zooming in subroutines will be explained in detail with reference to FIG. 35 with each step designated by a reference numeral on the order of 500.

As this subroutine is started at step 501, first a negative pulse voltage is applied to the second plunger $PL_2$ at step 502, the output of the second clutch mechanism 58 is thereby switched to $P_4$ and then the second motor $M_2$ is started in a sense for proper driving of the lens barrel unit 61 and the flash unit 68 via the two-focus changeover mechanism 59. Then the photometric value is inputted into the microcomputer CP (step 503) and at the next step 504 it is checked to see whether the pseudo focal length Pf set is smaller than the focal length (70 mm) of the taking lens at the telephoto position. If it is then judged that the pseudo focal length Pf set is smaller than 70 mm, the taking lens is required to be set at the wide angle position, that is, its focal length has to be set at 35 mm. Hence, in steps 505 and 506 checking is made of the setting of the telephoto position detection switch $S_{7-1}$ and the wide angle position detection switch $S_{7-2}$ for the taking lens and, when it is judged that the taking lens is already at the wide angle position, the condition is kept unaltered and after calculation of the trimming magnification PZ at step 507 the routine ends at step 508 before proceeding to the next stage of operation. For example, if the pseudo focal length is 52 mm, the trimming magnification PZ is a value obtained by dividing it by the wide angle side focal length of 35 mm, that is, approximately 1.5. When it is judged at the step 505 that the taking lens is at the telephoto position, the taking lens is shifted to the wide angle position in steps 509 through 511 and then the trimming magnification PZ is calculated before processing to the next stage of operation (steps 507, 508). When it is judged at steps 505 and 506 that the taking lens is at neither the telephoto position nor the wide angle position, it is presumed that something wrong has occurred and the entire functions of the camera are then stopped (step 512).

Meanwhile, when it is judged that the pseudo focal length Pf is longer than 70 mm at step 504, it is then checked at the next step 513 to see whether the pseudo focal length Pf is larger than the product of the focal length on the wide angle side (35 mm) and the trimming limit PZlmt or not. In this case, if the pseudo focal length Pf is a larger value than the product thereof, it means that a focal length of 35 mm cannot be enough for the taking lens used and the lens' focal length has to be set at that on the telephoto side, that is, 70 mm. Then, at steps 514 and 515 the setting of the wide angle position detection switch $S_{7-1}$ and that of the telephoto position detection switch $S_{7-2}$ for the taking lens are checked and, when the taking lens is found to be at the telephoto position, the trimming magnification is calculated at step 516 and the next routine is started at the step 509. For example, if the pseudo focal length set is 140 mm, the value obtained by dividing it by the focal length of the taking lens, 70 mm, when it is at the telephoto position (=2) is the trimming magnification. When, on the other hand, it is judged at the step that the taking lens is at the wide angle position, the taking lens is shifted to the telephoto position at steps 517 through 519 and then the trimming magnification is calculated before the next routine is proceed to (steps 516, 508). When it is judged that the taking lens is at neither the telephoto position nor the wide angle position at the steps 514 and 515, it is presumed that something wrong has occurred and the entire functions of the camera are stopped (step 520).

When at the step 513 it is judged that the pseudo focal length Pf is less than the product of the taking lens' focal length when it is at the wide angle position and the trimming limit PZlmt, that is, photographing is feasible with the taking lens at either the wide angle position or the telephoto position, first the setting of the telephoto detection switch $S_{7-1}$ for the taking lens is checked at step 521. When it is confirmed that the taking lens is then at the telephoto position, it is checked at step 522 to see whether the flash switch $S_9$ is ON or OFF.

If this flash $S_9$ is ON, the routine proceeds to step 523 and, if it is OFF, to step 524. When it is ON, it is checked at the step 523 to see whether the object distance D (which is determined by the focus detecting routine described later) is within the flashlight's range Dfar. This is for coping with the case where the flashlight intensity is insufficient with the object distance longer than the flashlight's range Dfar. For example, a picture is taken using the trimming information and at an angle of view corresponding to 90 mm, the focal length of the taking lens is normally set at 70 mm (F-number=5.6). Hence, if the flash's guide number is 12, the flashlight's range calculated by the formula;

guide number/F-number=flashlight's range is approximately 2 meters and, if the actual object distance is approximately 4 meters, the flashlight cannot reach the object. In such a case, if the taking lens' focal length is switched to 35 mm (F-number=2.8) at the steps 509 through 511 and 507, 508 to increase the trimming magnification, the flashlight's range is approximately 4 meters, this being enough to reach the object to enable photographing. When, conversely, the object distance D is within the flashlight's range Dfar, photographing is naturally feasible, hence the trimming magnification is calculated at the step 516 with the taking lens at the telephoto position before proceeding to the next routine.

Meanwhile, when flash is not used, first the proper shutter speed is calculated at step 524 and then it is checked to see at step 525 whether the calculated shutter speed is larger (lower) than the reciprocal of the pseudo focal length. If the shutter speed is lower, camera-shake is likely to result. Hence, to prevent it, the taking lens is switched to the wide angle position and the trimming magnification is calculated at the step 507 before returning to the main routine (step 508). If, on the other hand, the calculated shutter speed is higher, the trimming magnification is calculated at the step 516 and the routine ends at the step 508.

When at the step 521 it is judged that the taking lens' telephoto position detection switch $S_{7-1}$ is not ON, the setting of the wide position detection switch $S_{7-2}$ is checked at step 526. If this switch $S_{7-2}$ is OFF, it means that the taking lens is at neither the wide angle position nor the telephoto position, hence it is presumed at the step 520 that something wrong has occurred and the entire functions of the camera are stopped. Conversely, if this switch $S_{7-2}$ is ON and the taking lens is then at the wide angle position, the setting of the flash switch $S_9$ is checked at step 527. And, if it is in the flash photography mode, the routine proceed to step 528 and, if not, to step 529.

At the time of flash photography, the nearest object distance Dnear in the mode is compared at the step 528 with the object distance D calculated in the focus detection routine. If the object distance D is larger than the nearest object distance, the trimming magnification PZ is calculated at the step 507 with the taking lens kept at the wide angle position before returning to the main routine (step 508). Conversely, if the object distance D is shorter, the exposure is uncontrollable as it is, hence the condition is coped with by shifting the taking lens to the telephoto position at steps 517 through 519 to reduce the lens' F-number. Then, the trimming magnification is calculated in this condition and the routine is now over (steps 516 and 508).

When flash is not used, the proper shutter speed is calculated at step 529, and it is checked to see at step 530 whether the calculated shutter speed is higher than 1/500 second or not. If the calculated shutter speed is higher that 1/500 second, the taking lens is shifted to the telephoto position at steps 517, 518 and 519 and the trimming magnification PZ is calculated at the step 508 before the next routine is started (step 509). If, conversely, the calculated shutter speed is lower, the trimming magnification PZ is calculated with the taking lens kept at the wide angle position before the next routine is started. This procedure of checking whether the shutter speed is higher than 1/500 second or not is taken because 1/500 second is set as the camera's controllable limit. When the taking lens is shifted to the telephoto position, however, the shutter speed can be lowered to be within the controllable range without changing Ev value.

Figure 42:
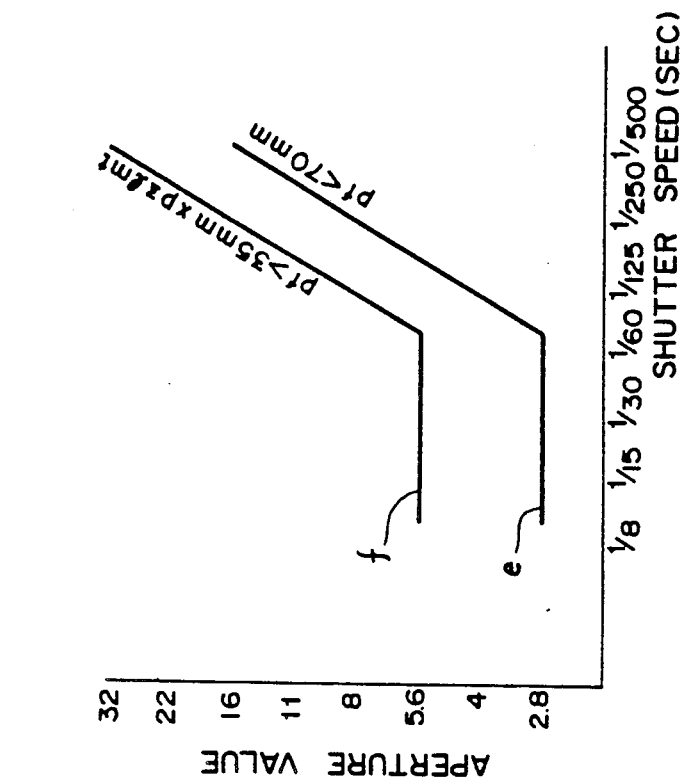
Figure 41:
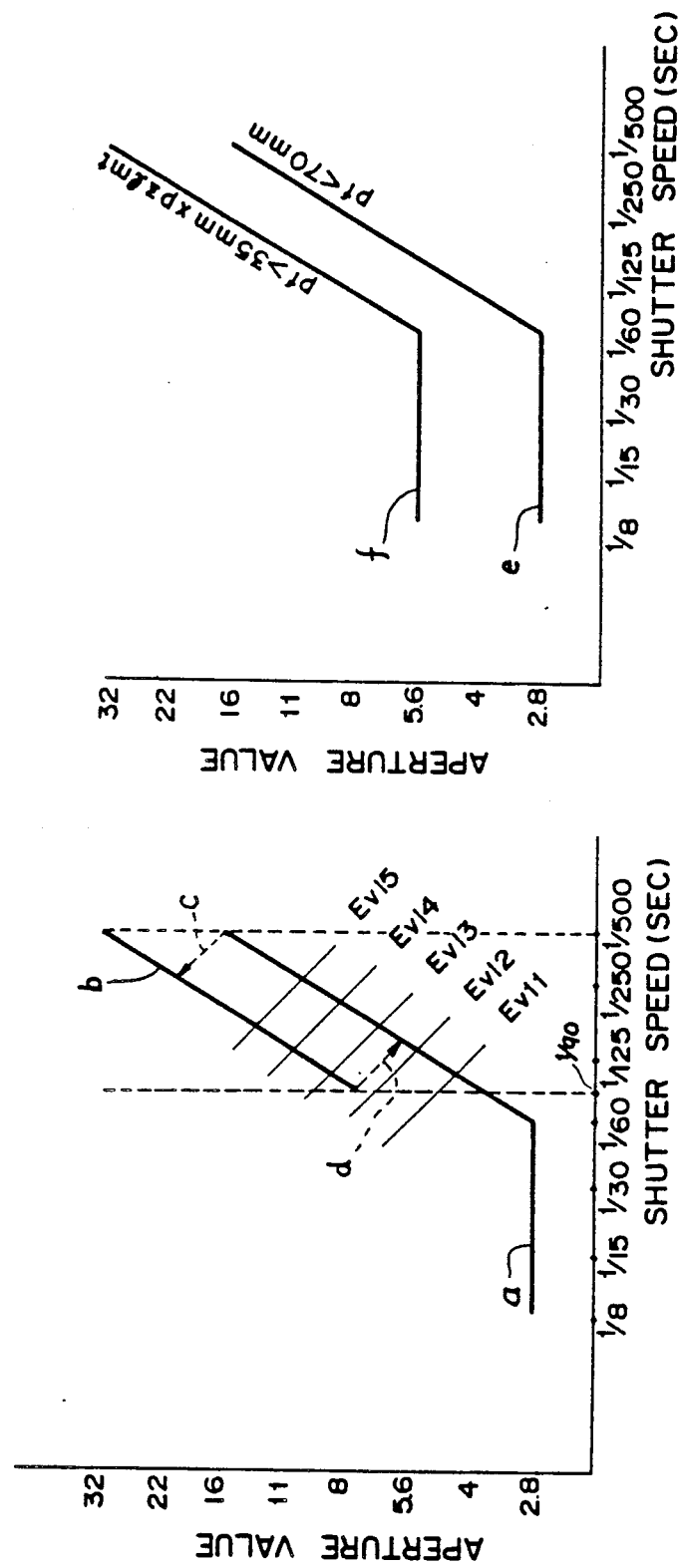

The aforementioned relationship is specifically shown by the program charts in FIGS. 41 and 42 showing how the taking lens is to be shifted in each case. The chart of FIG. 41 shows a case in which the condition can be coped with when the set pseudo focal length is larger than 70 mm but smaller than the product of 35 mm and the trimming limit PZlmt, that is, when the taking lens' focal length is 35 mm or 70 mm. When the focal length is 35 mm, exposure control is done according to the program represented by the a-line. If, as mentioned above, the shutter speed becomes higher than 1/500 second with the focal length set at 35 mm, exposure control is done according to the program by the b-line to which shifting is made as indicated by the arrow c. The b-line program is for the case in which the taking lens' focal length is 70 mm and in the range, in which the shutter speed is lower than determined by the 35 mm program and up to 1/90 second, either program may be applied with the aforementioned various conditions taken into due consideration. When, on the other hand, the shutter speed is lower than 1/90 second with the focal length set at 70 mm and flash not used, the focal length is changed to 35 mm as indicated by the arrow d.

FIG. 42 shows a program chart for the wide angle mode which is applicable to where the set pseudo focal length is smaller than 70 mm and another program chart for the telephoto mode which is applicable to where the pseudo focal length is larger than the product of 35 mm and the trimming limit. The former is applicable only when the taking lens is at the wide angle position, and the problem then applicable is indicated by letter e, while the latter is applicable only when the taking lens is at the telephoto position, and the problem then applicable is indicated by letter f. In these cases, therefore, the taking lens' focal length remains unaltered.

Figure 43:
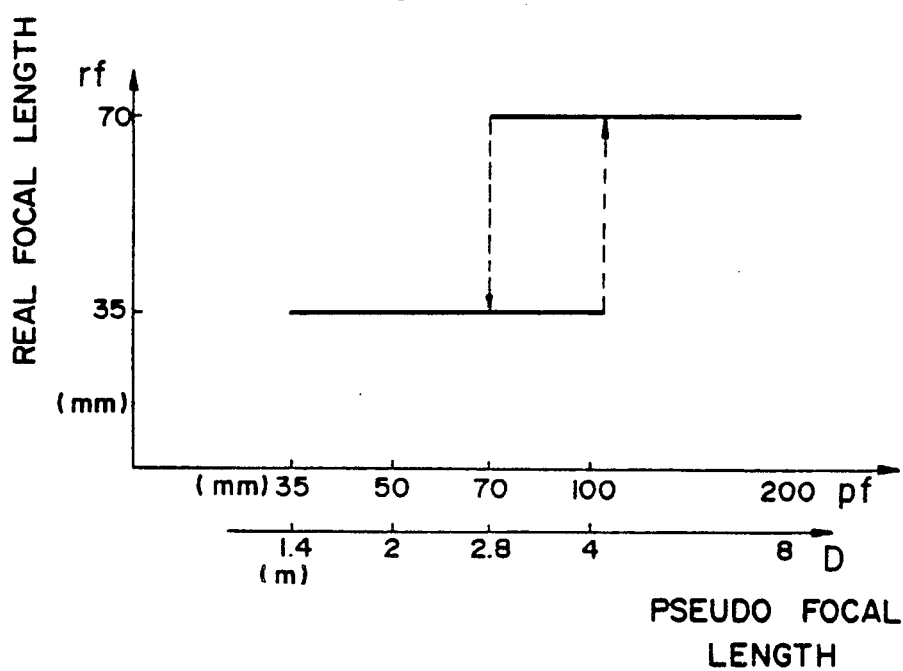
Figure 45:
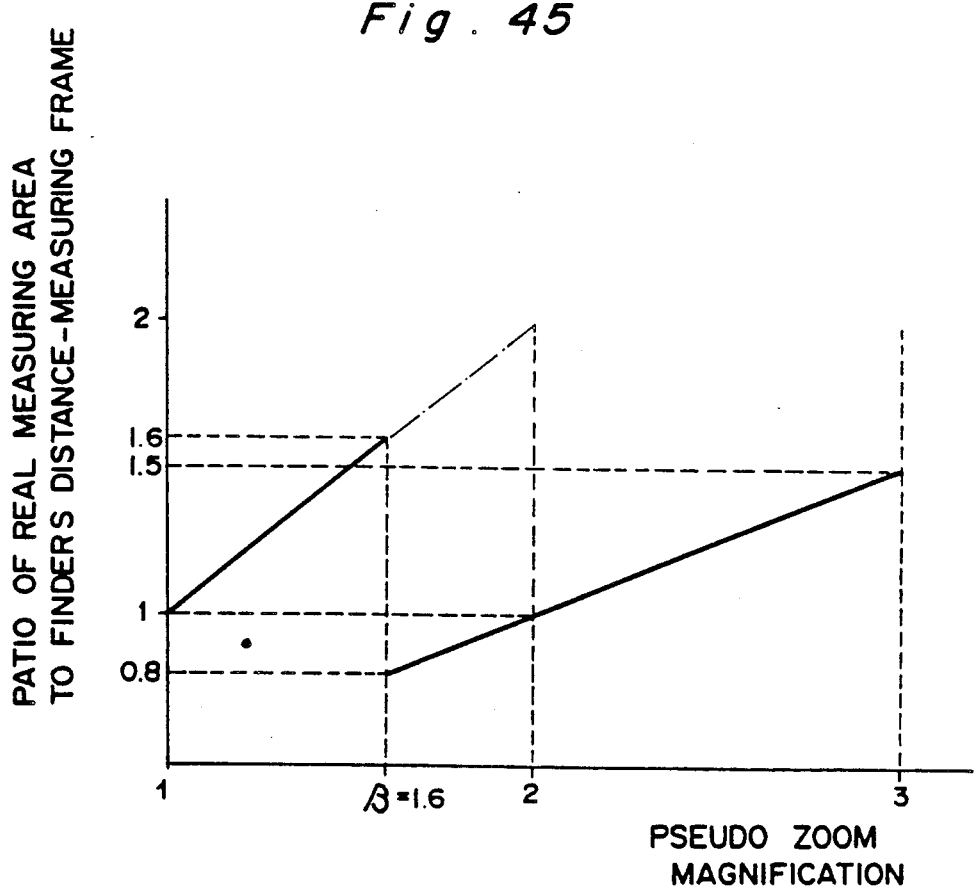

Although the way the taking lens' position is changed is as described above, the timing thereof will be explained below with reference to FIG. 43.

In this graph the reel focal length rf is taken on the axis of ordinate and the pseudo focal length Pf is taken on the axis of abscissa. The graph shows a case in which the timing limit PZlmt is 3. As shown in the figure, when the real focal length rf of the taking lens is 35 mm, the pseudo focal length Pf can be set within a range of 35–105 mm. Hence, in case of ordinary zooming in without shifting due to the flash's quantity of light, shutter speed and the like as mentioned above, the real focal length rf of the taking lens is changed to 70 mm only when the pseudo focal length Pf has exceeded 105 mm. In case the real focal length is 70 mm, the pseudo focal length Pf can be set within a range of 70–210 mm. Hence, in case of ordinary zooming out, the real focal length rf can be changed to 35 mm only when the pseudo focal length Pf has come to be smaller than 70 mm.

As the pseudo focal length Pf is increased from 70 mm to 105 mm, therefore, photography is feasible regardless of the focal length of the taking lens, 35 mm or 70 mm. Hence, in this range changing of the real focal length is not necessary and, therefore, the frequency of shifting the focal length is much less than when the focal length is changed only at one point.

Figure 36:
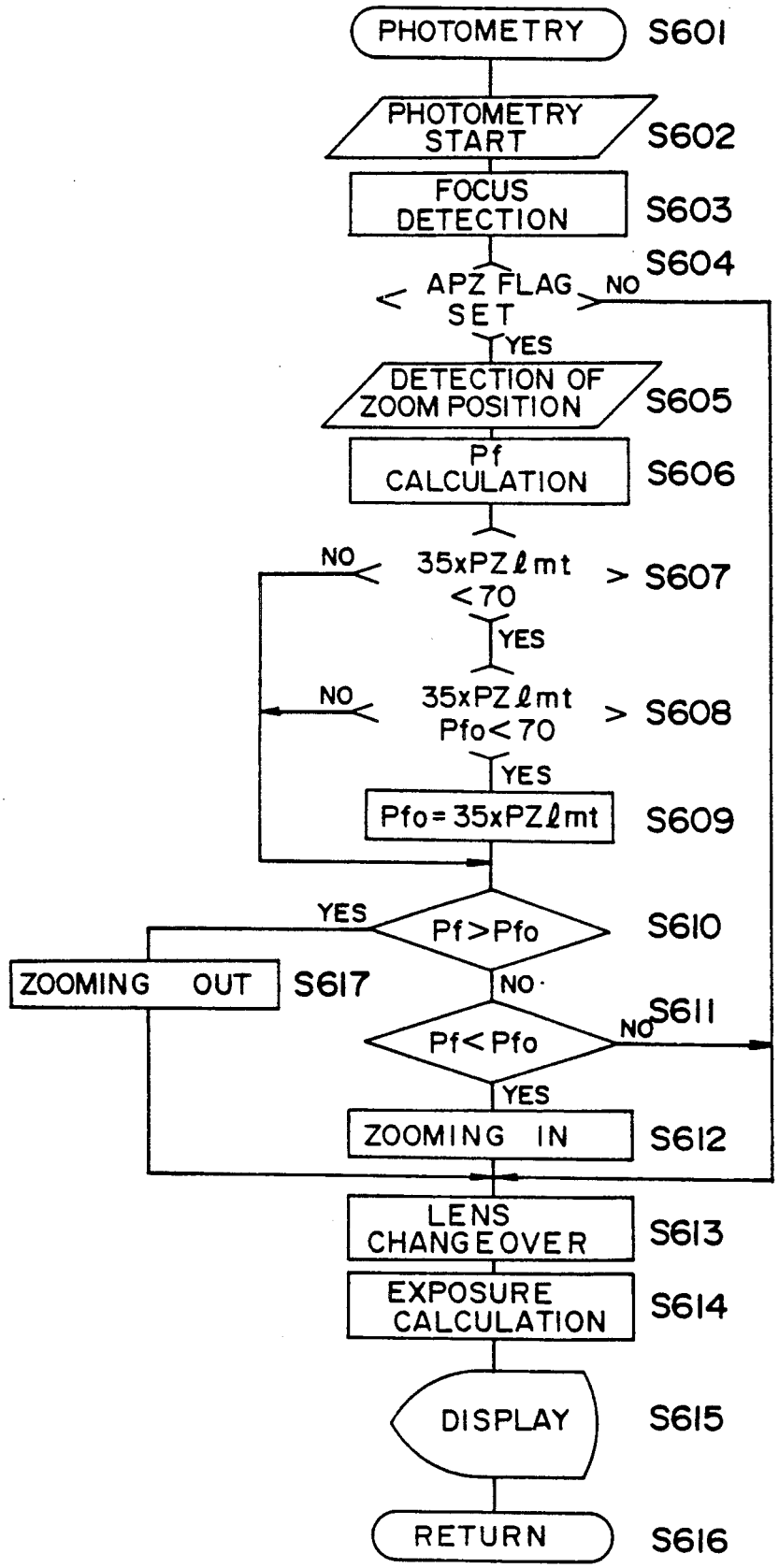

Then, the photometric subroutine executed in the main routine will be explained with reference to the flow chart shown in FIG. 36.

First photometry is started at step 602 by means of a photometric unit LM and then at step 603 focus detection is made according to the flow chart shown in FIG. 37 or 38. Then at step 604 checking is done to see whether the APZ mode is set or not and, if so, proceeding is made to step 605 and, if not, to step 613.

In case of the APZ mode, the finder's position in the course of zooming is detected at the step 605 on the basis of the signals from the zoom encoder EN, and the pseudo focal length Pf at the moment is calculated accordingly (step 606). Then at step 607 the product of the focal length of the taking lens when it is at the wide angle position (35 mm) and the trimming limit PZlmt is compared with the focal length of 70 mm when the taking lens is at the telephoto position. If the former is less than the latter, the pseudo focal length, which can be set, does not continue throughout the entire range and setting of the pseudo focal length is infeasible partly. Hence, at step 608 checking is made to see whether the pseudo focal length $Pf_0$ in the APZ mode calculated according to the flow chart of FIG. 37 and 38 is unable to set or not. If the pseudo focal length of $Pf_0$ is in a range where setting is infeasible, it is set anew forcibly at the largest pseudo focal length when the taking lens is at the wide angle position, 52 mm in this case. That the taking lens is not set at the telephoto position is due to the risk of the object getting too large to be beyond the printing limits.

In case the product of the focal length when the lens is at the wide angle position (35 mm) and the trimming limit is larger than the focal length when the lens is at the telephoto position (70 mm) or, if smaller, it is within the range in which setting of the pseudo focal length Pf in the APZ mode is feasible, comparison is made at steps 610 and 611 between the pseudo focal length Pf calculated according to the finder's position and the pseudo focal length $P_0$ for making the image magnification ratio in the APZ mode constant. When the calculated pseudo focal length Pf is larger than the pseudo focal length $Pf_0$, the zooming out routine shown in FIG. 33 is executed, while, when it is smaller, the zooming in routine shown in FIG. 33 is executed until $Pf = Pf_0$ is reached. When the relation between Pf and $Pf_0$ is neither of what are described above, being equal from the beginning, zooming is not done.

When the routine to the aforementioned step is over, or it is judged that the APZ mode has been set according to the checking done at the step 604, the lens shifting routine as already described with reference to FIG. 35 is executed according to the pseudo focal length and the taking lens is shifted. Then, calculation to determine the proper exposure is made at step 614 and after display of the calculation result in the display window at step 615 the routine ends at step 616, this followed by returning to the main routine.

Then, to be explained is the focus detection routine but before proceeding to it the focus detection system of this camera will be explained.

In this camera a line sensor having CCD (charge coupled device) as the light-receiving element is used for focus detection as so-called phase difference detection system. This system is already known but its principle will now be explained briefly.

The line sensor is usually provided within the taking optical system at a position equivalent with respect to the film surface, that is, at a position behind the estimated focal point. Between the position with respect to the film surface and the line sensor there are provided a condenser lens and two separator lenses in parallel at the positions equidistant from this condenser in this order form the aforementioned equivalent position. And by these separator lenses the luminous flux having passed the taking lens is separated into two with resultant formation of two images on the line sensor.

The distance between the two images formed on the line sensor is constant as far as the images are focused at the equivalent positions on the film surface. Meanwhile, the distance between these two images becomes smaller when the images to be formed at the aforementioned equivalent positions are actually formed before the film surface, while it becomes larger when the images are formed behind the film surface. Hence, the extent and direction of the focus deviation by comparing the distance between the two images on the line sensor with that at the time of focusing, hence on the basis of such information it is possible to shift the lens for focusing the images at the equivalent positions on the film surface.

In the camera of this embodiment, the line sensor used for the AF element 67 comprises a datum part L composed of 40 cells $l_1$–$l_{40}$ and a reference part R composed of 48 cells $r_1$–$r_{48}$ and the datum part L is divided into a first block I composed of $l_1$–$l_{20}$, a second block II composed of $l_{11}$–$l_{20}$ and a third block III composed of $l_{21}$–$l_{40}$. The distance between the images at the time of focusing which is taken as datum is constant regardless of the block used but in the figure this distance is shown as $L_0$. Hence, at the time of focusing, an image corresponding to the first block I is formed when the cells $r_1$–$r_{20}$ are shifted to the right by 4, that is, to $r_5$–$r_{24}$ and likewise an image corresponding to the second block II is formed when the cells are shifted by 14 to $r_{15}$–$r_{34}$ and an image corresponding to the third block III is formed when the cells are shifted by 24 to $r_{25}$–$r_{44}$.

Figure 44:
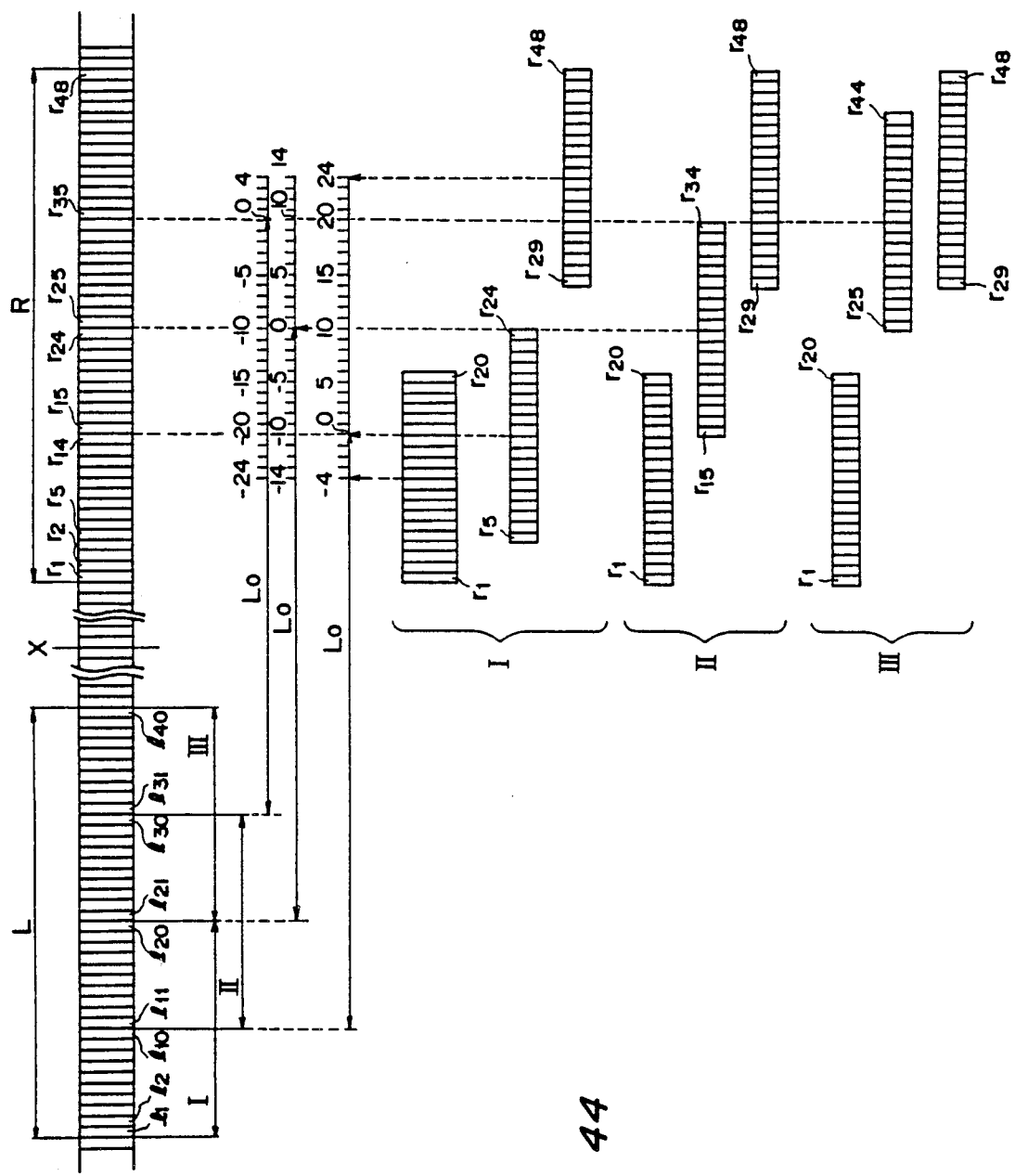

Hereinafter the focus detection routine of this camera will be explained using the flow charts shown in FIGS. 44 and 37.

In the flow shown in FIG. 37 accumulation of electric charge by CCD is done at steps 702 and 703. This over, the output data from each cell is read into the memory of the microcomputer. And at the later steps the distance between the two images on the line censor is calculated on these data.

IN this routine first a variable k is set at 0 at step 705, this followed by calculation at step 706. The $l_{11+i}$ and $r_{1+k+i}$ used in the calculation formula indicate the positions of the cells and, for convenience's sake, also the outputs of the $11+i$−th and the $1+k+i$−th cells. Hence, by the above calculation the difference between the output from the second block II of the datum part $l_{11}$–$l_{30}$ and that from the cells $r_1$–$r_{20}$ of the reference part as a relative value H(k). Then, at steps 707 through 714 the relative value H(k) when the group of cells $r_1$–$r_{20}$ as one unit of the reference part R is shifted to the right 1 at a time until the cell positions of $r_{29}$–$r_{48}$ are reached successively, and the optimum relative position KM for the image to make the relative value H(k) minimum. At the next step 715 the optimum relative position when the resolving power is 1 pitch or less is calculated from the optimum relative position KM thus determined and both adjacent relative values and the distance XM between the images on the line sensor is thus obtained. Then at step 716 the deviation P of the distance between the images (image distance hereinafter) XM from that at the time of focusing is determined and at the next step 717 this deviation P is converted into the extent of defocusing $DF_2$ when the second block II is used. That in the calculation of the deviation P, 14 is subtracted from the image distance is because of the extent of shifting of the image position with respect to that of the unit of cells $r_1$–$r_{20}$ at the time of focusing. That is, if the relative value becomes minimum in the range of cells $r_{29}$–$r_{48}$ in the figure, its deviation from that for the cells $r_{15}$–$r_{34}$ can be determined by subtracting 14 therefrom.

Following calculation of the extent of defocusing $DF_2$ when the second block II is used, it is checked to see whether the trimming magnification is larger than $\beta$ (step 18). Although this value $\beta$ is specifically set at 1.6 in this embodiment, the reason for checking to see whether the trimming magnification is not less than 1.6 or not will be explained below with reference to FIG. 45.

This figure is a graph showing the relation between the ratio of the actual measuring area to the finder's distance-measuring frame and the pseudo zoom magnification. The ratio of the actual measuring area to the distance-measuring frame is taken on the axis of ordinate and the pseudo zoom magnification on the axis of abscissa. I was already explained that, when the taking lens is shifted from the wide angle position to the telephoto position, a tele converter is inserted into the AF optical system for keeping constant the proportion of the distance-measuring range to the object distance. Meanwhile, if the trimming magnification is gradually increased from 1 in case of pseudo zoom photography, the printing range only becomes smaller with the distance-measuring range unchanged, this resulting in increase of the proportion of the actual distance-measuring area to the finder's distance-measuring frame. Hence, as it is, the difference between the apparent view seen through the finder and the actual one is increased and there is a risk of a picture being taken with focus on something else than the main object and, therefore, it is necessary to take some preventive measure. The aforementioned value $\beta$ is set for preventing increase of the proportion of the distance-measuring area to the distance measuring frame beyond a certain limit and, with this value as the boundary point, the distance-measuring area is changed. Specifically, when this value is less than 1.6, that is, when the trimming magnification is less than 1.6, the cells of the aforementioned line sensors in the block I through block III are all used, while, when it is not less that 1.6, the cells in the block II only are used. Since the distance-measuring area is then halved, the proportion of the actual measuring area to the distance-measuring frame can be set at 1.5 even if the trimming magnification is 3, hence the risk of erroneous distance-measuring due to the presence of many things other than the main object in the distance-measuring range is precluded.

If it is judged that the trimming magnification is not less than 1.6 at the step 718 of FIG. 37, therefore, calculation by the use of cells in other blocks and at step 719 the extent of defocusing $DF_2$ when the cells of the block II only are used is assumed to be equal to the extent of defocusing DF when the whole cells in the focus detection range are used. Then at steps 735 through 739 the extents of shifting of the taking lens LD and the distance-measuring data D required for focusing are calculated when the taking lens is at the telephoto position and the wide angle position respectively. At step 740 this distance data D is converted into the pseudo focal length $Pf_0$ and at step 741 the next stage of operation is started in the main routine, the zooming in routine or the zooming out routine.

When, conversely, it is judged that the trimming magnification is less than 1.6 at step 718, the extent of defocusing $DF_1$ when the cells $l_1-l_{20}$ of the block I are used is calculated at steps from 720 through 732. That $P=XM-4$ at step 731 is because the extent of shifting when the cells $r_1-r_{20}$ are used is 4, this being different from the value when the cells of the block II are use. The extent of defocusing $DF_3$ when the cells $l_{21}\sim l_{40}$ of the block III are used, too, is calculated by like algorithm, but for the sake of simplification this calculation is shown only at step 733.

When the extent of defocusing for each block has thus been calculated, the extent of defocusing DF for the entire photographic system is set at step 734. Specifically, the main object is man in most cases and most likely it is nearest to the camera, hence the extent of defocusing when the object is nearest is taken as the extent of defocusing DF for the entire system. Hence the largest of the extents of defocusing $DF_1$, $DF_2$ and $DF_3$ for the respective blocks is selected and hereinafter, like when the extent of defocusing when the cells of the block II only were used was determined and the extent of shifting of the taking lens LD necessary for focusing, the distance data D and the pseudo focal length $Pf_0$ in the APZ mode are calculated before proceeding to the next stage of operation.

Figure 28:
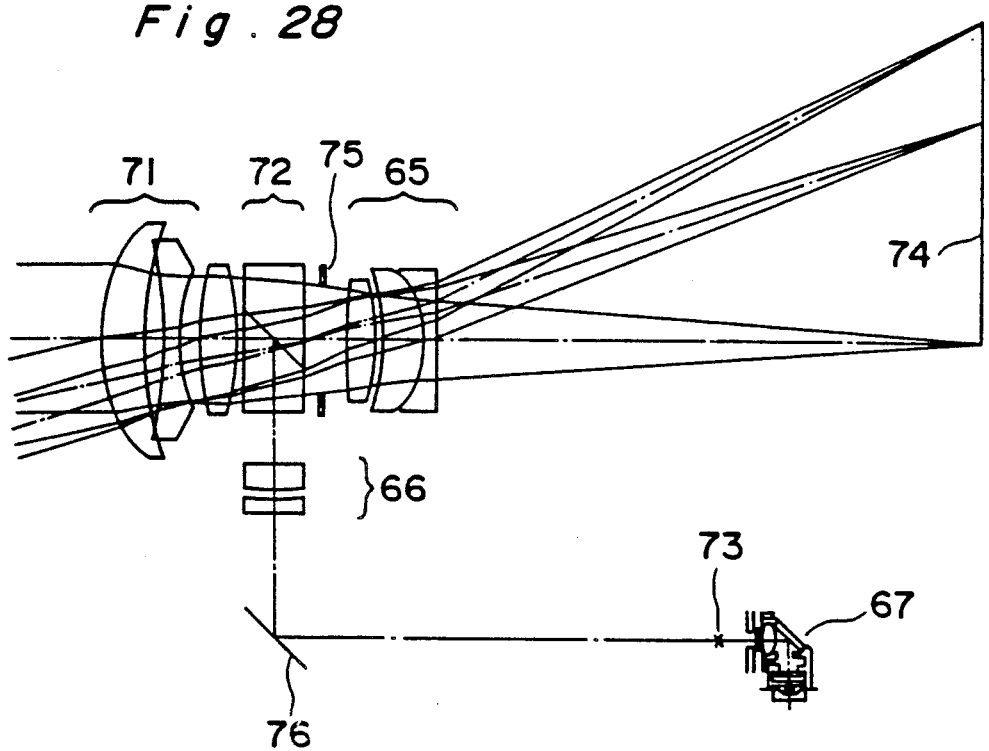

FIG. 28 shows an alternative flow chart of the focus detection subroutine. Unlike the one shown in FIG. 37, this flow chart is so contrived that the number of the elements used varies continuously according to the trimming magnification.

First at steps 801 through 804 accumulation of electric charge at CCD and the data showing the result thereof are outputted to the microcomputer like at the steps 701 through 704. Then at steps 805 and 806 the number of elements b of the datum part L used and the number a of the leftmost element is determined according to the calculated trimming magnification. These are within the ranges of $1 \leqq a \leqq 20$ and $2 \leqq b \leqq 40$ respectively and since the elements used of the datum part L are those in the middle section, the following expression of relation is applicable.

$b=2\times(21-a)$

That the values a and b are determined according to the trimming magnification means specifically that as the magnification increases, the focus detection range becomes narrower with progressive decrease of the number of elements used b, and by so doing the proportion of the actual distance-measuring area to the finder's distance-measuring range can be kept substantially constant. For that the number of elements used is required to be $b=40/\text{magnification}$ and the numbers of elements b satisfying this formula are as tabulated below.

| Trimming magnification | | | No. of elements (b) |
|---|---|---|---|
| 1.00 | or more and up to | 1.05 | 40 |
| 1.05 | " | 1.11 | 38 |
| 1.11 | " | 1.18 | 36 |
| 1.18 | " | 1.25 | 34 |
| 1.25 | " | 1.33 | 32 |
| 1.33 | " | 1.43 | 30 |
| 1.43 | " | 1.54 | 28 |
| 1.54 | " | 1.67 | 26 |
| 1.67 | " | 1.82 | 24 |
| 1.82 | " | 2.00 | 22 |
| 2.00 | " | 2.22 | 20 |
| 2.22 | " | 2.50 | 18 |
| 2.50 | " | 2.86 | 16 |
| 2.86 | " | 3.33 | 14 |
| 3.33 | " | 4.00 | 12 |
| 4.00 | or more | | 10 |

Although, as seen from the above table, the number of elements is variable within a range of 10 to 40, that the minimum is set at 10 is because if the number of elements is too small, the precision of focus detection aggravates.

When a and b have been set under the aforementioned condition, the optimum relative position KM is determined. Then, the extent of the deviation P is calculated at steps 817 and 818 and it is converted into the extent of defocusing DF (step 819). Thereafter, at steps 820 through 825 the extent of shifting LD to the focusing position and the distance data D and the pseudo focal length Pf in the APZ mode etc. are calculated like in the flow shown in FIG. 37 and then the next stage of operation is proceeded to after returning to the main routine at step 826.

The flow of operation of this camera is as described above with reference to the illustrated flow charts.

Then detailed explanation will be made about a specific example of the mechanism for the finder's focus changeover with reference to FIGS. 46 through 51.

Figure 46:
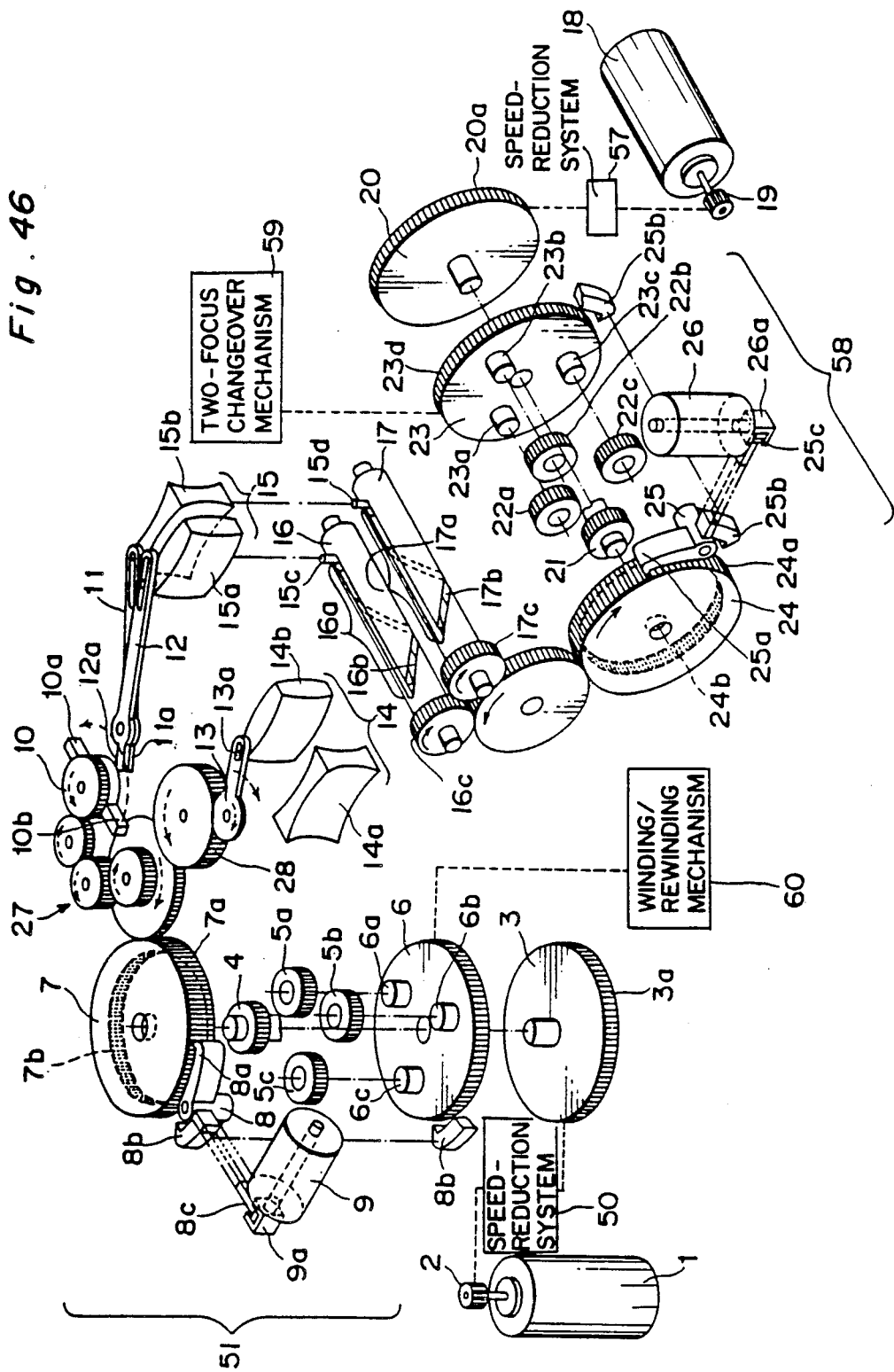

FIG. 46 is an exploded perspective view showing the two-focus changeover optical system 14 and the changeover mechanism 13 therefor, the zooming optical system 15, the driving mechanisms 10, 11 and 12 therefor, the clutch mechanisms 51 and 58 etc.

As seen from the figure, the output shaft of the first motor 1 has mounted thereon a gear 2 and the rotation of this gear 2 is transmitted from a gear 3 via a speed reducing system 50 to a first clutch mechanism 51. For convenience in drawing the gear 3 and a gear 4 above it are shown separated but actually these are formed monobloc on the same shaft and between the gears 3 and 4 there is set an output gear 6 for the winding-/rewinding mechanism to be freely rotatable. Around the gear 4 there are arranged planetary gears 5a, 5b and 5c with the gear 4 as the sun gear, and these planetary gears 5a, 5b and 5c are set on shafts 6a, 6b and 6c extending from the output gear 6. Above these gears there is provided an output gear 7 for the finder driving mechanism with its inner teeth 7b meshed with the planetary gears 5a, 5b and 5c. Hence, when the first motor 1 is started to rotate the sun gear 4 with the gear 6 fixed, the planetary gears 5a, 5b and 5c rotate on their own axes and the output gear 7 is driven thereby and, if the output gear 7 is fixed, the planetary gears 5a, 5b and 5c are caused to rotate around the sun gear 4 to thereby drive the output gear 6 for the winding/rewinding mechanism. On the periphery of the gears 6 and 7 there is provided a stopping lever 8 having two pawls 8a and 8b for selectively fixing the output gears 6 and 7. This stopping lever 8 has an arm 8c extending to a first plunger 9 for changeover control and the forward end of this arm 8c is connected with a connecting end 9a of the first plunger 9.

The rotation of the output gear 7 is transmitted to the two-focus changeover optical system 14 and the zooming optical system 15 via a gear train 27. As already explained, the two-focus changeover optical system 14 is composed of the concave lens 14a and the convex lens 14b and this convex lens 14b is connected by means of a pin with a swinging arm 13b which is meshed with a two-focus changeover gear 28 arranged to rotate via the aforementioned gear train 27. A zoom changeover gear 10 which is driven by the gear train 27 has zoom changeover arms 10a and 10b extending from the peripheral face thereof. The convex lens 15a and the concave lens 15b comprising the zoom optical system 15 are connected by means of pins with zoom changeover levers 11 and 12 for shifting the positions thereof, as in the case of the two-focus changeover optical system 14.

Then, the driving mechanism comprising the second motor 18 for the zooming optical system 15 will be explained.

As illustrated in the figure, the output shaft of the second motor 18 has mounted thereon a gear 19 and rotation of this gear 19 is transmitted to a gear 20 via a speed reducing system 57. A gears 20 and another gear 21 below it to the left are on the same shaft and formed monobloc form a second clutch mechanism like the first counterpart with an output gear 23 for two-focus changeover mechanism held to be freely rotatable between the gears 20 and 21, planetary gears 22a, 22b and 23c mounted on shafts extending from the output gear 23 and arranged to rotate around the gear 21 as the sun gear and another output gear for driving the zooming optical system with its inner teeth in mesh with the planetary gears 22a, 22b and 22c.

For selectively fixing either of the output gears 23 and 24 there is provided a stopping lever 25 having two pawls 25a and 25b on the periphery thereof, and this stopping lever 25 is connected with a connecting end 25a of a plunger 26 for changeover control via an arm 25c.

Rotation of the output gear 24 is transmitted to cam shaft 16 and 17 which have formed thereon gears 16a and 14b at one end thereof respectively. The convex lens 15a and concave lens 15b comprising the aforementioned zoom optical system 15 have formed thereon cam follower pins 15c and 15d to engage with linear cam grooves 16a and 17a as well as spiral cam grooves 16b and 16b formed in the outer periphery of the cam shafts 16 and 17 respectively. These spiral grooves are formed with different helix angles so that the convex lens 15a and the concave lens 15b are shifted at different speeds.

The mode of operation of this mechanism will be described below.

Figure 47:
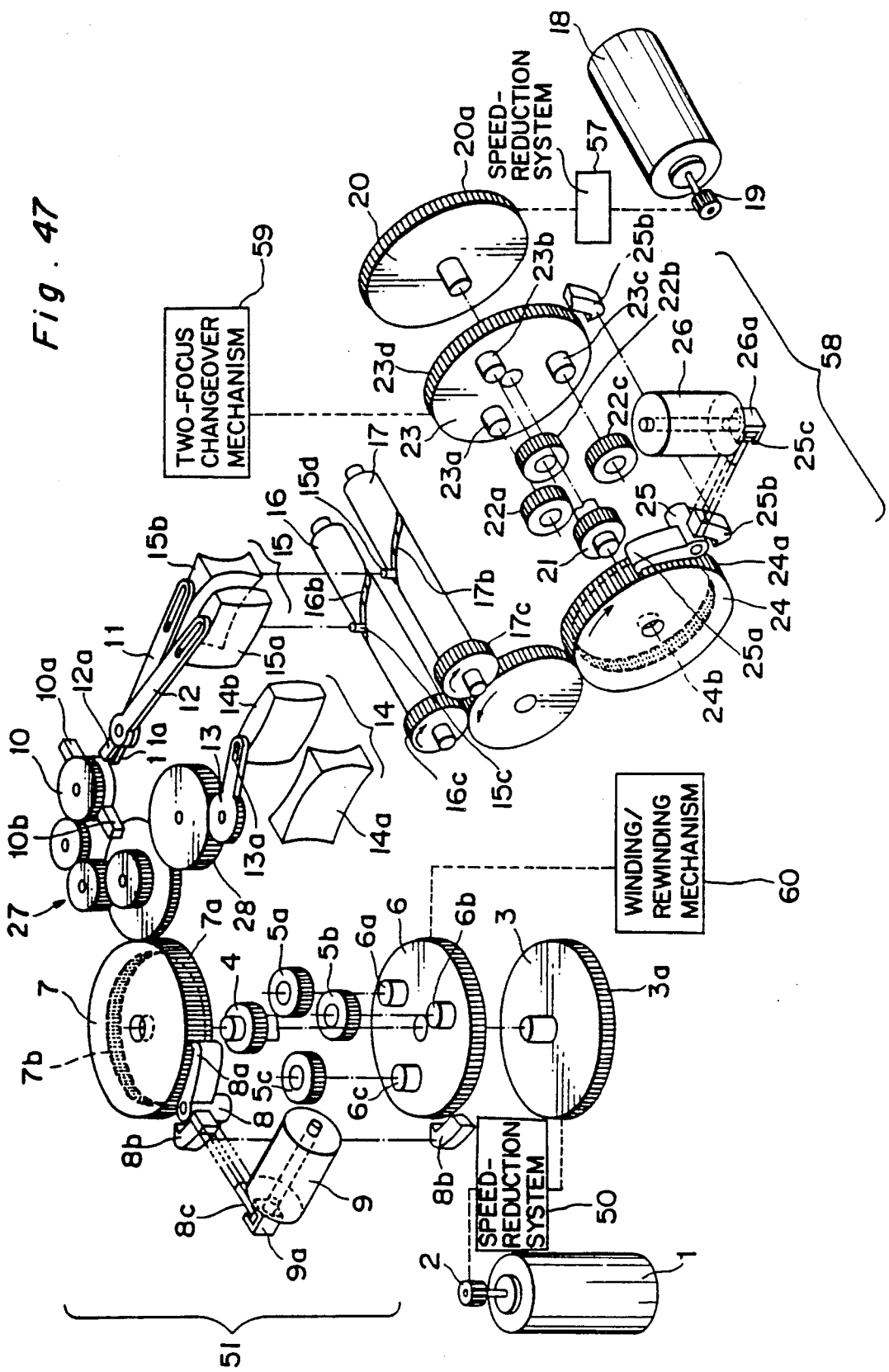
Figure 48:
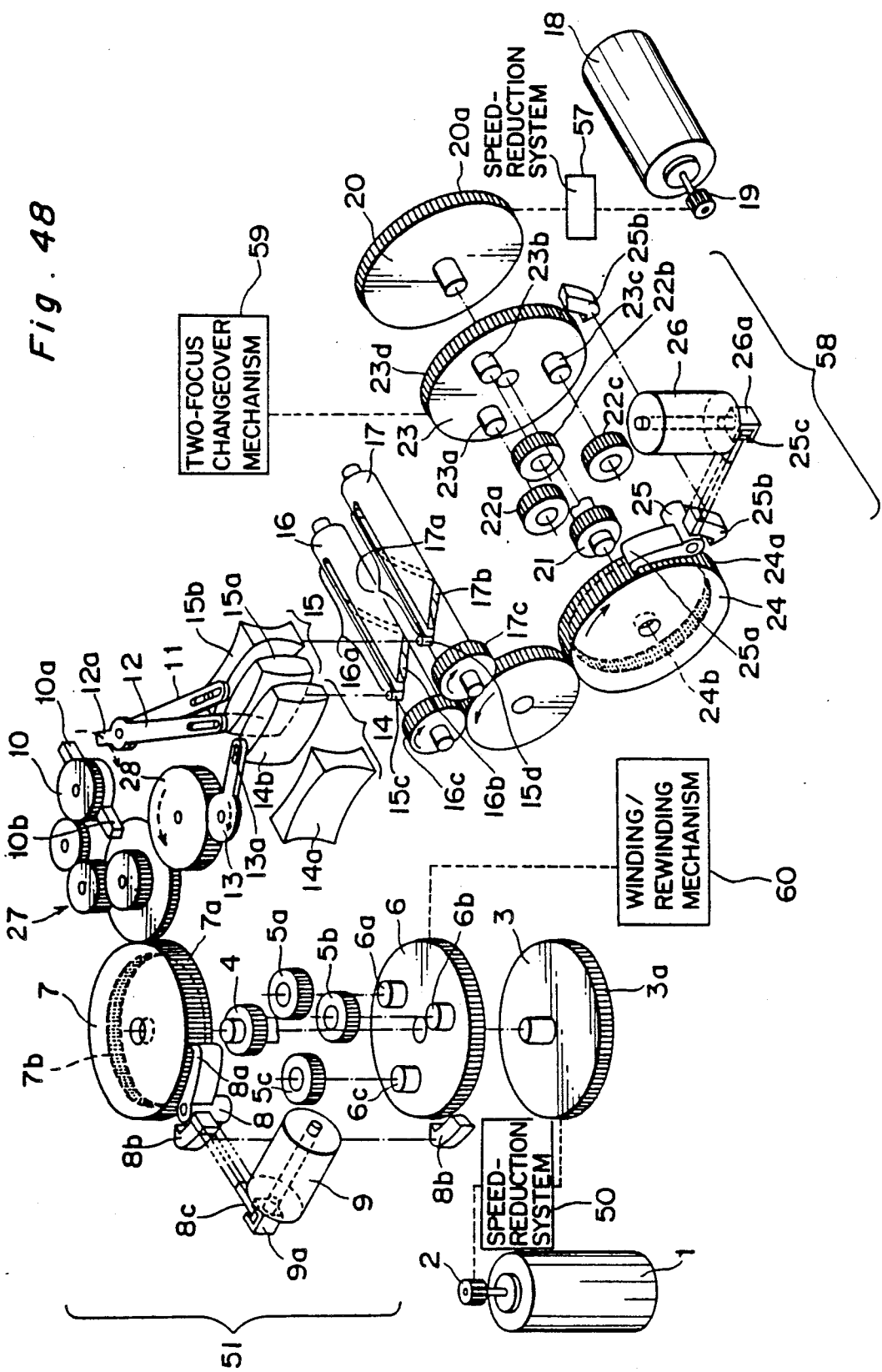

As will be apparent from the above explanation made with reference to FIGS. 23 and 26, the arrangement shown in FIG. 46 has the two-focus changeover optical system 14 at the wide angle position and the zooming optical system 15 at the wide angle end. From the state with both optical systems on the wide angle side the zooming optical system 15 may be shifted toward the two-focus changeover optical system 14 with the distance between the lenses 15a and 15b to thereby change the taking lens' focal length continuously until it reaches 70 mm. For thus shifting the zooming optical system 15 the photographer may operate a zooming switch button 102 (FIG. 21), and then, as seen form the flow chart, the second plunger 26 is switched for the output gear 23 for the two-focus changeover mechanism 59 to be stopped by the pawl 25b so that power is transmitted by the output gear 24 for the zooming optical system 15 to the cam shafts 16 and 17. The position of the zoom optical system 15 can be set arbitrarily with the second motor 18 stopped by setting the zooming switch button to the neutral position. FIG. 47 shows the state with the zooming optical system 15 set at the neutral position and FIG. 48 shows the state with that set at the telephoto end.

If zooming is done further toward the telephoto side, first the second plunger 26 for changeover control is shifted by application of a negative pulse voltage and the output gear 24 is stopped by the pawl 25a of the stopping lever 25. Hence, the two-focus changeover mechanism 59 is driven by the second motor 18 and the focal length of the taking lens is changed from 35 mm to 70 mm. Meanwhile, the first plunger 9 for changeover control is shifted by application of a negative pulse voltage and the output gear 6 for driving the winding-/rewinding mechanism is stopped by the pawl 8b of the stopping lever 8. Hence, as the first motor 1 is operated, the two-focus changeover gear 28 is driven to rotate in the direction indicated by the arrow (broken line) via the output gear and the gear train 27, this causing the convex lens 14b to shift forward to the telephoto end. Since the zoom changeover gear 10, too, rotates simultaneously in the direction indicated by the arrow, the arm 10a extending from the periphery of the gear 10 kicks the ends 11a and 12a of the zoom changeover levers 11 and 12, and the zooming optical system 15 is thereby shifted instantaneously to the wide angle position rear in the direction of the optical system with the cam followers 15c and 15d of the lenses 15a and 15b being guided by the linear cam grooves formed in the surface of the cam shafts 16 and 17.

Figure 49:
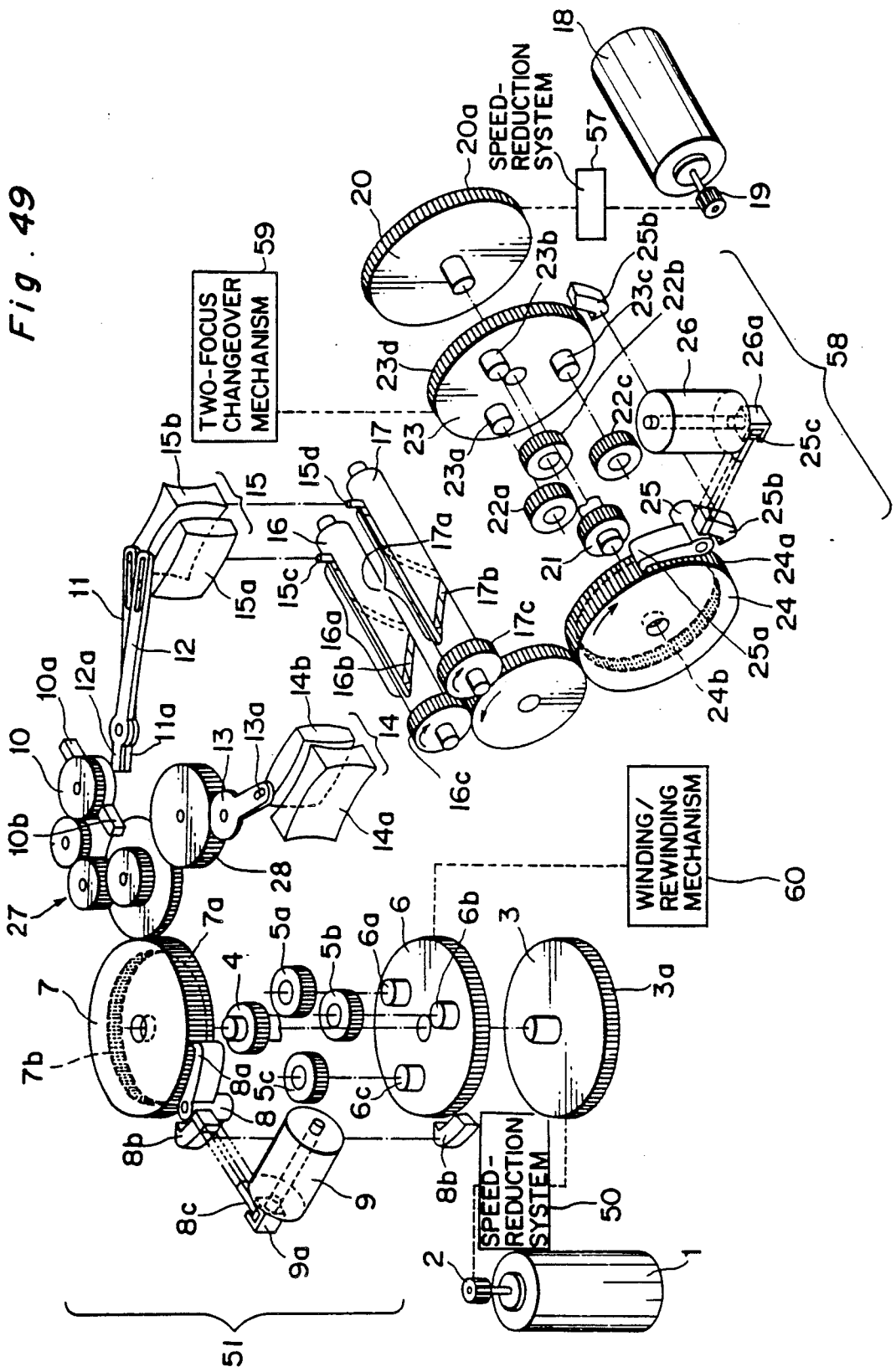
Figure 50:
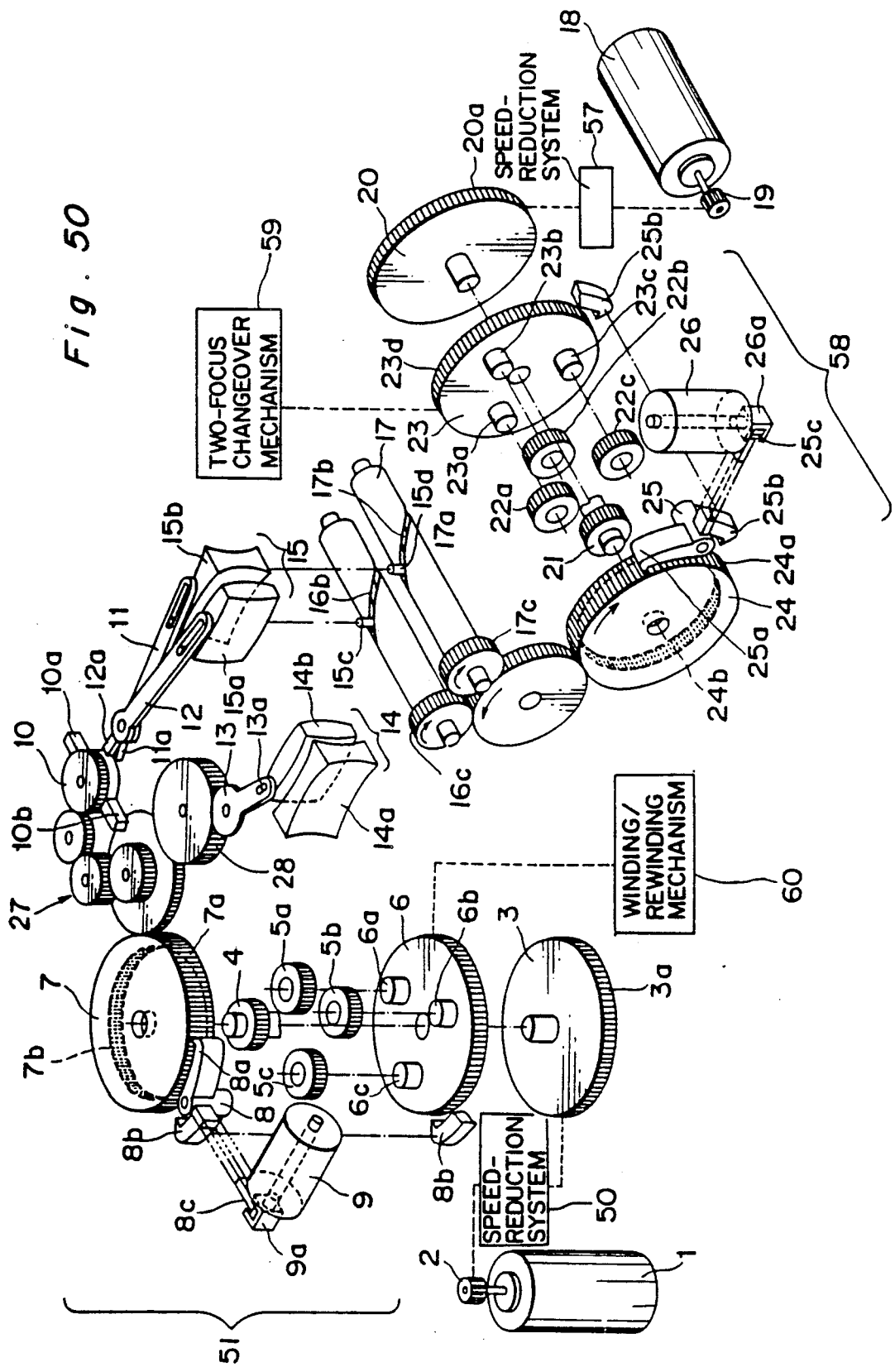

The operation over, the finder has the two-focus changeover system 14 at the telephoto position and the zooming optical system 15 at the wide angle end as shown in FIG. 25. And the then state including that of the driving mechanism is shown in FIG. 49. When zooming is made from this state further toward the telephoto side, the individual plungers 9 and 26 are shifted and the stopping mode of each stopping lever changes. That is, that stopping lever 8 stops the output gear 7 for shifting the two-focus changeover optical system 14 and the stopping lever 25 stops the output gear 23 for driving the two-focus changeover mechanism. Hence, when the switch button 102 is operated for further zooming toward the telephoto side, the lenses 15a and 15b are shifted toward the two-focus optical system by the second motor 18 with the distance therebetween being decreased as the case described above. In this case, too, it is possible to set the positions of the lenses 15a and 15b arbitrarily by releasing the zoom switch button 102. The arrangement amid this shifting is shown in FIG. 50, while the arrangement with the taking lens having shifted to the telephoto position corresponding to a focal length of 140 mm is shown in FIG. 51.

Figure 51:
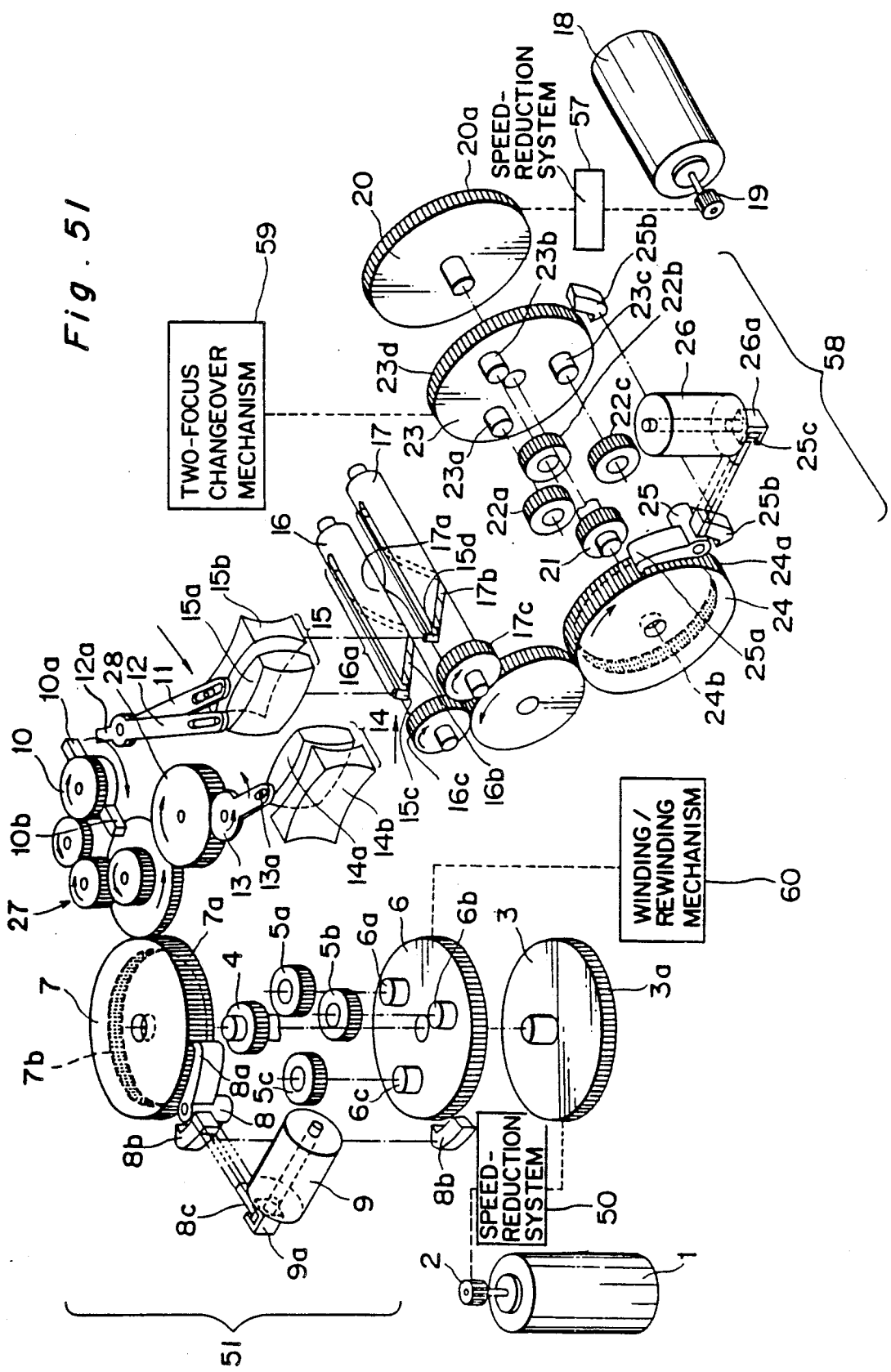

When zooming is done form the telephoto end toward the wide angle end, the operation described above for shifting from the state shown in FIG. 46 to that shown in FIG. 51 is exactly reversed, hence no detailed description is made here. But supposing that the state shown in FIG. 51 is the initial one, the zooming optical system 15 is first shifted toward the wide angle side and, when the wide angle end has been reached, the two-focus changeover optical system 14 is shifted to the wide angle position with simultaneous and instantaneous shifting of the zooming optical system 15 and, thereafter, the zooming optical system 15 now at the telephoto end again starts shifting toward the wide angle side.

In this camera with its finder, the finder changeover mechanism and the circuit for operating it constituted as described above, the finder with its wide zooming range and a high magnification of up to 4-fold with a possibility of continuous zooming can be miniaturized with a relative ease compared with an ordinary 4-fold zooming optical system. Hence, the camera itself, too, can be miniaturized and, therefore, the finder described above it particularly suited for a so-called compact camera.

Although with this camera the so-called pseudo zoom photography by the use of trimming information, too, is feasible, photographing miss due to distance-measuring error can be precluded without fail for it is so designed that the distance-measuring area can be varied according to the trimming magnification and, as already explained, there is no risk of the distance-measuring area becoming too large compared with the photographable range.

Further, when the trimming limit PZlmt is 3, a taking lens' focal length may either be 35 mm or 70 mm if the finder's focal length (pseudo focal length) is in a range of 70–105 mm, for compensation is feasible through variation of the trimming magnification. Hence, as mentioned above, the frequency of shifting the taking lens as well as of shifting noise is reduced and the power consumption, too, is decreased.

It is to be noted that the present invention is not limited to or by the embodiments described above, further embodiments being feasible as follows.

For example, although in the above embodiment the finder's focal length is variable continuously from 35 mm to 70 mm as well as from 70 mm to 140 mm by zooming, this range may be halved at 70 mm and by providing the camera housing with a zoom mode changeover button 110 as shown by the imaginary line in FIGS. 21 and 22 so that the photographer may select either the wide angle mode or the telephoto mode. In actual photography it is sometimes the case a camera is difficult to use for its zooming range is too wide but such a problem can be coped with by making the zoom mode selectable manually.

While in the above embodiment, the taking optical system is the one with two selectable focuses, it is also possible to provide a camera having a taking optical system with which zooming is feasible or that with a single fixed focus, being also good for pseudo zoom photography.

Further, as focus detection it is also possible to use the contrast detection system instead of the phase differential detection system. Although in the above embodiment TTL (Through The Lens) system is adopted for the ease of improving precision, the external light distance-measuring system may be adopted instead, a further possibility being adoption of a system in which the triangle distance measurement is done at multiple points with a multiplicity of beams being emitted.

Also, it is possible to have the cells of the first block I through the third block III of the line sensor always usable so that the distance-measuring values at three points are calculated regardless of the value of the pseudo focal length Pf set and only in exceptable cases the spot distance-measuring mode in which those of the second block II only are usable is selectable, and the number of picture elements in the block II may be made variable according to the pseudo focal length. It is then possible that the photographer, when he wants to define the object, can do focusing on the defined subject without fail.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A camera comprising:
   optical system capable of changing its real focal length between a short focal length and a long focal length;
   means for designating a desired focal length;
   means for generating a magnification signal representing a magnification selected between a first magnification and second magnification greater than said first magnification when the real focal length of said optical system is set to said short focal length, and selected between a third magnification and a fourth magnification greater than said third magnification when the real focal length of said optical system is set to long focal length, a first product of said long focal length and said third magnification being smaller than a second product of said short focal length and said second magnification;
   means for setting the real focal length of said optical system in accordance with said desired focal length designated, so as to set the real focal length to said short focal length when said desired focal length is shorter than said first product, to set the real focal length to said long focal length when said desired focal length is longer than said second product, and to maintain the real focal length set at present when said desired focal length is longer than said first product but shorter than said second product; and
   means for determining and magnification signal generated by said generating signal in accordance with said desired focal length and the set real focal length of said optical system.

2. A camera comprising:

optical system capable of changing its real focal length between a short focal length and a long focal length;

means for designating a desired focal length;

means for detecting lighting condition of a subject to be photographed;

means for generating a magnification signal representing a magnification selected between a first magnification and second magnification greater than said first magnification when the real focal length of said optical system is set to said short focal length, and selected between a third magnification and a fourth magnification greater than said third magnification when the real focal length of said optical system is set to long focal length, a first product of said long focal length and said third magnification being smaller than a second product of said short focal length and said second magnification;

means for setting the real focal length of said optical system in accordance with said desired focal length and said detected lighting condition, so as to set the real focal length of said optical system to said short focal length when the desired focal length is shorter than said first product, to set the real focal length of said optical system to said long focal length when the desired focal length is longer than said second product, and to set the real focal length of said optical system to either of said long and short lengths is accordance with the lighting condition detected by said detecting means when the desired focal length is longer than said first product but shorter than said second product; and means for determining said magnification signal generated by said generating signal in accordance with said desired focal length and the set real focal length of said optical system.

3. A camera as claimed in claim 2, wherein said detecting means includes means for detecting brightness of a subject to be photographed, and means for comparing the detected brightness with a predetermined value, and wherein said setting means including means for setting the real focal length of said optical system to said long focal length if the detected brightness is higher than said predetermined value, when the desired focal length is longer than said first product but shorter than said second product.

4. A camera as claimed in claim 2, wherein said detecting means includes means for detecting brightness of a subject to be photographed, and means for comparing the detected brightness with a predetermined value, and wherein said setting means including means for setting the real focal length of said optical system to said short focal length if the detected brightness is lower than said predetermined value, when the desired focal length is longer than said first product but shorter than said second product.

5. A camera comprising:

optical system capable of changing its real focal length between a short focal length and a long focal length;

means for designating a desired focal length;

means for detecting a distance to a subject to be photographed;

means for comparing said detected distance with a predetermined distance;

means for generating a magnification signal representing a magnification selected between a first magnification and second magnification greater than said first magnification when the real focal length of said optical system is set to said short focal length, and selected between a third magnification and a fourth magnification greater than said third magnification when the real focal length of said optical system is set to long focal length, a first product of said long focal length and said third magnification being smaller than a second product of said short focal length and said second magnification;

means for setting the real focal length of said optical system in accordance with said desired focal length and the result of said comparing means, so as to set the real focal length of said optical system to said short focal length when the desired focal length is shorter than said first product, to set the real focal length of said optical system to said long focal length when said desired focal length is longer than said second product, and to set the real focal length of said optical system to either of said long and short lengths in accordance with the result of said comparing means when the desired focal length is longer than said first product but shorter than said second product; and means for determining said magnification signal generated by said generating signal in accordance with said desired focal length and the set real focal length of said optical system.

6. A camera as claimed in claim 5, wherein said setting means includes means for setting the real focal length of said optical system to said long focal length if said comparing means indicates that said detected distance is shorter than said predetermined distance, when the desired focal length is longer than said first product but shorter than said second product.

7. A camera as claimed in claim 5, wherein said setting means includes means for setting the real focal length of said optical system to said short focal length if said comparing means indicates that said detected distance is longer than said predetermined distance, when the desired focal length is longer than said first product but shorter than said second product.

8. A camera comprising:

optical system capable of changing its real focal length between a short focal length and a long focal length;

means for designating a desired focal length;

means for setting the real focal length of said optical system in accordance with said desired focal length designated;

means for generating a magnification signal representing a magnification selected between a first magnification and a second magnification greater than said first magnification, said magnification being determined in accordance with said desired focal length and the set real focal length of said optical system, a product of said short focal length and said second magnification being equal to said long focal length;

finder system different from said optical system, including a zoom lens system capable of changing its focal length between a first focal length corresponding to said short focal length of said optical system and a second focal length corresponding thereto;

a converter lens attachable to said zoom lens system to extend the focal length of said finder system composed of said zoom lens system and said converter lens in comparison with the focal length of said zoom lens system only, the focal length of said finder system being changeable between said first and second focal lengths by changing the focal length of said zoom lens system when said converter lens is not attached, and being changeable between said second focal length and a third focal length by changing the focal length of said zoom lens system when said converter lens is attached, said third focal length corresponding to a product of said focal length and a second magnification;

first means for shifting said zoom lens system in response to a change in said desired focal length designated; and second means for shifting said zoom lens system quickly in comparison with its shift by said first shifting means and moving said converter lens to be attached to said zoom lens system or to be retracted from the attachment, when a change in said desired focal length designated is beyond said second focal length.

9. A camera comprising:

optical system capable of changing its focal length;

means for driving said optical system to change the focal length thereof, said driving means including;

a cam shaft on which first and second cams are provided for driving said optical system to change the focal length thereof, the configuration of said first cam being different from that of said second cam to drive the optical system at a speed higher than a speed at which the optical system is driven by said second cam;

means for selecting either of said first and second cams to drive the optical system by the selected cam; and means for rotating said cam shaft in one of clockwise and counterclockwise directions to change the focal length of said optical system.

10. A camera as claimed in claim 9, further comprising;

a converter lens to be attached to said optical system for changing a focal length of entire system consisting of said optical system and said converter lens from that of said optical system only; and a means for shifting said converter lens when said second cam is selected by said selecting means.

11. A camera as claimed in claim 9, wherein said first cam has a spiral configuration and said second cam has a longitudinal configuration, and said selecting means selecting said first cam by rotating said cam shaft and selecting said second cam by shifting said cam shaft along its axis.

* * * * *